United States Patent
Jansen et al.

(10) Patent No.: US 9,115,467 B2
(45) Date of Patent: Aug. 25, 2015

(54) METHODS AND SYSTEMS FOR SOLVENT PURIFICATION

(75) Inventors: Robert Jansen, Portela (PT); Aharon Eyal, Jerusalem (IL)

(73) Assignee: Virdia, Inc., Redwood City, CA (US)

(*) Notice: Subject to any disclaimer, the term of this patent is extended or adjusted under 35 U.S.C. 154(b) by 521 days.

(21) Appl. No.: 13/195,721

(22) Filed: Aug. 1, 2011

(65) Prior Publication Data

US 2012/0167874 A1 Jul. 5, 2012

Related U.S. Application Data

(60) Provisional application No. 61/513,613, filed on Jul. 31, 2011.

(30) Foreign Application Priority Data

Aug. 1, 2010 (IL) .......................................... 207329

(51) Int. Cl.
| | |
|---|---|
| C13B 50/00 | (2011.01) |
| B01J 19/00 | (2006.01) |
| D21C 3/04 | (2006.01) |
| D21C 3/20 | (2006.01) |
| D21C 11/00 | (2006.01) |

(52) U.S. Cl.
CPC .. D21C 3/04 (2013.01); D21C 3/20 (2013.01); D21C 11/0007 (2013.01)

(58) Field of Classification Search
None
See application file for complete search history.

(56) References Cited

U.S. PATENT DOCUMENTS

| | | | |
|---|---|---|---|
| 1,344,671 A | 6/1920 | Bergius | |
| 1,391,664 A | 9/1921 | Bergius | |
| 1,544,149 A | 6/1925 | Hagglund | |
| 1,547,893 A | 7/1925 | Bergius | |
| 1,678,819 A | 7/1928 | Koch | |
| 1,688,726 A | 10/1928 | McKee | |
| 1,699,177 A | 1/1929 | Bergius | |
| 1,818,618 A | 8/1931 | Hagglund | |
| 1,853,330 A | 4/1932 | Barstow et al. | |
| 1,890,491 A | 12/1932 | Bergius | |
| 1,906,467 A | 5/1933 | Heath | |
| 1,919,623 A | 7/1933 | Dreyfus | |
| 2,146,326 A | 2/1939 | Bergius et al. | |
| 2,239,095 A | 4/1941 | Hasche | |
| 2,293,724 A | 8/1942 | Faeber | |
| 2,305,833 A | 12/1942 | Warth | |
| 2,347,945 A | 5/1944 | Frey | |

(Continued)

FOREIGN PATENT DOCUMENTS

| | | |
|---|---|---|
| CA | 2735396 A1 | 3/2010 |
| DE | 4106373 A1 | 9/1992 |

(Continued)

OTHER PUBLICATIONS

U.S. Appl. No. 13/499,638, filed Apr. 1, 2012, Eyal et al.

(Continued)

*Primary Examiner* — Melvin C Mayes
*Assistant Examiner* — Colette Nguyen
(74) *Attorney, Agent, or Firm* — Wilson Sonsini Goodrich & Rosati

(57) ABSTRACT

A method including: (a) contacting lime with an extract including an S1 solvent carrying a contaminant load to form a lime treated extract; and (b) reducing the contaminant load by removing solids.

5 Claims, 13 Drawing Sheets

(56) References Cited

U.S. PATENT DOCUMENTS

| | | |
|---|---|---|
| 2,391,149 A | 12/1945 | Frey |
| 2,440,442 A | 4/1948 | Hillyer et al. |
| 2,474,669 A | 6/1949 | Hereng |
| 2,743,219 A | 4/1956 | Riehm |
| 2,752,270 A | 6/1956 | Specht |
| 2,778,751 A | 1/1957 | Riehm |
| 2,894,813 A | 7/1959 | Baniel et al. |
| 2,902,341 A | 9/1959 | Baniel et al. |
| 2,917,390 A | 12/1959 | Apel et al. |
| 2,944,923 A | 7/1960 | Riehm |
| 2,945,777 A | 7/1960 | Riehm |
| 2,951,775 A | 9/1960 | Apel |
| 2,989,569 A | 6/1961 | Apel |
| 3,067,065 A | 4/1962 | Kusama |
| 3,131,027 A | 4/1964 | Borkowski |
| 3,132,051 A | 5/1964 | Nobile et al. |
| 3,186,809 A | 6/1965 | Kreevoy et al. |
| 3,251,716 A | 5/1966 | Porter |
| 3,311,450 A | 3/1967 | Alon et al. |
| 3,394,056 A | 7/1968 | Nadler et al. |
| 3,497,330 A | 2/1970 | Baniel et al. |
| 3,527,820 A | 9/1970 | Mercier |
| 3,824,161 A | 7/1974 | Aue et al. |
| 3,839,318 A | 10/1974 | Mansfield |
| 3,939,803 A | 2/1976 | Meissner et al. |
| 4,016,054 A | 4/1977 | Gandon et al. |
| 4,018,637 A | 4/1977 | Kimmel |
| 4,036,939 A | 7/1977 | Duhayon et al. |
| 4,115,530 A | 9/1978 | Coenen et al. |
| 4,174,976 A | 11/1979 | Tsao et al. |
| 4,206,302 A | 6/1980 | Pollozec |
| 4,230,681 A | 10/1980 | Coenen et al. |
| 4,237,110 A | 12/1980 | Forster et al. |
| 4,255,356 A | 3/1981 | Coenen et al. |
| 4,257,818 A | 3/1981 | Regnault et al. |
| 4,259,309 A | 3/1981 | Coenen et al. |
| 4,272,492 A | 6/1981 | Jensen |
| 4,272,502 A | 6/1981 | Ziegenbein et al. |
| 4,278,471 A | 7/1981 | Whittingham |
| 4,291,007 A | 9/1981 | Baniel |
| 4,304,608 A | 12/1981 | Regnault et al. |
| 4,425,136 A | 1/1984 | Pearson et al. |
| 4,439,408 A | 3/1984 | Baniel et al. |
| 4,470,851 A | 9/1984 | Paszner et al. |
| 4,474,736 A | 10/1984 | Andrews et al. |
| 4,520,105 A | 5/1985 | Sinner et al. |
| 4,523,928 A | 6/1985 | Hillman et al. |
| 4,556,432 A | 12/1985 | Erckel et al. |
| 4,579,595 A | 4/1986 | Sachetto |
| 4,608,245 A | 8/1986 | Gaddy et al. |
| 4,615,742 A | 10/1986 | Wright |
| 4,645,658 A * | 2/1987 | Gaddy et al. .................. 423/488 |
| 4,668,340 A | 5/1987 | Sherman |
| 4,677,198 A | 6/1987 | Linnett et al. |
| 4,713,413 A | 12/1987 | Tegge et al. |
| 4,814,015 A | 3/1989 | Quinlan |
| 4,836,995 A | 6/1989 | Manor et al. |
| 4,890,820 A | 1/1990 | Tucker |
| 4,901,635 A | 2/1990 | Williams |
| 4,934,177 A | 6/1990 | Cuthbertson et al. |
| 4,958,016 A | 9/1990 | Kerkenaar et al. |
| 4,990,696 A | 2/1991 | Stauffer |
| 5,132,476 A | 7/1992 | Osterburg et al. |
| 5,138,110 A | 8/1992 | Segall et al. |
| 5,174,865 A | 12/1992 | Stultz et al. |
| 5,205,473 A | 4/1993 | Coffin, Sr. |
| 5,244,553 A | 9/1993 | Goldstein |
| 5,332,842 A | 7/1994 | Dickakian |
| 5,338,405 A | 8/1994 | Patt et al. |
| 5,357,035 A | 10/1994 | Gruber et al. |
| 5,398,497 A | 3/1995 | Suppes |
| 5,411,594 A | 5/1995 | Brelsford |
| 5,421,964 A | 6/1995 | Mahler et al. |
| 5,538,637 A | 7/1996 | Hester et al. |
| 5,571,378 A | 11/1996 | Elofson et al. |
| 5,580,389 A | 12/1996 | Farone et al. |
| 5,597,714 A | 1/1997 | Farone et al. |
| 5,602,286 A | 2/1997 | Muralidhara |
| 5,635,152 A | 6/1997 | Walpole |
| 5,696,195 A | 12/1997 | Tuminello et al. |
| 5,698,667 A | 12/1997 | Speaks et al. |
| 5,705,369 A | 1/1998 | Torget et al. |
| 5,723,704 A | 3/1998 | Demail et al. |
| 5,726,046 A | 3/1998 | Farone et al. |
| 5,730,877 A | 3/1998 | Heikkila et al. |
| 5,767,330 A | 6/1998 | Metz et al. |
| 5,782,982 A | 7/1998 | Farone et al. |
| 5,820,687 A | 10/1998 | Farone et al. |
| 5,831,122 A | 11/1998 | Eyak |
| 5,837,831 A | 11/1998 | Gruning |
| 5,846,510 A | 12/1998 | Hollitt |
| 5,847,238 A | 12/1998 | Muralidhara et al. |
| 5,859,270 A | 1/1999 | Kolstad et al. |
| 5,865,948 A | 2/1999 | Lora et al. |
| 5,876,505 A | 3/1999 | Klyosov et al. |
| 5,959,128 A | 9/1999 | Kolstad et al. |
| 5,969,195 A | 10/1999 | Stabel et al. |
| 6,007,636 A | 12/1999 | Lightner |
| 6,043,392 A | 3/2000 | Holtzapple et al. |
| 6,086,681 A | 7/2000 | Lindroos et al. |
| 6,114,475 A | 9/2000 | Goode et al. |
| 6,169,187 B1 | 1/2001 | Eyal |
| 6,207,209 B1 | 3/2001 | Jirjis et al. |
| 6,224,776 B1 | 5/2001 | Heikkila et al. |
| 6,229,046 B1 | 5/2001 | Eyal et al. |
| 6,239,274 B1 | 5/2001 | Heikkila et al. |
| 6,258,175 B1 | 7/2001 | Lightner |
| 6,391,204 B1 | 5/2002 | Russo, Jr. |
| 6,416,621 B1 | 7/2002 | Karstens |
| 6,419,788 B1 | 7/2002 | Wingerson |
| 6,419,828 B1 | 7/2002 | Russo, Jr. |
| 6,452,051 B1 | 9/2002 | Eyal |
| 6,521,097 B2 | 2/2003 | Geissler |
| 6,572,775 B2 | 6/2003 | Heikkila et al. |
| 6,610,867 B2 | 8/2003 | Jakel et al. |
| 6,620,292 B2 | 9/2003 | Wingerson |
| 6,692,578 B2 | 2/2004 | Schmidt et al. |
| 6,719,957 B2 | 4/2004 | Brady, Jr. et al. |
| 6,747,076 B2 | 6/2004 | Schneider et al. |
| 6,752,902 B2 | 6/2004 | Heikkila et al. |
| 6,833,149 B2 | 12/2004 | Jirjis et al. |
| 6,875,349 B2 | 4/2005 | Heikkila et al. |
| 6,896,811 B2 | 5/2005 | Heikkila et al. |
| 6,924,371 B2 | 8/2005 | Karki et al. |
| 6,936,110 B2 | 8/2005 | Van Thorre |
| 6,942,803 B2 | 9/2005 | Cockrem |
| 7,022,239 B2 | 4/2006 | Heikkila et al. |
| 7,198,925 B2 | 4/2007 | Foody |
| 7,208,570 B2 | 4/2007 | Saviainen |
| 7,229,558 B2 | 6/2007 | Heikkila et al. |
| 7,361,273 B2 | 4/2008 | Heikkila et al. |
| 7,399,323 B2 | 7/2008 | Renninger et al. |
| 7,465,791 B1 | 12/2008 | Hallberg et al. |
| 7,501,025 B2 | 3/2009 | Bakker et al. |
| 7,503,981 B2 | 3/2009 | Wyman et al. |
| 7,524,660 B2 | 4/2009 | Caimi et al. |
| 7,629,010 B2 | 12/2009 | Passarelli et al. |
| 7,649,086 B2 | 1/2010 | Belanger et al. |
| 7,652,180 B2 | 1/2010 | Osterholt et al. |
| 7,713,725 B2 | 5/2010 | England et al. |
| 7,717,364 B2 | 5/2010 | Wingerson |
| 7,718,070 B2 | 5/2010 | Mahnon |
| 7,959,811 B2 | 6/2011 | Airaksinen et al. |
| 7,993,709 B2 | 8/2011 | Brunet |
| 8,022,260 B2 | 9/2011 | O'Connor et al. |
| 2001/0009889 A1 | 7/2001 | Waggenspack et al. |
| 2002/0102672 A1 | 8/2002 | Mizrahi et al. |
| 2003/0013606 A1 | 1/2003 | Hampden-Smith et al. |
| 2003/0144387 A1 | 7/2003 | Krivohlavek et al. |
| 2003/0156970 A1 | 8/2003 | Oberkofler et al. |
| 2003/0199049 A1 | 10/2003 | Nguyen et al. |
| 2004/0060673 A1 | 4/2004 | Phillips et al. |
| 2004/0121446 A1 | 6/2004 | England et al. |
| 2004/0161388 A1 | 8/2004 | Liu et al. |

(56) References Cited

U.S. PATENT DOCUMENTS

| | | |
|---|---|---|
| 2004/0199025 A1 | 10/2004 | Stauffer |
| 2004/0199049 A1 | 10/2004 | Parasher et al. |
| 2004/0231661 A1 | 11/2004 | Griffin et al. |
| 2004/0237499 A1 | 12/2004 | Yogev et al. |
| 2005/0034823 A1 | 2/2005 | Brelid et al. |
| 2006/0024801 A1 | 2/2006 | Holtzapple et al. |
| 2006/0051812 A1 | 3/2006 | Helin et al. |
| 2006/0134308 A1 | 6/2006 | Inglett |
| 2007/0020375 A1 | 1/2007 | Jansen et al. |
| 2007/0031953 A1 | 2/2007 | Dunson, Jr. et al. |
| 2007/0178569 A1 | 8/2007 | Leschine et al. |
| 2007/0191303 A1 | 8/2007 | Dillon et al. |
| 2007/0219521 A1 | 9/2007 | Hird et al. |
| 2008/0029233 A1 | 2/2008 | Wingerson et al. |
| 2008/0032344 A1 | 2/2008 | Fallavollita |
| 2008/0033188 A1 | 2/2008 | Dumesic et al. |
| 2008/0041366 A1 | 2/2008 | Wahnon |
| 2008/0057555 A1 | 3/2008 | Nguyen |
| 2008/0202504 A1 | 8/2008 | Hilst |
| 2008/0216391 A1 | 9/2008 | Cortright et al. |
| 2008/0299606 A1 | 12/2008 | Pompejus et al. |
| 2008/0300434 A1 | 12/2008 | Cortright et al. |
| 2008/0300435 A1 | 12/2008 | Cortright et al. |
| 2009/0008119 A1 | 1/2009 | Zamfes |
| 2009/0017503 A1 | 1/2009 | Zhang et al. |
| 2009/0053783 A1 | 2/2009 | Gokarn et al. |
| 2009/0056889 A1 | 3/2009 | Ren et al. |
| 2009/0062232 A1 | 3/2009 | Fujikawa et al. |
| 2009/0084511 A1 | 4/2009 | Lampinen et al. |
| 2009/0117634 A1 | 5/2009 | Bradley et al. |
| 2009/0142848 A1 | 6/2009 | Wyman et al. |
| 2009/0181433 A1 | 7/2009 | Chotani et al. |
| 2009/0205086 A1 | 8/2009 | Hood et al. |
| 2009/0218055 A1 | 9/2009 | Unsitalo et al. |
| 2009/0226979 A1 | 9/2009 | Retsina et al. |
| 2009/0234142 A1 | 9/2009 | Mascal |
| 2009/0286295 A1 | 11/2009 | Medoff et al. |
| 2010/0004437 A1 | 1/2010 | Binder et al. |
| 2010/0009408 A1 | 1/2010 | England et al. |
| 2010/0012010 A1 | 1/2010 | Gooijer et al. |
| 2010/0024807 A1 | 2/2010 | Burke et al. |
| 2010/0028557 A1 | 2/2010 | Nagano |
| 2010/0043782 A1 | 2/2010 | Kilambi et al. |
| 2010/0048884 A1 | 2/2010 | Kilambi |
| 2010/0048924 A1 | 2/2010 | Kilambi |
| 2010/0069626 A1 | 3/2010 | Kilambi |
| 2010/0086981 A1 | 4/2010 | Latouf et al. |
| 2010/0093995 A1 | 4/2010 | Baniel et al. |
| 2010/0116267 A1 | 5/2010 | Mraz et al. |
| 2010/0151527 A1 | 6/2010 | Endo et al. |
| 2010/0152509 A1 | 6/2010 | Ekman |
| 2010/0184151 A1 | 7/2010 | Tolan et al. |
| 2010/0184176 A1 | 7/2010 | Ishida et al. |
| 2010/0189706 A1 | 7/2010 | Chang et al. |
| 2010/0233761 A1 | 9/2010 | Czartoski et al. |
| 2010/0264372 A1 | 10/2010 | Baniel et al. |
| 2010/0279361 A1 | 11/2010 | South et al. |
| 2010/0279372 A1 | 11/2010 | Cho et al. |
| 2010/0305241 A1 | 12/2010 | Balakshin et al. |
| 2010/0305242 A1 | 12/2010 | Balakshin et al. |
| 2010/0305243 A1 | 12/2010 | Balakshin et al. |
| 2010/0305244 A1 | 12/2010 | Balakshin et al. |
| 2011/0003348 A1 | 1/2011 | Genta et al. |
| 2011/0016545 A1 | 1/2011 | Gray et al. |
| 2011/0028710 A1 | 2/2011 | Baniel et al. |
| 2011/0059316 A1 | 3/2011 | Kilambi et al. |
| 2011/0060132 A1 | 3/2011 | Lewis |
| 2011/0070131 A1 | 3/2011 | Schmidt et al. |
| 2011/0100359 A1 | 5/2011 | North |
| 2011/0105737 A1 | 5/2011 | Benjelloun Mlayah et al. |
| 2011/0124057 A1 | 5/2011 | Genta et al. |
| 2011/0129886 A1 | 6/2011 | Howard et al. |
| 2011/0143412 A1 | 6/2011 | Kim et al. |
| 2011/0146138 A1 | 6/2011 | Berry et al. |
| 2011/0178290 A1 | 7/2011 | Baniel et al. |
| 2011/0262984 A1 | 10/2011 | Nguyen |
| 2011/0268652 A1 | 11/2011 | Machhammer et al. |
| 2011/0271875 A1 | 11/2011 | Ahmed et al. |
| 2011/0275860 A1 | 11/2011 | Beldring et al. |
| 2011/0281298 A1 | 11/2011 | Rawls et al. |
| 2011/0300617 A1 | 12/2011 | Genta et al. |
| 2011/0318796 A1 | 12/2011 | Walther |
| 2012/0006320 A1 | 1/2012 | Nguyen |
| 2012/0023810 A1 | 2/2012 | Fjare et al. |
| 2012/0055466 A1 | 3/2012 | Cotti et al. |
| 2012/0104313 A1 | 5/2012 | Garbero et al. |
| 2012/0156517 A1 | 6/2012 | Vuori et al. |
| 2012/0323053 A1 | 12/2012 | Qiao et al. |
| 2013/0012610 A1 | 1/2013 | Belanger et al. |
| 2013/0115653 A1 | 5/2013 | Peterson et al. |
| 2013/0167836 A1 | 7/2013 | Floyd et al. |
| 2013/0167837 A1 | 7/2013 | Floyd et al. |
| 2013/0216693 A1 | 8/2013 | Harrison et al. |
| 2014/0014092 A1 | 1/2014 | Kazachkin et al. |

FOREIGN PATENT DOCUMENTS

| | | |
|---|---|---|
| DE | 19721301 C1 | 10/1998 |
| DE | 19747917 A1 | 5/1999 |
| DE | 102010033925 A1 | 8/2011 |
| EP | 0018621 A1 | 11/1980 |
| EP | 0301783 A2 | 2/1989 |
| EP | 0317036 A1 | 5/1989 |
| EP | 0301783 A3 | 4/1991 |
| EP | 0247436 B1 | 8/1992 |
| EP | 0504622 A1 | 9/1992 |
| EP | 0560546 A1 | 9/1993 |
| EP | 0561554 A1 | 9/1993 |
| EP | 0878455 A1 | 11/1998 |
| EP | 0690931 B1 | 10/2001 |
| EP | 1889814 A1 | 2/2008 |
| EP | 1918031 A1 | 7/2008 |
| EP | 1878480 B1 | 9/2011 |
| GB | 1562682 A | 3/1980 |
| GB | 2034291 A | 6/1980 |
| WO | WO 82/01723 A1 | 5/1982 |
| WO | WO 93/05186 A1 | 3/1993 |
| WO | WO 93/13265 A1 | 7/1993 |
| WO | WO 95/02726 A1 | 1/1995 |
| WO | WO 96/41052 A1 | 12/1996 |
| WO | WO 97/13732 A2 | 4/1997 |
| WO | WO 97/13732 A3 | 5/1997 |
| WO | WO 01/25143 A1 | 4/2001 |
| WO | WO 01/32715 A1 | 5/2001 |
| WO | WO 02/02826 A1 | 1/2002 |
| WO | WO 03/078540 A2 | 9/2003 |
| WO | WO 03/078540 A3 | 1/2004 |
| WO | WO 2004/050983 A1 | 6/2004 |
| WO | WO 2004/079017 A2 | 9/2004 |
| WO | WO 2004/079017 A3 | 8/2005 |
| WO | WO 2006/006164 A2 | 1/2006 |
| WO | WO 2006/034581 A1 | 4/2006 |
| WO | WO 2006/038863 A1 | 4/2006 |
| WO | WO 2006/056838 A1 | 6/2006 |
| WO | WO 2006/086861 A2 | 8/2006 |
| WO | WO 2006/086861 A3 | 10/2006 |
| WO | WO 2007/019505 A2 | 2/2007 |
| WO | WO 2007/019505 A3 | 6/2007 |
| WO | WO 2007/112314 A2 | 10/2007 |
| WO | WO 2007/112314 A3 | 11/2007 |
| WO | WO 2007/146245 A2 | 12/2007 |
| WO | WO2007146245 * | 12/2007 |
| WO | WO 2008/019468 A1 | 2/2008 |
| WO | WO 2008/027699 A2 | 3/2008 |
| WO | WO 2007/146245 A3 | 4/2008 |
| WO | WO 2008/144903 A1 | 4/2008 |
| WO | WO 2008/069830 A2 | 6/2008 |
| WO | WO 2008/027699 A3 | 7/2008 |
| WO | WO 2008/109877 A1 | 9/2008 |
| WO | WO 2008/111045 A1 | 9/2008 |
| WO | WO 2008/123419 A1 | 10/2008 |
| WO | WO 2008/131229 A1 | 10/2008 |
| WO | WO 2008/069830 A3 | 11/2008 |
| WO | WO 2008/137639 A1 | 11/2008 |

(56) References Cited

FOREIGN PATENT DOCUMENTS

| | | |
|---|---|---|
| WO | WO 2008/140617 A2 | 11/2008 |
| WO | WO 2008/140617 A3 | 1/2009 |
| WO | WO 2009/003292 A1 | 1/2009 |
| WO | WO 2009/015663 A2 | 2/2009 |
| WO | WO 2009/020459 A2 | 2/2009 |
| WO | WO 2009/028969 A1 | 3/2009 |
| WO | WO 2009/030713 A1 | 3/2009 |
| WO | WO 2009/031164 A1 | 3/2009 |
| WO | WO 2009/036674 A1 | 3/2009 |
| WO | WO 2009/020459 A3 | 4/2009 |
| WO | WO 2006/006164 A3 | 5/2009 |
| WO | WO 2009/125400 A2 | 10/2009 |
| WO | WO 2009/135480 A1 | 11/2009 |
| WO | WO 2009/142837 A2 | 11/2009 |
| WO | WO 2009/015663 A3 | 12/2009 |
| WO | WO 2009/125400 A3 | 1/2010 |
| WO | WO 2010/006840 A2 | 1/2010 |
| WO | WO 2010/009343 A2 | 1/2010 |
| WO | WO 2010/015404 A1 | 2/2010 |
| WO | WO 2010/020977 A2 | 2/2010 |
| WO | WO 2009/142837 A3 | 3/2010 |
| WO | WO 2010/026244 A1 | 3/2010 |
| WO | WO 2010/026572 A1 | 3/2010 |
| WO | WO 2010/009343 A3 | 4/2010 |
| WO | WO 2010/034055 A1 | 4/2010 |
| WO | WO 2010/037109 A2 | 4/2010 |
| WO | WO 2010/038021 A2 | 4/2010 |
| WO | WO 2010/043424 A1 | 4/2010 |
| WO | WO 2010/045576 A2 | 4/2010 |
| WO | WO 2010/046619 A1 | 4/2010 |
| WO | WO 2010/006840 A3 | 5/2010 |
| WO | WO 2010/037109 A3 | 5/2010 |
| WO | WO 2010/060183 A1 | 6/2010 |
| WO | WO 2010/064229 A2 | 6/2010 |
| WO | WO 2010/045576 A3 | 7/2010 |
| WO | WO 2010/064229 A3 | 7/2010 |
| WO | WO 2010/081231 A1 | 7/2010 |
| WO | WO 2010/038021 A3 | 8/2010 |
| WO | WO 2010/020977 A3 | 10/2010 |
| WO | WO 2010/113129 A2 | 10/2010 |
| WO | WO 2010/113129 A3 | 10/2010 |
| WO | WO 2010/113130 A2 | 10/2010 |
| WO | WO 2010/122554 A1 | 10/2010 |
| WO | WO 2010/128272 A1 | 11/2010 |
| WO | WO 2010/135804 A1 | 12/2010 |
| WO | WO 2010/135805 A1 | 12/2010 |
| WO | WO 2010/135806 A1 | 12/2010 |
| WO | WO 2010/135807 A1 | 12/2010 |
| WO | WO 2010/135832 A1 | 12/2010 |
| WO | WO 2010/135833 A1 | 12/2010 |
| WO | WO 2010/146331 A2 | 12/2010 |
| WO | WO 2010/113130 A3 | 1/2011 |
| WO | WO 2011/002660 A1 | 1/2011 |
| WO | WO 2011/007043 A1 | 1/2011 |
| WO | WO 2011/007369 A1 | 1/2011 |
| WO | WO 2011/017587 A1 | 2/2011 |
| WO | WO 2011/028554 A1 | 3/2011 |
| WO | WO 2011/039751 A2 | 4/2011 |
| WO | WO 2011/066487 A1 | 6/2011 |
| WO | WO 2011/070602 A1 | 6/2011 |
| WO | WO 2011/080131 A2 | 7/2011 |
| WO | WO 2011/089589 A1 | 7/2011 |
| WO | WO 2011/097719 A1 | 8/2011 |
| WO | WO 2011/080131 A3 | 9/2011 |
| WO | WO 2011/111189 A1 | 9/2011 |
| WO | WO 2011/111190 A1 | 9/2011 |
| WO | WO 2010/146331 A3 | 10/2011 |
| WO | WO 2011/039751 A3 | 10/2011 |
| WO | WO 2011/140222 A1 | 11/2011 |
| WO | WO 2011/151823 A1 | 12/2011 |
| WO | WO 2011/163084 A1 | 12/2011 |
| WO | WO 2012/013177 A2 | 2/2012 |
| WO | WO 2012/015575 A1 | 2/2012 |
| WO | WO 2012/013177 A3 | 3/2012 |
| WO | WO 2012/031270 A1 | 3/2012 |
| WO | WO 2013/038399 A1 | 3/2013 |

OTHER PUBLICATIONS

U.S. Appl. No. 61/524,839, filed Aug. 18, 2011, Jansen et al.
U.S. Appl. No. 61/533,088, filed Sep. 9, 2011, Jansen et al.
U.S. Appl. No. 61/539,861, filed Sep. 27, 2011, Eyal.
U.S. Appl. No. 61/539,873, filed Sep. 27, 2011, Jansen et al.
Blommel, et al. Production of conventional liquid fuels from sugars. Virent energy systems. Aug. 25, 2008. 1-14.
Eyal, et al. pH dependence of carboxylicand mineral acid extraction by amine-based extractants: effects of pKa, Amine Basicity, and diluent properties. Ind. Eng. Chem. Res. 1995; 34:1789-1798.
Office action dated Apr. 3, 2012 for U.S. Appl. No. 12/530,505.
International search report and written opinion dated Mar. 26, 2013 for PCT/US2013/021055.
Office action dated Mar. 22, 2013 for U.S. Appl. No. 13/225,346.
Office action dated Jun. 9, 2011 for U.S. Appl. No. 12/426,308.
Office action dated Nov. 28, 2011 for U.S. Appl. No. 12/426,308.
U.S. Appl. No. 13/577,213, filed Aug. 3, 2012, Eyal et al.
U.S. Appl. No. 13/577,215, filed Aug. 3, 2012, Eyal et al.
European office action dated Jul. 31, 2012 for EP Application No. 09787553.8.
Office action dated Oct. 9, 2012 for U.S. Appl. No. 12/530,505. . . .
Office action dated Oct. 12, 2012 for U.S. Appl. No. 13/225,346.
Office action dated Oct. 17, 2012 for U.S. Appl. No. 12/935,807.
Office action dated Dec. 6, 2012 for U.S. Appl. No. 13/036,717.
Office action dated Dec. 6, 2012 for U.S. Appl. No. 13/132,573.
U.S. Appl. No. 13/132,573, filed Jun. 2, 2011, Baniel et al.
U.S. Appl. No. 13/225,346, Sep. 2, 2011, Jansen et al.
U.S. Appl. No. 61/358,894, filed Jun. 26, 2010, Eyal.
U.S. Appl. No. 61/473,134, filed Apr. 7, 2011, Eyal.
U.S. Appl. No. 61/483,663, filed May 7, 2011, Eyal.
U.S. Appl. No. 61/483,777, filed May 9, 2011, Jansen et al.
U.S. Appl. No. 61/487,319, filed May 18, 2011, Jansen et al.
U.S. Appl. No. 61/491,243, filed May 30, 2011, Jansen et al.
U.S. Appl. No. 61/500,169, filed Jun. 23, 2011, Eyal et al.
U.S. Appl. No. 61/513,613, filed Jul. 31, 2011, Jansen et al.
U.S. Appl. No. 61/524,350, filed Aug. 17, 2011, Eyal et al.
U.S. Appl. No. 61/528,257, filed Aug. 28, 2011, Jansen et al.
U.S. Appl. No. 61/539,196, filed Sep. 26, 2011, Jansen et al.
U.S. Appl. No. 61/539,239, filed Sep. 26, 2011, Jansen et al.
U.S. Appl. No. 61/539,272, filed Sep. 26, 2011, Jansen et al.
Baniel, et al. Porogen derived membranes.1. Concept description and analysis. J. of Membrane Science. 1990; 54:271-283.
Baniel. Reactions and processes in Liquid liquid (L/L) systems. Pure & Appl. Chem. 1986; 58(6):879-883.
Barton. CRC handbook of solubility parameters and other cohesion parameters. CRC Press. Boca Raton. 1991; 122-138.
Beg, et al. Cyclic transport of $Fe^{3+}$ as $H[FeCl4]$ and $H[FeBr4]$ through a dibutyl ether-benzene membrane. Journal of Membrane Science. 1985; 24:97-100.
Berg, et al. The breaking of ternary acetate-alcohol-water azeotropes by extractive distillation. Chem. Eng. Commun. 1986; 48:93-101.
Brown. Mixed acid recovery with the APU™ acid sorption system. ECO-TEC, Technical Paper 147, Jan. 1997.
Campos. Calculations of VLE in electrolytes systems using chemical theory: aqueous acid chloridric system. 2nd Mercosur Congress on Chemical Engineering; 4th Mercosur Congress on Process Systems Engineering. 2008.
Castro, et al. Ecologically safe alkyl glucoside-based gemini surfactants. ARKIVOC 2005 (xii) 253-267, ISSN 1424-6376.
Chen, et al. Application of Molecular Fragments Variable Connectivity Index to Predicting Boiling Points of Alcohols. J. Iran. Chem. Soc. Dec. 2010; 7(4):1012-1020.
Chevalier, et al. Vapor-Liquid Equilibrium Data for the Systems $H2O-H2SO4-HCl$, $H2O-H2SO4-HBr$, and $H2O-HBr$ at 780 mmHg Pressure. J. Chem. Eng. Data. 1980; 25:271-273.
Cognis. MCT Redbook. Solvent Extraction Reagents and Applications. Cognis mining chemicals technology. 2010.

(56) References Cited

OTHER PUBLICATIONS

Crittenden, et al. Extraction of hydrogene chloride from agues solutions. Industrial and Engineering Chemistry. Feb. 1954; 46(2):265-274.
De Guzman. Bio-adipic acid prepares for entry. ICIS Chemical Business Sep. 27, 2010. www.icis.com.
De Los Rios, et al. Removal of Metal Ions from Aqueous Solutions by Extraction with Ionic Liquids. J. Chem. Eng. Data. 2010; 55:605-608.
Elhanan, et al. Solvent Sublation of Iron( Ill) Chloride by Tri-n-Octylamine. Analytical chemistry. Apr. 1969; 40(4):671-674.
Eyal, et al. A process for defluorination and purification of wet process phosphoric acids containing high al concentrations. Solvent Extraction and ion exchange. 1984; 2(4):677-697.
Eyal, et al. Extraction of Metal Salts by Mixtures of Water-Immiscible Amines and Organic Acids (Acid-Base Couple Extractants). 1. A Review of Distribution and Spectroscopic Data and of Proposed Extraction Mechanisms. Ind. Eng. Chem. Res. 1994; 33:1067-1075.
Eyal, et al. Extraction of Strong Mineral Acids by Organic Acid-Base Couples. Ind. Eng. Chem. Process Des. Dev. 1982, 21, 334-337.
Eyal, et al. Potassium Nitrate through Solvent Separation of Strong Acids. Ind. Eng. Chem. Process Des. 1985; 24:387-390.
Eyal, et al. Recovery and concentration of strong mineral acids from dilute solutions through LLX.I: review of parameters for adjusting extractant propert and analysis of process options. Solvent Extraction and ion exchange. 1991; 9(2):195-210.
Eyal, et al. Sulfuric acid recovery through solvent aided decomposition of ammonium sulfate. Solvent Extraction and ion exchange. 1986; 44:803-821.
Eyal, et al. Wet process phosphoric acid defluorination by aminebased extractants. Solvent Extraction and ion exchange. 1984; 2(4&5):659-675.
Fahim, et al. Liquid-Liquid Equilibria of the Ternary System Water + Acetic Acid + 1-Hexanol. J. Chem. Eng. Data. 1997; 42:183-186.
Gani, et al. Molecular design of solvents for liquid extraction based on unifac. Fluid Phase Equilibria. 1983; 13:331-340.
Greenwald. The dissociation of some calcium salts. Mar. 7, 1938; 437-452.
Grinbaum. An Integrated method for Development and Scaling up of Extraction Processes. "Ion Exchange and Solvent Extraction", Y. Marcus, A. Sangupta (eds.), vol. 15, Elsevier, 2002.
Guirguis, et al. Purification of phosphoric acid by a mixture of hydrophobic and hydrophilic extractants. Adv. Process. Met. Mater., Sohn Int. Sym. 2006; 3:451-465.
Harris, et al. The Madison Wood-Sugar Process. US Dept. of Agriculture. Jun. 1946; 1-21.
Harrison. CLVII. A note on the solubilities of calcium soaps. 1924; 1222-1223.
Hatch, et al. acid retardation, A Simple Physical Method for Separation of Strong Acids from Their Salts. I & E C process design and development. Oct. 1963; 2(4):253-263.
Hiwale, et al. Industrial Applications of Reactive Distillation: Recent Trends. International Journal of Chemical Reactor Engineering, vol. 2 [2004], Review R1. 1-54.
Horsley, et al. Azeotropic Data-II, No. 35, Advances in Chemistry Series. American Chemical Society, Washington, D.C. 1962.
Horvath, et al. IUPAC-NIST Solubility Data Series 68. Halogenated Aliphatic Hydrocarbon Compounds C3-C1 With Water. J. Phys. Chem. Ref. Data. 1999; 28(3):649-777.
Hutchins, et al. Aqueous polar aprotic solvents. Efficient sources of nucleophilic oxygen. J. Org. Chem. 1983; 48:1360-1362.
International search report and written opinion dated Feb. 4, 2010 for PCT/IL2009/000843.
International search report and written opinion dated May 20, 2010 for PCT/IL2009/001091.
International search report and written opinion dated Jul. 4, 2008 for PCT/IL2008/000278.
International search report and written opinion dated Sep. 8, 2010 for PCT/IL2009/000782.
International search report and written opinion dated Sep. 14, 2010 for PCT/IL2010/000317.
International search report and written opinion dated Sep. 23, 2011 for PCT/IL2011/000304.
International search report and written opinion dated Dec. 10, 2009 for PCT/IL2009/000392.
International search report and written opinion dated Dec. 20, 2011 for PCT/US2011/046153.
International search report dated Apr. 26, 2011 for PCT/IL2011/000130.
International search report dated May 5, 2011 for PCT/IL2010/001042.
International search report dated Jun. 6, 2011 for PCT/IL2011/000131.
International search report dated Aug. 10, 2011 for PCT/IL2010/000786.
International search report dated Nov. 14, 2011 for PCT/IL2011/000424.
Kobayashi, et al. A continuous process for the synthesis of hexyl beta-D-glucoside in aqueous phase using immobilized-glucosidase and with 1-hexanolextractive product recovery. Biotechnology Letters. 2000; 22:1845-1848.
Kobayashi, et al. Synthesis of alkyl glycosides through b-glucosidase-catalyzed condensation in an aqueous-organic biphasic system and estimation of the equilibrium constants for their formation. Journal of Molecular Catalysis B: Enzymatic. 2000;11:13-21.
Kosswig, et al. A new Process for Obtaining Hydrogen Chloride from Dilute Hydrochloric Acid. Chemical Economy & Engineering Review. Jun. 1983; 15(6)(No. 169):30-33.
Lee, et al. Solvent Extraction of Zinc from Strong Hydrochloric Acid Solution with Alamine336. Bull. Korean Chem. Soc. 2009; 30(7):1526-1530.
Lin, et al. Liquid-Liquid Equilibria for Ternary Mixtures of Water + Ethanol with 1-Hexanol, Butyl Propionate, or Ethyl Caproate. J. Chem. Eng. Data. 2003; 48:587-590.
Liu, et al. Solvation of Extracted Complex Metal Acids. VII. An Improved Model. The Journal of Physical Chemistry. 1974; 78(25):2572-2575.
Mackenzie, et al. The solvent extraction of some major metals an overview. 2010.
Miller. Vapor-Liquid Equilibria below 0° C. of Hydrogen Chloride Solutions Saturated with Calcium Chloride. J. Chem. Eng. Data. 1990; 35:436-440.
Miller. Vapor-Liquid Equilibria of Water-Hydrogen Chloride Solutions below 0° C. J. Chem. Eng. Data 1983; 28:363-367.
Miller. Vapor-Liquid Equilibria of Water-Hydrogen Chloride-Sodium Chloride-Water Solutions below 0° C. J. Chem. Eng. Data. 1985; 30:296-301.
Pandey, et al. Lignin depolymerization and conversion: a review of thermochemical methods. Chemical Engineering and Technology. 2011; 34(1):29-41.
Poltoratskii, et al. Liquid-Vapor Equilibrium and Ionization of HCl in the System HCl-H2SO4-H2O at 298 K. Russian Journal of General Chemistry. 2002; 72(9):1339-1342.
Pospiech, et al. Studies on iron(III) removal from chloride aqueous solutions by solvent extraction and transport through polymer inclusion membranes with D2EHPA. Physicochem. Probl. Miner. Process. 2010; 44:195-204.
Readnour, et al. Thermodynamic Properties for the Dissociation of Bisulfate Ion and the Partial Molal Heat Capacities of Bisulfuric Acid and Sodium Bisulfate over an Extended Temperature Range. Inorganic Chemistry. Oct. 1969; 8(10):2174-2182.
Rinaldi, et al. Acid hydrolysis of cellulose as the entry point into biorefinery schemes. Chemsuschem. Dec. 21, 2009; 2(12):1096-1107.
Ritcey. Development of Industrial Solvent Extraction Processes. Taylor & Francis Group, LLC. 2004.
Robbins, et al. Liquid-Liquid Extraction Operations and Equipment. Sec. 15. 2009.
Rutten, et al. Measurements of the heats of dilution and description of the system $H_2O/H_2SO_4$/HCl with a solvation model. Fluid Phase Equilibria. 1998; 153:317-340.

(56) References Cited

OTHER PUBLICATIONS

Sarangi, et al. Removal/recovery of hydrochloric acid using alamine 336, aliquat 336, TBP and cyanex 923. Hydrometallurgy. 2006; 84(3-4):125-129.

Schlea, et al. Extraction of Iron, Cobalt, and Nickel Sulfates by Organic liquids. Industrial and engineering chemistry. Jun. 1957; 49(6):1056-1057.

Schoenemann. The New Rheinau Wood Saccharification Process. Institute of Chemical Technology. Jul. 27, 1953; 1-49.

Segatin, et al. Thermodynamics of the Solubility of Water in 1-Hexanol, 1-Octanol, 1-Decanol, and Cyclohexanol. Monatshefte fur Chemie. 2004; 135:241-248.

Shimizu, et al. Integrated process for total utilization of wood components by steam-explosion pretreatment. Biomass and bioenergy. 1998; 14(3):195-203.

Shorr, et al. Phase equilibria and the telomerization reaction. I & EC Fundamentals. 1963; 39(1):86-87.

Starr, et al. Water-enhanced solubility of carboxylic acids in organic solvents and its applications to extraction processes. Lawrence Berkeley Laboratory, University of California, Nov. 1991.

Zahalka, et al. Esterification of 1,4-dichlorobutane with sodium formate under solid-liquid phase transfer catalysis. A kinetic study. Can. J. Chem. 1989; 67:245-249.

Zahalka, et al. One-Pot Conversion of Primary Alkyl Chlorides and Dichlorides into Alcohols, Diols and Ethers via Formic Ester Intermediated under Phase-Transfer Conditions. Communications, Sep. 1986; 763-765.

Zhang, et al. Vapor Pressure Measurements for the $H_2SO_4/HNO_3/H_2O$ and $H_2SO_4/HCl/H_2O$ Systems: Incorporation of Stratospheric Acids into Background Sulfate Aerosols. J. Phys. Chem. 1993; 97:8541-8548.

Zhang, et al. Vapor-Liquid Equilibria for Water + Hydrochloric Acid + Magnesium Chloride and Water + Hydrochloric Acid + Calcium Chloride Systems at Atmospheric Pressure. Chinese J. Chem. Eng. 2006; 14(2):276-280.

Zolotov. Hydration and solvation of acids and salts undergoing extraction. Russ. Chem. Rev. 1963; 32:107-116.

Zou, et al. Preparation of Activated Carbons from Chinese Coal and Hydrolysis Lignin. Adsorption Science & Technology. 2001; 19(1): 59-72.

Aden, et al. Lignocellulosic Biomass to Ethanol Process Design and Economics Utilizing Co-Current Dilute Acid Prehydrolysis and Enzymatic Hydrolysis for Corn Stover. National Renewable Energy Laboratory, NREL is a U.S. Department of Energy LaboratoryOperated by Midwest Research Institute. Jun. 2002.

Adina, et al. Application Of FTIR Spectroscopy For A Rapid Determination Of Some Hydrolytic Enzymes Activity On Sea Buckthorn Substrate. Romanian Biotechnological Letters. 2010; 15(6):5738-5744.

Ahmed, et al. A simplified method for accurate determination of cell wall uronide content. Journal of Food Biochemistry.1977; 1:361-365.

Ahmed, et al. Preparation and studies on immobilized α-glucosidase from baker's yeast *Saccharomyces cerevisiae*. J. Serb. Chem. Soc. 2007; 72(12):1255-1263.

Albersheim. Metabolism of the Pectic Substances. For the degree of Doctor of Philosophy, California Institute of Technology Pasadena, California, 1959.

Albertson, et al. Addition Compounds of Sulfur Dioxide. Sep. 1943; 65:1687-1690.

Alizadeh, et al. Pretreatment of Switchgrass by Ammonia Fiber Explosion (AFEX). Applied Biochemistry and Biotechnology. 2005; 5(121-124):1133-1142.

Allsopp, et al. 130. The constitution of the cambium, the new wood and the mature sapwood of the common ash, the common elm and the scotch pine. May 10, 1940; 1078-1084.

Amidon, et al. Biorefinery: Conversion of Woody Biomass to Chemicals, Energy and Materials. Journal of Biobased Materials and Bioenergy. 2008; 2:100-120.

Anderson. The isolation of pectic substances from wood. 1935; 531-539.

Antonoplis, et al. High pressure HCl conversion of cellulose to glucose. Lawrence Berkeley National Laboratory, University of California, Paper LBL,14221. Aug. 1981.

Atalla, et al. Analysis of Lignin and Cellulose in Biological Energy Sources by Raman Microscopy. 2011.

Atchison, et al. Innovative Methods for Corn Stover Collecting, Handling, Storing and Transporting, Mar. 2003. National Renewable Energy Laboratory. Apr. 2004.

Atsuki. Action of highly concentrated hydrochloric acid on cellulose. Seniso Kogyo (1925), 1 53-61. CODEN: SKOGBJ ISSN: 0371-070X. Abstract only.

Badger. Ethanol from cellulose: a general review. Trends in new crops and new uses. 2002; 17-21.

Bakker. Advanced physical/chemical fractionation. Workshop of the EU FP6, Integrated Project Biosynergy. Nov. 17, 2011.

Barta, et al. Catalytic disassembly of an organosolv lignin via hydrogen transfer from supercritical methanol.

Bayat-Makooi, et al. Hydrolysis of cellulose with hydrochloric acid enhanced by cations. Dep. Wood Paper Sci., North Carolina State Univ., Raleigh, NC, USA. Editor(s): Kennedy, John F. Cellul. Its Deriv. (1985), 135-41. Publisher: Horwood, Chichester, UK CODEN: 54GPAW. Abstract only.

Beck, et al. Production of ethanol by bioconversion of wood sugars derived from two-stage dilute acid hydrolysis of hardwood. Biomass. 1984; 6:101-110.

Bergius. Conversion of wood to carbohydrates and problems in the industrial use of concentrated hydrochloric acid. Industrial and Engineering chemistry. 1937; 29(3):247-253.

Bergius. The utilisation of wood for the production of foodstuffs, alcohol and glucose. Chemical society institution. Nov. 15, 1933.

Bergius. Winslow Notes on Bergius Process. 1937.

Bergius. Wood Sugar Plants at Mannheim-Rheinau & Regensburg. 1945.

Berndes, et al. The contribution of biomass in the future global energy supply: a review of 17 studies. Biomass and Bioenergy. 2003; 25:1-28.

Berthold, et al. Association of water to polar groups; estimations by an adsorption model for ligno-cellulosic materials. Colloids Surfaces A:Physicochem. Eng. Aspects. 1996; 112:117-129.

Bilanicova, et al. Improvements in Enzymatic Preparation of Alkyl Glycosides. Czech J. Food Sci. 20101 28(1): 69-73.

Binder, et al. Mechanistic insights on the conversion of sugars into 5-hydroxymethylfurfural. Energy Environ. Sci., 2010; 3:765-771.

Bochek. Effect of Hydrogen Bonding on Cellulose Solubility in Aqueous and Nonaqueous Solvents. Russian Journal of Applied Chemistry, vol. 76, No. 11, 2003, pp. 1711-1719.

Bozell. The Use of Renewable Feedstocks for the Production of Chemicals and Materials—A Brief Overview of Concepts. National Renewable Energy Laboratory, 1617 Cole Boulevard, Golden, CO 80401. 2010.

Bridgwater, et al. Identification and market analysis of most promising added-value products to be co-produced with the fuels. Project No. 212831, Project end date: May 31, 2010; 1-132.

Brito, et al. Chemical composition changes in eucalyptus and pinus woods submitted to heat treatment. Bioresource Technology. 2008; 99:8545-8548.

Brown, et al. Initial Market Assessment for Small-Scale Biomass-Based CHP, Prepared under Task No. WF6N.1050. National Renewable Energy Laboratory. Jan. 2008.

Brown. Determination of Dry Substance in Beet Sugar Juices, A Precision Method. Industrial and Engineering chemistry. Jul. 1924; 16(7):746-748.

Brownell, et al. Steam-Explosion Pretreatment of Wood: Effect of Chip Size, Acid, Moisture Content and Pressure Drop. Biotechnology and Bioengineering. 1986; XXVIII:792-801.

Brummer, et al. Understanding Carbohydrate Analysis. Chapter 2. Copyright 2005 by Taylor & Francis Group, LLC.

Brunner. Near critical and supercritical water. Part I. Hydrolytic and hydrothermal processes. J. of Supercritical Fluids. 2009; 47:373-381.

Bunker. The Wartime Production of Food Yeast in Germany. 2010.

(56) References Cited

OTHER PUBLICATIONS

Burchell, et al. The development of novel activated carbon composites. 17th Annual Conference on Fossil Energy Materials, Wyndham Baltimore Inner Harbor Hotel, Baltimore, Maryland, Apr. 22-24, 2003.
Bustos, et al. Modeling of the Hydrolysis of Sugar Cane Bagasse with Hydrochloric Acid. Applied Biochemistry and Biotechnology. 2003; 104:51-68.
Byrne. Expression, purification and crystallisation of membrane proteins. 2011.
Campa et al. Capillary Electrophoresis of Neutral Carbohydrates. Methods in molecular biology.2008; 384:247-305.
Campa et al. Capillary electrophoresis of sugar acids. Methods in molecular biology. 2008; 384: 307-355.
Campbell et al. The bleaching action of alkaline hydrogen peroxide on wood. The Biochemical journal. 1938; 32(4): 702-707.
Campbell,et al. The Saccharification of Wood by the Bergius process at Suddeutschen Holzversucherung Werke A.G. Regensburg. Report on visit to Suddeutschen Holzversucherung Werke A.G. Regensburg. CIOS trip No. 764, this target was visited on Aug. 9, 1945.
Campbell. The Degradation of wood by simultaneous action of ethyl alcohol and hydrochloric acid. 1929; 1225-1232.
Cardona, et al. Production of bioethanol from sugarcane bagasse: Status and perspectives. Bioresource Technology. 2010; 101:4754-4766.
Carole, et al. Opportunities in the Industrial Biobased Products Industry. Applied Biochemistry and Biotechnology. 2004; 113-116:871-88.
Carr. The Biobased Revolution: How Biotechnology and Policy Are Changing the Way Materials Are Made. ASC Fall Convention & Expo. Oct. 11, 2005.
Carvalho, et al. Comparison of different procedures for the detoxification of eucalyptus hemicellulosic hydrolysate for use in fermentative processes. J Chem Technol Biotechnol 2006; 81:152-157.
Carvelheiro, et al. Hemicellulose biorefineries: a review on biomass pretreatments. J Sci Ind Res. 2008; 67:849-864.
Cayle, et al. The application of Mathews' Formula in Enzymatic Starch Conversions. Mar. 1966; 43:237-244.
Celunol. EESI Congressional Briefing. Sept 22, 2006.
Chalov, et al. Continuous hydrolysis of plant tissue polysaccharides with 46-48% hydrochloric acid. III. Absorption of hydrogen chloride by moist wood. Izvestiya Vysshikh Uchebnykh Zavedenii, Lesnoi Zhurnal (1966), 9(6), 139-43. CODEN: IVZLAL ISSN: 0536-1036. Abstract only.
Chalov, et al. Continuous hydrolysis of plant tissue polysaccharides with 46-48% hydrochloric acid. IV. The problem of the limit concentration of sugars in the hydrolyzate. Sbornik Trudov, Vsesoyuznyi Nauchno-Issledovatel'skii Institut Gidroliza Rastitel'nykh Materialov (1965), 13 31-8. CODEN: SVGSAN ISSN: 0371-4322. Abstract only.
Chalov, et al. Continuous hydrolysis of plant tissues with 46-48% hydrochloric acid. VII. Composition of products of hydrolytic destruction of cellulose by concentrated hydrochloric acid. Zhurnal Prikladnoi Khimii (Sankt-Peterburg, Russian Federation) (1967), 40(4), 929-30. CODEN: ZPKHAB ISSN: 0044-4618. Abstract only.
Chalov, et al. Continuous hydrolysis of plant tissues with 46-48% hydrochloric acid. II. Effect of hydrogen chloride on oven-dry wood. Izv. Vysshikh Uchebn. Zavedenii, Lesn. Zh. (1963), 6(2), 141-4. Abstract only.
Chalov, et al. Continuous hydrolysis of wood with 46-48% hydrochloric acid. 1962), 5(No. B), 141-8. CODEN: IVZLAL ISSN: 0536-1036. Abstract only.
Chalov, et al. Differential hydrolysis of wood with concentrated hydrochloric acid in diffusion equipment. 1961), 4(6), 138-46. CODEN: IVZLAL ISSN: 0536-1036. Abstract only.
Chalov, et al. Equilibrium state in the system cellulose-hydrogen chloride-water-hydrolysis products. USSR. Sb. Tr. Vses. Nauch.-Issled. Inst. Gidroliza Rastit. Mater. (1968), 17 173-9. From: Ref. Zh., Khim 1969, Abstr. No. 15p23. Abstract only.
Chalov, et al. Hydrolysis of difficult-to-hydrolyze polysaccharides of wood with 30-6% hydrochloric acid at 20-40.deg. USSR. Sb. Tr. Vses. Nauch.-Issled. Inst. Gidroliza Rast. Mater. (1969), 18 58-66. From: Ref. Zh., Khim 1970, Abstr. No. 11P29. Abstract only.
Chalov, et al. Hydrolysis of hemicellulose components of pinewood with 30-36% hydrochloric acid. Zhurnal Prikladnoi Khimii (Sankt-Peterburg, Russian Federation) (1961), 34 1601-8. CODEN: ZPKHAB ISSN: 0044-4618. Abstract only.
Chalov, et al. Hydrolysis of hemicellulose components of pinewood with 30-36% hydrochloric acid at 30-40.deg. Gidroliznaya i Lesokhimicheskaya Promyshlennost (1968), 21(3), 4-6. CODEN: GLKPA2 ISSN: 0016-9706. Abstract only.
Chalov, et al. Hydrolysis of lignocellulose with 38-41% hydrochloric acid at 20°. Vysshikh Uchebn. Zavedenii, Lesn. Zh. (1964), 7(2), 137-43. Abstract only.
Chalov, et al. Hydrolysis of pinewood lignocellulose with 41% hydrochloric acid in a [6−] diffuser unit. Izvest. Vysshikh Ucheb. Zavedenii, Lesnoi Zhur. (1961), 4(No. 2), 131-7. Abstract only.
Chalov, et al. Hydrolysis of polysaccharides of pinewood with 38-41% hydrochloric acid at 20°. Zhurnal Strukturnoi Khimii (1962), 35(No. 6), 1347-55. CODEN: ZSTKAI ISSN: 0136-7463. Abstract only.
Chalov, et al. Hydrolysis of polysaccharides of plant fiber in concentrated aqueous and gaseous hydrochloric acid. Zhurnal Prikladnoi Khimii (Sankt-Peterburg, Russian Federation) (1960), 33 2743-50. CODEN: ZPKHAB ISSN: 0044-4618. Abstract only.
Chalov, et al. Hydrolysis of wood with concentrated hydrochloric acid. Gidroliznaya i Lesokhimicheskaya Promyshlennost (1959), 12(No. 4), 1-4. Abstract only.
Chalov, et al. Hydrolysis of wood with concentrated hydrochloric acid. Gidroliz. i Lesokhim Prom. (1959), 12(No. 3), 3-5. Abstract only.
Chalov, et al. Hydrolysis of wood with gaseous hydrochloric acid under atmospheric pressure. Gidroliznaya i Lesokhimicheskaya Promyshlennost (1959), 12 14-18. Abstract only.
Chalov, et al. Two-stage hydrolysis of wood by use of mechanochemical degradation of lignocellulose in the presence of hydrochloric acid. Sbornik Trudov. Gosudarstvennyi Nauchno-issledovatel'skii Institut Gidroliznoi i Sul'fitno-spirtovoi Promyshlennosti (1966), 15 189-98. CODEN: SGSSAC. Abstract only.
Chalov, et al. Withdrawal of the heat of absorption during hydrolysis of wood with gaseous hydrogen chloride. 1962), 5(No. 1), 155-62. CODEN: IVZLAL ISSN: 0536-1036. Abstract only.
Chalov. Sorption of Hydrogen Chloride by moist lignocellulose. SB. TR. VNII Gidroliza Rastitel'n. Mater. 1975; 25:41-49.
Chambost, et al. Guided tour: Implementing the forest biorefinery (FBR) at existing pulp and paper mills. Pulp & Paper Canada. 2008; 109(7):1-9.
Chandra, et al. Substrate Pretreatment: The Key to Effective Enzymatic Hydrolysis of Lignocellulosics? Adv Biochem Engin/Biotechnol. 2007; 108: 67-93.
Chang, et al. Modification of wood with isopropyl glycidyl ether and its effects on decay resistance and light stability. Bioresource Technology. 2006; 97:1265-1271.
Chaow-U-Thai et al. Removal of ash from sugarcane leaves and tops. International Journal of Biosciences.2012; 2(5): 12-17.
Cheng et al. A novel method to prepare L-arabinose from xylose mother liquor by yeast-mediated biopurification. Microbial cell factories.2011; 10 (43): 1-11.
Claricone Clarifiers and FiltraCone treatment plants. CB&I. Accessed Nov. 30, 2011.
Coetzee, et al. Determination of pectin content of eucalyptus wood. Holzforschung. 2011; 65:327-331.
Cole. XCV. The determination of reducing sugars by titration of ferricyanide. Biochem. 1933 xxvii, pp. 723-726.
Coma, et al. alpha-Glucosidase and N-Acetyl-p-o-glucosaminidase Isoenzymes in Serum. Clin. Chem. 1992; 38(2):223-226.
Conner, et al. Kinetic modeling of hardwood prehydrolysis. Part II. Xylan removal by dilute hydrochloric acid prehydrolysis. Wood and Fiber Science. 1985; 17(4):540-548.
Cui. Structural Analysis of Polysaccharides. Chapter 3. Copyright 2005 by Taylor & Francis Group, LLC.

(56) References Cited

OTHER PUBLICATIONS

Curtis, et al. Equilibria in furfural-water systems under increased pressure and the influence of added salts upon the mutual solubilities of furfural and water. 1948; 213-235.
David, et al. Cross-Polarization/Magic Angle Spinning (CP/MAS) 13C Nuclear Magnetic Resonance (NMR) Analysis of Chars from Alkaline-Treated Pyrolyzed Softwood. Energy & Fuels. 2009; 23:498-501.
De Wild, et al. Pyrolysis of Wheat Straw—Derived Organosolv Lignin. Ch. 5, pp. 101-122. 2011.
Demirbas. Furfural Production from Fruit Shells by Acid-Catalyzed Hydrolysis, Energy Sources, Part A: Recovery, Utilization, and Environmental Effects. 2006; 28(2):157-165.
Demirbas. Products from lignocellulosic materials via degradation processes. Energy Sources, Part A. 2008; 30:27-37.
Dimov, et al. Influence of the amount and concentration of hydrochloric acid on the composition of wheat straw during pre-hydrolysis. Chem. Technol. Inst., Sofia, Bulg. Papier (Paris) (1960), 14 673-6. CODEN: PPERA3 ISSN: 0370-1174. Abstract only.
Dipardo. Outlook for Biomass Ethanol Production and Demand. Energy Information Administration. 2008; 1-14.
Doorn, et al. CID-Based ICP-AES Instrumantation for Cntinuous On-Line Analysis of Aqueous Industrial Waste Streams. Conference report. 1997; Vancouver (Canada).
Draucker. Novel solvent systems for the development of sustainable technologies. Georgia Institute of Technology. Aug. 2007.
Duque. Acid-functionalized nanoparticles for hydrolysis of lignocellulosic feedstocks. Master of Science, Department of Biological and Agricultural Engineering, College of Engineering, Kansas State University, Manhattan, Kansas. 2009.
Dyadic. AlternaFuel® 200P, Product #326, (For considerations in biomass saccharification applications). 2010.
Dyadic. Enzyme Development for Fuel Ethanol Production from Pre-treated Biomass, Technical Report May 2010, Saccharification I.D: Sacc 05.17.10.
Eggeman, et al. Process and economic analysis of pretreatment technologies. Bio. Tech. 2005; 96:2019-2025.
Ehara, et al. A comparative study on chemical conversion of cellulose between the batch type and flow type systems in supercritical water. Cellulose. 2002; 9:301-311.
Elliott, et al. Pretreatment technologies for advancing anaerobic digestion of pulp and paper biotreatment residues. Water Research. 2007; 41:4273-4286.
Esteves, et al. Chemistry and ecotoxicity of heat-treated pine wood extractives. Wood Sci Technol. Jul. 11, 2010. DOI 10.1007/s00226-010-0356-0.
Excoffier, et al. Saccharification of Steam-Exploded Poplar Wood. Biotechnology and bioengineering. Dec. 20, 1991; 38(11):1308-1317.
Farrell, et al. Solving Pitch Problems in Pulp and Paper Processes by the Use of Enzymes or Fungi. Advances in Biochemical Engineering/ Biochemical Engineering/1997/pp. 198-212.
Fenner, et al. Examination of the Thermal Decomposition of Kraft Pine Lignin by Transform Infrared Evolved Gas Analysis. J. Agric. Food Chem. 1981; 29:846-849.
Ferraz, et al. Estimating the chemical composition of biodegraded pine and eucalyptus wood by Drift spectroscopy and multivariate analysis. Bioresource Technology. 2000; 74:201-212.
Fierro, et al. Methodical study of the chemical activation of Kraft lignin with KOH and NaOH. Microporous and Mesoporous Materials. 2007; 101:419-431.
Foran, et al. Beyond 2025: Transitions to the biomass-alcohol economy using ethanol and methanol. Working Paper Series 99/07. Dec. 1999.
Foxit. Chemicals partition in wood. Mar. 2011.
Froass, et al. Nuclear Magnetic Resonance Studies. 4. Analysis of Residual Lignin after Kraft Pulping. Ind. Eng. Chem. Res. 1998; 37:3388-3394.
Fungsin, et al. Conversion of cassava waste into sugar using *Aspergillus niger* and *Trichoderma reesei* for ethanol production. 2010.
Galbe, et al. A review of the production of ethanol from softwood. Appl Microbiol Biotechnol. 2002; 59:618-628.
Galbe, et al. Process Engineering Economics of Bioethanol Production. Adv Biochem Engin/Biotechnol. 2007; 108:303-327.
Galego, et al. Mechanism of the thermal resinification of pure furfural . Revista Cenic, Ciencias Fisicas. 1975; 6(1):163-180. Abstract only.
Gamez et al. Study of the hydrolysis of sugar cane bagasse using phosphoric acid. Journal of Food Engineering.2006; 74: 78-88.
Garna, et al. Kinetic of the hydrolysis of pectin galacturonic acid chains and quantification by ionic chromatography. Food Chemistry. 2006; 96:477-484.
Genencor. Enzyme Products for Fuel Ethanol Production. Genencor, 2007 Danisco US Inc.
Georgieva, et al. Enzymatic hydrolysis and ethanol fermentation of high dry matter wet-exploded wheat straw at low enzyme loading. Applied biochemistry and biotechnology. 2008;148:35-44.
Georgopoulos, et al. Thermoplastic polymers reinforced with fibrous agricultural residues. 2009.
Glazkova, et al. Effect of temperature on the extraction of pre-hydrolysis products from lignocellulose chips. Gidroliznaya i Lesokhimicheskaya Promyshlennost (1974), (6), 12-13. CODEN: GLKPA2 ISSN: 0016-9706. Abstract only.
Goldstein, et al. The hydrolysis of cellulose with superconcentrated hydrochloric acid. Biotechnology and Bioengineering Symposium (1984), vol. Date 1983, 13(Symp. Biotechnol. Fuels Chem., 5th, 1983), 17-25. CODEN: BIBSBR ISSN: 0572-6565. Abstract only.
Goldstein. Potential for Converting Wood into Plastics, Chemicals from wood may regain importance as the cost of petroleum continues to rise. Science, Sep. 12, 1975; 189(4206):847-852.
Goncalves, et al. Hydroxymethylation and oxidation of Organosolv lignins and utilization of the products. Bioresource Technology. 2001; 79:103-111.
Gonzalez-Serrano, et al. Development of Porosity upon Chemical Activation of Kraft Lignin with ZnCl2. Ind. Eng. Chem. Res. 1997; 36:4832-4838.
Gonzalez-Serrano, et al. Removal of water pollutants with activated carbons prepared from H3PO4 activation of lignin from kraft black liquors. Water Research. 2004; 38:3043-3050.
Goto, et al. Supercritical Thermal Decomposition of Cellulose: Experiments and Modeling. Ind. Eng. Chem. Res. 1990; 29:1091-1095.
Grant, et al. Tall oil production and processing. Grant and Hockh's Chemical Dictionary 5th ed. 1987.
Gray, et al. Sugar Monomer and Oligomer Solubility, Data and Predictions for Application to Biomass Hydrolysis. Applied Biochemistry and Biotechnology. 2003; 105-108:179-193.
Grethlein, et al. The Cost of Ethanol Production from Lignocellulosic Biomass—A Comparison of Selected Alternative Processes . USDA. Specific Cooperative Agreement No. 58-1935-2-050. Apr. 30, 1993.
Gretland, et al. Characterisation of lignosulphonates and sulphonated kraft lignin by hydrophobic interaction chromatography. 2005.
Griffith, et al. Low cost carbon fiber for transportation application. USDE. 2003.
Gutierrez, et al. Analysis of Lipophilic extractives from wood and pitch deposits by solid-phase extraction and gas chromatography. J. of Chromatography A. 1998; 823:449-455.
Gutierrez, et al. Enzymatic Removal of Free and Conjugated Sterols Forming Pitch Deposits in Environmentally Sound Bleaching of Eucalypt Paper Pulp. Environ. Sci. Technol. 2006; 40:3416-3422.
Gutierrez, et al. Fungal Degradation of Lipophilic Extractives in *Eucalyptus globulus* Wood. Applied and environmental microbiology. Apr. 1999; 65(4):1367-1371.
Gutierrez, et al. Microbial and enzymatic control of pitch in the pulp and paper industry. Appl Microbiol Biotechnol. 2009; 82:1005-1018.
Gutierrez, et al. The biotechnological control of pitch in paper pulp manufacturing. Trends in Biotechnology. 2001; 19(9):340-348.
Haensel, et al. Pyrolysis of wood-based polymer compounds. J. Anal. Appl. Pyrolysis. 2010; 87:124-128.
Hage, et al. Effects of process severity on the chemical structure of *Miscanthus* ethanol organosolv lignin. Polymer Degradation and Stability. 2010; 95:997-1003.

(56) References Cited

OTHER PUBLICATIONS

Hagglund. Report of the research activities of the Cellulose Laboratory (Stockholm, Sweden) during the year 1941. Svensk Papperstidning (1942), 45 123-35. Abstract only.
Hagglund. The Decomposition of Wood by Acids wood Saccharification. Chemistry of Wood. New York: Academic Press, 1951. 631. Chapter IV. 390-413.
Hagglund. Wood Saccharification. A Modified Rheinau Process. 2011.
Hall, et al. Wood saccharification. USDA. Unasylva. 2007; 10(1).
Hall. Polyhydric alcohol from wood. US Department of Agriculture, Forest Service, Forest Products Laboratory, Madison, Wisconsin. No. 1984. Jul. 1954.
Hallac, et al. Biomass Characterization and Organosolv Pretreatment of *Buddleja davidii*. School of Chemistry and Biochemistry, Institute of Paper Science and Technology, Georgia Institute of Technology, Atlanta, GA. 2009.
Hallac, et al. Biomass Characterization of *Buddleja davidii*: A Potential Feedstock for Biofuel Production. J. Agric. Food Chem. 2009; 57(4):1275-1281.
Hallac, et al. Chemical Transformations of *Buddleja davidii* Lignin during Ethanol Organosolv Pretreatment. Energy Fuels. 2010; 24:2723-2732.
Hallac. Fundamental understanding of the biochemical conversion of *Buddleja davidii* to fermentable sugars. Georgia Institute of Technology. May 2011.
Hamelinck, et al. Ethanol from lignocellulosic biomass: techno-economic performance in short-, middle- and long-term. Biomass and Bioenergy. 2005; 28:384-410.
Hamelinck, et al. Production of advanced biofuels. International Sugar Journal. 2006; 108(1287):168-175.
Han, et al. Optimizing lignocellulosic feedstock for improved biofuel productivity and processing. Biofuels, Bioprod. Bioref. 2007; 1:135-146.
Harada, et al. Formation of Isoamylase by Pseudomonas. Applied Microbiology. Oct. 1968; 16(10):1439-1444.
Harris, et al. Hydrolysis of wood cellulose with hydrochloric acid and sulfur dioxide and the decomposition of its hydrolytic products. Journal of Physical and Colloid Chemistry. (1949), 53:344-51. Abstract only.
Harris. Derived products and chemical utilization of wood waste. Forest Products Laboratory; Forest Service US Department of Agriculture; Rept. No. R1666-10. Jun. 1949.
Hasegawa, et al. New Pretreatment Methods Combining a Hot Water Treatment and Water/Acetone Extraction for Thermo-Chemical Conversion of Biomass. Energy & Fuels. 2004; 18:755-760.
Hatcher. Dipolar-Dephasing $^{13}$C NMR Studies of Decomposed Wood and Coalified Xylem Tissue:Evidence for Chemical Structural Changes Associated with Defunctionalization of Lignin Structural Units during Coalification. Energy. Fuels. 1988; 2:48-58.
Havlik, et al. Atmospheric leaching of EAF dust with diluted sulphuric acid. Hydrometallurgy. 2004; doi:10.1016/j.hydromet. 2004.10.008.
Hawley, et al. Comparison of hydrogen fluoride saccharification of lignocellulosic materials with other saccarification technologies. Energy in Agriculture. 1983; 2:219-244.
Hayes, et al. The Biofine Process: Production of Levulinic Acid, Furfural and Formic Acid from Lignocellulosic Feedstocks. Biorefinery (8b). 2011.
Held. Catalytic conversion of renewable plant sugars to fungible liquid hydrocarbon fuels using the bioforming process. TAPPI IBBC session 3. Virent Energy systems. Oct. 15, 2009.
Hellenbrand et al. Integration of Wet Oxidation and Nanofiltration for Treatment of Recalcitrant Organics in Wastewater. Kinetic, Catalysts and Reaction Engineering; 1997; 36; 5054-5062.
Hendriks, et al. Pretreatments to enhance the digestibility of lignocellulosic biomass. Bioresource Technology. 2009; 100:10-18.
Heppolette, et al. Effect of a-methylation on the parameters characterizing hydrolysis in water for a series of halides and sulfonates. Canadian Journal of Chemistry. 1966; 44:677-684.
Herrera, et al. Effect of the hydrochloric acid concentration on the hydrolysis of sorghum straw at atmospheric pressure. Journal of Food Engineering.2004; 63:103-109.
Herrera, et al. Production of Xylose from Sorghum Straw Using Hydrochloric Acid. Journal of Cereal Science. 2003; 37:267-274.
Herty Advanced Materials Development Center. HCl Clean Tech Composite Sample—Extracted Wood Sample. 2010.
Hettenhaus et al. Cellulase Assessment Report and Recommendations for Future Work. Ethanol Production from Biomass Hydrolysis; NREL report; 1997.
Heuts, et al. Chrysosporium lucknowense cellulase production platform for applications in biorefineries. DYADIC® Netherlands. 2010.
Higgins, et al. Hydrolysis of cellulose using HCL: A comparison between liquid phase and gaseous phase processes. Agricultural wastes. 1982; 4:97-116.
Hinz, et al. Hemicellulase production in *Chrysosporium lucknowense* C1. Journal of Cereal Science. 2009; 50(3):318-323. doi:10.1016/j.jcs.2009.07.005.
Hirst, et al. CCCLXXXII.—The action of highly concentrated hydrochloric acid on cellulose and on some derivatives of glucose and of xylose. 1923; 3226-3235.
Hodge. Chemistry of Browning Reactions in Model Systems. Agricultural and Food Chemistry. Oct. 14, 1953; 1(15):928-943.
Holm, et al. Ionic Liquids in the Pretreatment of Lignocellulosic Biomass. chapter 24, 545-560. 2011.
Holota, et al. One-stage hydrolysis of beechwood sawdust by gaseous hydrogen chloride. Vyskum (1967), (2), 105-18. CODEN: DRVYAP ISSN: 0012-6136.
Hou-Rui, et al. Novel Isolates for Biological Detoxification of Lignocellulosic Hydrolysate. Appl Biochem Biotechnol 2009; 152:199-212.
Howarth, et al. Methane and the greenhouse-gas footprint of natural gas from shale formations, A letter. Climatic Change, Accepted: Mar. 13, 2011, DOI 10.1007/s10584-011-0061-5.
Hu, et al. Chemical profiles of switchgrass. Bioresource Technology. 2010; 101:3253-3257.
Huber, et al. Synthesis of Transportation Fuels from Biomass: Chemistry, Catalysts, and Engineering. Chemical Reviews. Published on Web Jun. 27, 2006 PAGE EST: 54.3, 10.1021/cr068360d.
Huber. Breaking the Chemical and Engineering Barriers to Lignocellulosic Biofuels: Next Generation. Based on the: Jun. 25-26, 2007 ,Workshop, Washington D.C.
Hunag, et al. A review of separation technologies in current and future biorefineries. Separation and Purification Technology. 2008; 62:1-21.
Hyttinen, et al. Comparison of VOC emissions between air-dried and heat-treated Norway spruce (*Picea abies*), Scots pine (*Pinus sylvesteris*) and European aspen (*Populus tremula*) wood. Atmospheric Environment. 2010; 44:5028-5033.
Ibarra, et al. Isolation of high-purity residual lignins from eucalypt paper pulps by cellulase and proteinase treatments followed by solvent extraction. Enzyme and Microbial Technology. 2004; 35:173-181.
Ibrahim, et al. Comparison of alkaline pulping with steam explosion for glucose production from rice straw. Carbohydrate Polymers. 2011; 83:720-726.
Intechfibres. Microscopic Analysis of pulps, papers and boards: For a Fundamental Knowledge of Fibre Structure. IntechFibers, research in fibers Nov. 2007.
Iranmahboob, et al. Optimizing acid-hydrolysis: a critical step for production of ethanol from mixed wood chips. Biomass and Bioenergy. 2002; 22:401-404.
Itzkowitz. Biodiesel from sugars. 2011.
Izydorczyk, et al. Polysaccharide Gums: Structures, Functional Properties, and Applications. Chapter 6. Copyright 2005 by Taylor & Francis Group, LLC.
Izydorczyk. Understanding the Chemistry of Food Carbohydrates. Chapter 1. Copyright 2005 by Taylor & Francis Group, LLC.
Jacobsen et al. Xylose Monomer and Oligomer Yields for Uncatalyzed Hydrolysis of Sugarcane Bagasse Hemicellulose at Varying Solids Concentration. Industrial & Engineering Chemistry Research; 2002; 41; 1454-1461.

(56) References Cited

OTHER PUBLICATIONS

Jacobsen, et al. Cellulose and Hemicellulose Hydrolysis Models for Application to Current and Novel Pretreatment Processes. Applied Biochemistry and Bio. 2000; 8486:81-96.
Jiang, et al. Perdeuterated pyridinium molten salt (ionic liquid) for direct dissolution and NMR analysis of plant cell walls. Green Chem. 2009; 11:1762-1766.
Johnson. Effects of Dilute Acid Hydrolyzate Components on Glucose Degradation. National Bioenergy Center, NREL, 1617 Cole Blvd., Golden, Colorado 80401, USA. 2011.
Kadam, et al. Generating Process and Economic Data Needed for Preliminary Design of PureVision Biorefineries. DOE Project No. DE-FG36-05GO85004, Final Nonproprietary Technical Report. Dec. 28, 2007.
Kaewwongsa, et al. Intestinal digestibility of the residual components of cassava pulp solid state fermentation by *Saccharomyces cerevisiae*. Suranaree J. Sci. Technol. 2009; 16(4):291-296.
Kamm, et al. Chemical and biochemical generation of carbohydrates from lignocellulose-feedstock (*Lupinus nootkatensis*)—quantification of glucose. Chemosphere. 2006; 62:97-105.
Kamm, et al. Definition and technical status of Biorefineries. BioreFuture 2008, Tuesday Feb. 12, 2008, Brussels.
Katzen, et al. A View of the History of Biochemical Engineering. Advances in Biochemical Engineering/Biotechnology. 2000; 70:77-91.
Kauko. Similarity of the action of hydrochloric acid upon cellulose and humus. Ann. acad. sci. Fennicae (1927), 26A(No. 15), 3-7. Abstract only.
Kauper. Sulfur-free lignin from alkaline pulping as emulsifiers. The international Lignin Institute, 5th international Forum' Sep. 7, 2000, Bordeaux (France).
Keller, et al. Microbial Pretreatment of Biomass, Potential for Reducing Severity. Applied Biochemistry and Biotechnology. 2003; 105-108:27-41.
Khan, et al. Kinetic Study on Palm Oil Waste Decomposition. Biofuel's Engineering Process Technology. 2011. Chapter 22, pp. 523-536.
Khan, et al. Protobind 1075—An Indigenous Economical and Eco-friendly Renewable Raw Material for the Plywood Industry. 2011.
Kim, et al. Continuous Countercurrent Extraction of Hemicellulose from Pretreated Wood Residues. Applied Biochemistry and Biotechnology. 2001; 91-93:253-267.
Kim, et al. Enzyme hydrolysis and ethanol fermentaion of liquid hot water and AFEX pretreated distillers' grains at high-solid loadings. Bio. Tech. 2008; 99:5206-5215.
Kim, et al. Pretreatment and fractionation of corn stover by ammonia recycle percolation process. Bioresource Technology. 2005; 96:2007-2013.
Kim, et al. Pretreatment of Corn Stover by Low-Liquid Ammonia Recycle Percolation Process. Applied Biochemistry and Biotechnology. 2006; 133:41-57.
Kim, et al. Supercritical CO2 pretreatment of lignocellulose enhances enzymatic cellulose hydrolysis. Bioresource Technology. 2001; 77:139-144.
Kimberley, et al. A colorimetric method for the quantitation of galacturonic acid. Applied biochemistry and biotechnology. 1993; 43:51-54.
Kinders, et al. Saccharification of HCl-treated substrate provided by HCL-Cleantech, Technical Report, Mar. 2010. Dyadic International Inc. // Confidential and Proprietary Information.
Kintner III, et al. Carbohydrate Interference and Its Correction in Pectin Analysis Using the m-Hydroxydiphenyl Method. Journal of Food Science. 1982; 47:756-759.
Kjellstrand, et al. Development of toxic degradation products during heat sterilization of glucose-containing fluids for peritoneal dialysis: influence of time and temperature. Perit Dial Int. 1995;15(1):26-32.
Korotkov, et al. Continuous hydrolysis of plant tissues with 46-48 hydrochloric acid. VI. The effect of heat on wood saturated with gaseous hydrogen chloride, with simultaneous increase of the partial pressure of hydrogen chloride. Sbornik Trudov, Vsesoyuznyi Nauchno-Issledovatel'skii Institut Gidroliza Rastitel'nykh Materialov (1965), 14 180-91. Abstract only.
Koski. Applicability of crude tall oil for wood protection. Acta Univ. Oul. C 293, 2008, Oulun Yliopisto, Oulu 2008.
Kovalev, et al. Reaction of sprucewood pulp with hydrogen chloride dissolved in dichloroethane. Sbornik Trudov Ukrainskogo Nauchno-Issledovatel'skogo Instituta Tsellyulozno-Bumazhnoi Promyshlennosti (1966), No. 9 51-69. CODEN: SUTBAU ISSN: 0453-8560. Abstract only.
Krall, et al. Pectin Hydrolysis: Effect of Temperature, Degree of Methylation, pH, and Calcium on Hydrolysis Rates. J. Agric. Food Chem. 1998; 46:1311-1315.
Kribble, et al. The Electromotive Force Measurements of Hydrochloric Acid Solutions with and without Sucrose and their Relation to the Rate of Sucrose Hydrolysis. Jan. 1935; 57:19-22.
Kubo, et al. Preparation of carbon fibers from softwood lignin by atmospheric acetic acid pulping. Carbon. 1998; 36(7-8):1119-1124.
Kubo, et al. Surface Porosity of Lignin/PP Blend Carbon Fibers. Journal of Wood Chemistry and Technology. 2007; 27: 257-271.
Kubo, et al. Thermal Decomposition Study of Isolated Lignin Using Temperature Modulated TGA. Journal of Wood Chemistry and Technology. 2008; 28(2):106-121.
Kucuk, et al. Biomass Conversion Processes. Energy Conyers. Mgmt. 1997; 38(2):151-165.
Kumar, et al. Effect of Enzyme Supplementation at Moderate Cellulase Loadings on Initial Glucose and Xylose Release From Corn Stover Solids Pretreated by Leading Technologies. Biotechnology and Bioengineering. Feb. 1, 2009; 102(2):457-567.
Kumar, et al. Methods for Pretreatment of Lignocellulosic Biomass for Efficient Hydrolysis and Biofuel Production. Ind. Eng. Chem. Res. 2009; 48:3713-3729.
Kunamneni, et al. Fungal laccase—a versatile enzyme for biotechnological applications. Communicating Current Research and Educational Topics and Trends in Applied Microbiology. 2007; 233-245.
Kusama, et al. Wood saccharification by gaseous hydrogen chloride. Chisso Corp., Tokyo, Kogyo Kagaku Zasshi. 1966. Parts 1-V and VIII. Abstracts only.
Laine. Structures of hemicelluloses and pectins in wood and pulp. degree of Doctor of Science, Helsinki University of Technology,Department of Chemical Technology, Laboratory of Organic Chemistry, Espoo, Finland, 2005.
Lam, et al. Kinetic Modeling of Pseudolignin Formation in Steam Exploded Woody Biomass. 2011.
Lam. Steam explosion of biomass to produce durable wood pellets. The University of British Columbia (Vancouver). May 2011.
Lange, et al. Lignocellulose conversion: an introduction to chemistry, process and economics. Biofuels, Bioprod. Bioref. 2007; 1:39-48.
Lapan, et al. Hydrochloric and sulfuric acid hydrolyzates of fir wood. Izvestiya Nauchno-Issledovatel'skogo Instituta Nefte- i Uglekhimicheskogo Sinteza pri Irkutskom Universitete (1970), 12 102-4. CODEN: INEUBO ISSN: 0367-9195. Abstract only.
Lavarack, et al. The acid hydrolysis of sugarcane bagasse hemicellulose to produce xylose, arabinose, glucose and other products. Biomass and Bioenergy. 2002; 23:367-380.
Lebedev, et al. Hydrolysis of cellulose with concentrated hydrochloric acid at different temperatures. Sb. Tr., Gos. Nauchn.-Issled. Inst. Gidrolizn i Sul'fitno-Spirt. Prom. (1961), 9 7-19. Abstract only.
Lebedev, et al. Hydrolysis of wood with concentrated hydrochloric acid solutions at different temperatures. Sb. Tr., Gos. Nauchn.-Issled. Inst. Gidrolizn i Sul'fitno-Spirt. Prom. (1961), 9 20-35. Abstract only.
Lee, et al. Dilute-Acid Hydrolysis of Lignocellulosic Biomass. Advances in Biochemical Engineering/ Biotechnology. 1999; 65:93-115.
Lee, et al. Ionic Liquid-Mediated Selective Extraction of Lignin From Wood Leading to Enhanced Enzymatic Cellulose Hydrolysis. Biotechnology and Bioengineering. Apr. 1, 2009; 102(5):1368-1376.
Leonard, et al. Fermentation of wood sugars to ethyl alcohol. US Department of Agriculture, Forest Service, Forest Products Laboratory, Madison, Wisconsin. No. R1466. Dec. 1944.
Leschinsky, et al. Detailed Mass Balance of the Autohydrolysis of Eucalyptus Globulus at 170C. BioResources. 2009; 4(2): 687-703.

(56) References Cited

OTHER PUBLICATIONS

Leshchuk, et al. Continuous hydrolysis of plant tissue with 45-48% hydrochloric acid. V. Equilibrium in the system polysaccharides-hydrolysis products-hydrochloric acid. Gidrolizn i Lesokhim Prom. (1965), 18(5), 10-13. Abstract only.

Leshchuk, et al. Intensification of differential hydrolysis of softwood with concentrated hydrochloric acid in a diffusion apparatus. USSR. Sb. Tr. Vses. Nauch.-Issled. Inst. Gidroliza Rast Mater. (1968), 17 16-73. From: Ref. Zh., Khim 1969, Abstr. No. 17P20. Abstract only.

Leshchuk, et al. Penetration of concentrated hydrochloric acid into the pores of wood particles and the formation of hydrolyzates within the particles. Sbornik Trudov. Gosudarstvennyi Nauchno-issledovatel'skii Institut Gidroliznoi i Sul'fitno-spirtovoi Promyshlennosti (1966), 15 156-67. CODEN: SGSSAC. Abstract only.

Li, et al. Acidolysis of Wood in Ionic Liquids. Ind. Eng. Chem. Res. 2010; 49(7):3126-3136.

Li, et al. Ethanol Organosolv Lignin-based Rigid Polyurethane Foam Reinforced with Cellulose Nanowhiskers. Institute of Paper Science and Technology. 2011.

Li, et al. Interaction of Supercritical Fluids with Lignocellulosic Materials. Ind. Eng. Chem. Res. 1988; 27:1301-1312.

Li, et al. Kraft Lignin-based Rigid Polyurethane Foam. Institute of Paper Science and Technology. 2011.

Li, et al. Lignin depolymerization/repolymerization and its critical role for delignification of aspen wood by steam explosion. Bioresource Technology 98 (2007) 3061-3068.

Li, et al. Steam explosion lignins; their extraction, structure and potential as feedstock for biodiesel and chemicals. Bioresource Technology. 2009.

Lin, et al. Ethanol fermentation from biomass resources: current state and prospects. Appl Microbiol Biotechnol. 2006; 69:627-642.

Liu, et al. Citrus Pectin: Characterization and Inhibitory Effect on Fibroblast Growth Factor-Receptor Interaction. J. Agric. Food Chem. 2001; 49:3051-3057.

Liu, et al. Effects of Lignin-Metal Complexation on Enzymatic Hydrolysis of Cellulose. J. Agric. Food Chem. 2010; 58:7233-7238.

Liu, et al. Partial flow of compressed-hot water through corn stover to enhance hemicellulose sugar recovery and enzymatic digestibility of cellulose. Bioresource Technology. 2005; 96:1978-1985.

Liu. Understanding Starches and Their Role in Foods. Chapter 7. Copyright 2005 by Taylor & Francis Group, LLC.

Locke. Chemical Conversion Products from wood. USDA. Aug. 1960.

Long, et al. Application of the Ho Acidity Function to kinetics and Mechanisms of acid Catalysis. Mar. 30, 1957; 935-1010.

Lora. GreenValue—Technologies and Products. GreenValueEnterprises LLC, Media, PA, USA. 2011.

Lora. Non-Wood Biorefinery Developments Outside North America. 2011.

Lora., et al. Autohydrolysis sf aspen milled wood lignin. AYMANC. An. J. Chem. 1980; 58:669-676.

Lynd, et al. Strategic Biorefinery Analysis: Analysis of Biorefineries, Jan. 24, 2002-Jul. 1, 2002. Subcontract Report, NREL/SR-510-35578, Jan. 10, 2005.

Mabee, et al. Updates on Softwood-to-Ethanol Process Development. Applied Biochemistry and Biotechnology, 2006;129-132:55-70.

Mai, et al. Biotechnology in the wood industry. Appl Microbiol Biotechnol; 2004; 63:477-494.

Manninen, et al. Comparing the VOC emissions between air-dried and heat-treated Scots pine wood. Atmospheric Environment. 2002; 36:1763-1768.

Marchal, et al. Conversion into acetone and butanol of lignocellulosic substrates pretreated by steam explosion. Biotechnology Letters. 1986; 8(5):365-370.

Marchal, et al. Large-Scale Enzymatic Hydrolysis of Agricultural Lignocellulosic Biomass. Part 2: Conversion into Acetone-Butanol. Bioresource Technology. 1992; 42:205-217.

Marker, et al. Optical properties of glucose. 2009.

Marone, et al. Effect of particle sizes on the kinetics of drying of a hydrochloric acid hydrolysate mass. Gidroliznaya i Lesokhimicheskaya Promyshlennost (1976), (3), 15. CODEN: GLKPA2 ISSN: 0016-9706. Abstract only.

Martin, et al. Engineering a mevalonate pathway in *Escherichia coli* for production of terpenoids. Nature Biotechnology. 2003; 21(7):796-802.

Martinez-Inigo, et al. Time course of fungal removal of lipophilic extractives from *Eucalyptus globulus* wood. Journal of Biotechnology. 2000; 84:119-126.

Martin-Sampedro, et al. Combination of steam explosion and laccase-mediator treatments prior to *Eucalyptus globulus* kraft pulping. Bioresource Technology 2011; 102:7183-7189.

Mascal, et al. Direct, High Yield Conversion of Cellulose into Biofuel. Angew. Chem. Int. Ed. 2008; 7:7924-7926.

Mascal, et al. High-Yield Chemical Conversion of Biomass into Biofuels and Value added Products. Clean Technology 2010, www.ct-si.org, ISBN 978-1-4398-3419-0. 124-127.

Mascal, et al. Towards the Efficient, Total Glycan Utilization of Biomass. ChemSusChem. 2009; 2:423-426.

Masura. A mathematical model for neutral sulfite pulping of various broadleaved wood species. Wood Science and Technology. 1998; 32:1-13.

McAloon, et al. Determining the Cost of Producing Ethanol from Corn Starch and Lignocellulosic Feedstocks. National Renewable Energy Laboratory, Contract No. DE-AC36-99-GO10337, NREL/TP-580-28893. Prepared under Task No. BFP1.7110. Oct. 2000.

McFeeters, et al. Measurement of Pectin Methylation in Plant Cell Walls. Analytical biochemistry. 1984; 139:212-2 17.

McKenzie, et al. Levulinic acid. Organic Syntheses, Coll. vol. 1, p. 335 (1941); vol. 9, p. 50 (1929). Apr. 29, 2010.

McMillan. Processes for Pretreating Lignocellulosic Biomass: A Review. NatioRnenaewlable Energy Laboratory, A Division of Midwest Research Institute, Operated for the U.S. Department of Energy, Under Contract No. DE-AC02-83CH 10093. Nov. 1992.

Membralox ceramic membrane products. Pall corporation. 2004; 1-12.

Menchikov, et al. An Effective Method for Alcohol Preparation by Hydrolysis of Organohalides in the Presence of Copper and its Salts in Aqueous DMSO. Mendeleev Commun. 1995; 5(6): 223-224.

Mendes, et al. Extraction of hemicelluloses prior to kraft cooking: a step for an integrated biorefinery in the pulp mill. XXI Tecnicelpa Conference and Exhibition/VI CIADICYP 2010. Oct. 12-15, 2010.

Mesfun. Integration of hot water extraction in biomass based CHP plants-possibilities for green-chemicals and increased electricity production. Integration of hot water extraction in biomass based CHP plants-possibilities for green-chemicals and increased electricity production. 2010.

Mielenz. Ethanol production from biomass: technology and commercialization status. Current Opinion in Microbiology. 2001; 4:324-329.

Mikkola, et al. Hydrolytic decomposition of glycosides in aqueous acids. ARKIVOC 2009 (iii) 39-53.

Miljkovic. Carbohydrates, Synthesis, Mechanisms, and Stereoelectronic Effects. Springer Science+Business Media, LLC 2009.

Miller. Characteristics and Availability of Commercially Important Woods, Chapter 1. Forest Products Laboratory. 1999. Wood handbook—Wood as an engineering.

Miller. Structure of Wood. Chapter 2. 2009.

Miller. Utilization of wood under Germany's four year plan. Forests Products Division, Bureau of Foreign and Domestic Commerce U.S. Department of Commerce, Washington. 2009; 495-503.

Minima, et al. Hydrolysis of various types of cellulosic raw materials with highly concentrated hydrochloric acid. I. Effect of time, temperature, and acid ratio on the yield of sugars. USSR. Strukt. Modif. Khlop. Tsellyul. (1966), No. 3 315-24. From: Ref. Zh., Khim. 1969, Abstr. No. 1P31. Abstract only.

Miyazawa, et al. Polysaccharide Hydrolysis Accelerated by Adding Carbon Dioxide under Hydrothermal Conditions. Biotechnol. Prog. 2005; 21:1782-1785.

(56) References Cited

OTHER PUBLICATIONS

Moelwyn-Hughes. The kinetics of the hydrolysis of certain glucosides, part 11: trehalose, umethylglucoside and tetramethyl-a-amethyglucoside. Nov. 23, 1928; 81-92.
Mooney, et al. The effect of initial pore volume and lignin content on the enzymatic hydrolysis of softwoods. Bioresource Technology. 1998; 64:113-119.
Moreschi, et al. Hydrolysis of Ginger Bagasse Starch in Subcritical Water and Carbon Dioxide. J. Agric. Food Chem. 2004; 52, 1753-1758.
Mosier, et al. Characterization of acid catalytic domains for cellulose hydrolysis and glucose degradation. Biotechnology and bioengineering, Sep. 20, 2002; 79(6):1-9.
Mosier, et al. Characterization of Dicarboxylic Acids for Cellulose Hydrolysis. Biotechnol. Prog. 2001; 17:474-480.
Mosier, et al. Features of promising technologies for pretreatment of lignocellulosic biomass. Bioresource Technology. 2005;96:673-686.
Munoz, et al. Bioethanol production from bio-organosolv pulps of *Pinus radiata* and *Acacia dealbata*. J Chem Technol Biotechnol. 2007; 82:767-774.
Mythili, et al. Synthesis, mechanical, thermal and chemical properties of polyurethanes based on cardanol. Bull. Mater. Sci. Jun. 2004 ;27(3):235-241.
Nagamatsu, et al. Cascade-type flow of lignocellulosic components through the phase-separation system. J. Adv. Sci. 2001; 13(3):517-520.
Nagy, et al. Characterization of CO2 precipitated Kraft lignin to promote its utilization. Green Chem. 2010; 12:31-34.
Nevell. The hydrolysis of cotton cellulose by hydrochloric acid in benzene. Dep. Polym. Fibre Sci., Univ. Manchester Inst. Sci. Technol., Manchester, UK. Carbohydrate Research (1976), 49 163-74. CODEN: CRBRAT ISSN: 0008-6215. Abstract only.
Nikam et al. Density and Viscosity Studies of Glucose and Fructose Solutions in Aqueous and in NH4CL. Journal of Molecular Liquids; 2000; 87; 97-105.
Nogueira, et al. Crude tall-oil sodium salts micellization in aqueous solutions studied by static and dynamic light scattering. Colloids and Surfaces A: Physicochemical and Engineering Aspects. 2001; 191: 263-268.
Norman, et al. LXXIV. Studies on pectin. V. The hydrolysis of pectin. May 1, 1930; 649-660.
Novozymes application sheet. Cellic® CTec2 and HTec2—Enzymes for hydrolysis of lignocellulosic materials, Fuel Ethanol. 2010.
Novozymes application sheet. CellicTM CTec and Htec, Advanced enzymes for hydrolysis of lignocellulosic materials. Novozymes A/S No. 2009-05048-01. 2009.
Novozymes. The key to the first commercially viable enzymes for cellulosic ethanol. 2010. www.bioenergy.novozymes.com.
NREL. Enzyme Sugar-Ethanol Platform Project. National Renewable Energy Laboratory, Operated for the U.S. Department of Energy by Midwest Research Institute • Battelle • Bechtel. 2010.
NWBC. Program, 3rd Nordic Wood Biorefinery Conference (NWBC 2011), Stockholm, Sweden, Mar. 22-24, 2011.
Nystrand. Feasibility of lignocellulose as feedstock for biological production of super absorbent polymers. Department of Physics, Chemistry and Biology Master's Thesis; Linköping University Department of Physics, Chemistry and Biology 581 83 Linköping. Oct. 2010.
Odincovs, et al. The influence of temperature on the hydrolysis of wood and cellulose with concentrated hydrochloric acid. Trudy Inst. Lesokhoz. Problem, Akad. Nauk Latv. S.S.R. (1951), No. 2 68-82. Abstract only.
Odintsov, et al. Hydrolysis of woods with concentrated acids. Lesokhimicheskaya Promyshlennost (1940), 3(No. 9), 14-19. Abstract only.
Oh, et al. Pretreatment of Lignocellulosic Biomass using Combination of Ammonia Recycled Percolation and Dilute-Acid Process. J. Int. Eng. Chem. 2002; 8(1):64-70.
Oliet, et al. Solvent effects in autocatalyzed alcohol-water pulping comparative study between ethanol and methanol as delignifying agents. Chemical Engineering Journal. 2002; 87:157-162.
Olsson, et al. Fermentation of lignocellulosic hydrolysates for ethanol production. Enzyme and Microbial Technology. 1996; 18:312-331.
On, et al. Studies on pulp and paper mill fiber residues as resources. (II). Studies on acid hydrolysis of sludge. Coll. Eng., Jeonbuk Univ., Jenzu, S. Korea. Polpu, Chongi Gisul (1985), 17(1) 38-44. CODEN: PCGIDY ISSN: 0253-3200. Abstract only.
Onda et al. Selective Hydrolysis of Cellulose and Polysaccharides into Sugars by Catalytic Hydrothermal Method Using Sulfonated Activated-carbon. Journal of Japan Petroleum Institue.2012; 55(2): 73-86.
Ong. Conversion of lignocellulosic biomass to fuel ethanol—a brief review. The planter koala lumpur. 2004; 80(941):517-524.
Palmqvist, et al. Fermentation of lignocellulosic hydrolysates. II: inhibitors and mechanisms of inhibition. Bioresource Technology. 2000; 74:25-33.
Pan, et al. Biorefining of Softwoods Using Ethanol Organosolv Pulping: Preliminary Evaluation of Process Streams for Manufacture of Fuel-Grade Ethanol and Co-Products. Biotechnology and bioengineering. May 20, 2005; 90(4).
Pan, et. al. Pretreatment of Lodgepole Pine Killed by Mountain Pine Beetle Using the Ethanol Organosolv Process: Fractionation and Process Optimization. Ind. Eng. Chem. Res. 2007;46: 2609-2617.
Papadopoulos, et al. The behavior of lignin during hydrolysis of sweetgum wood with concentrated hydrochloric acid at moderate temperatures. Dep. Wood Paper Sci., North Carolina State Univ., Raleigh, NC, USA. Holzforschung (1981), 35(6), 283-6. CODEN: HOLZAZ ISSN: 0018-3830. Abstract only.
Papadopoulous, et al. Behavior of sweetgum wood xylan and lignin during hydrolysis with concentrated hydrochloric acid at moderate temperatures. Dep. Wood Pap. Sci., North Carolina State Univ., Raleigh, NC, USA. Journal of Applied Polymer Science: Applied Polymer Symposium (1983), 37(Proc. Cellul. Conf., 9th, 1982, Part 2), 631-40. CODEN: JPSSDD ISSN: 0271-9460. Abstract only.
Papajannopoulous, et al. GC-MS analysis of oleoresin of three Greek pine species. Holz als Roh-und Werkstoff. 2001; 59:443-446.
Parisi. Advances in Lignocellulosics Hydrolysis and in the Utilization of the Hydrolyzates. Advances in Biochemical Engmeering/Biotechnology. 1989; 38:53-87.
Pasquini, et al. Extraction of lignin from sugar cane bagasse and *Pinus taeda* wood chips using ethanol-water mixtures and carbon dioxide at high pressures. J. of Supercritical Fluids. 2005; 36:31-39.
Pasquini, et al. Sugar cane bagasse pulping using supercritical CO2 associated with co-solvent 1-butanol/water. J. of Supercritical Fluids. 2005; 34:125-131.
Paszner, et al. High-yield Organosolv process for conversion of cellulosic biomass to ethanol. Fac. For., Dep. Harvest. Wood Sci., Vancouver, BC, Can. Energy from Biomass and Wastes (1989), 12 1297-318. CODEN: EBWADU ISSN: 0277-7851. Abstract only.
Patel, et al. Medium and long-term Opportunities and Risks of the Biotechnological Production of Bulk Chemicals from Renewable Resources—The Potential of White Biotechnology The BREW project. Utrecht University. Sep. 2006. www.chem.uu.nl/nws.
Pazur. Reversibility of enzymatic transglucosylation reactions. Received for publication, Jan. 17, 1955, pp. 531-538.
Pepper, et al. The Isolation of a Representative Lignin Fraction From Wood and Straw Meals. Canadian J. of Chemistry. 1962; 40:1026-1028.
Perlack, et al. Biomass as feedstock for a bioenergy and bioproducts industry: the technical feasibility of a billion-ton annual supply. U.S. Department of Energy, under contract DE-AC05-00OR22725. Apr. 2005.
Perng et al. Pilot Treatment of OCC-based Paper Mill Wastewater Using Pulsed Electrocoagulation. Water Qual. Res. J. Canada; 2007; 42(1); 63-71.
Perng et al. Treatment of a Specialty Paper Mill Wastewater Using a Pilot-scale Pulsed Electrocoagulation Unit. Taiwan J for Sci; 2007; 22(3); 355-366.
Pessoa Jr, et al. Acid hydrolysis of hemicellulose from sugarcane bagasse. Braz. J. Chem. Eng. vol. 14 No. 3 São Paulo Sep. 1997.

(56) References Cited

OTHER PUBLICATIONS

Peterson, et al. Thermochemical biofuel production in hydrothermal media: A review of sub and supercritical water technologies. Energy & Enviromental Science. 2008; 1:32-65.
Petkevich, et al. Hydrolysis of wood with concentrated hydrochloric acid in a pilot battery of diffusers. Sb. Tr., Gos. Nauchn.-Issled. Inst. Gidrolizn i Sul'fitno-Spirt. Prom. (1960), 8 47-65. Abstract only.
Pettersen. The Chemical Composition of Wood. In: Rowell M., ed. The chemistry of solid wood. Advances in chemistry series 207. Washington, DC: American Chemical Society ; 1984: Chapter 2.
Philip, et al. Review Polyhydroxyalkanoates: biodegradable polymers with a range of applications. J Chem Technol Biotechnol. 2007; 82:233-247.
Phillips, et al. Thermochemical Ethanol via Indirect Gasification and Mixed Alcohol Synthesis of Lignocellulosic Biomass. National Renewable Energy Laboratory, Technical Report NREL/TP-510-41168. Apr. 2007.
Phillips. Technoeconomic Analysis of a Lignocellulosic Biomass Indirect Gasification Process to Make Ethanol. Ind. Eng. Chem. Res. 2007; 46:8887-8897.
Pierce. Instruction Acylation Derivatization Reagents. Pierce, Rockford, IL 61105, US. 2010.
Ping, et al. Evaluation of grape stalks as a bioresource. Industrial Crops and Products. 2011; 33:200-204.
Pisarnitsky, et al. Effect of Acid Hydrolysis of Oak Wood on Its Aroma-Forming Complex. Applied Biochemistry and Microbiology. 2004; 40(6):613-616.
Pogaku, et al. Whey Protein Isolate-Starch System—A Critical Review. International Journal of Food Engineering: vol. 3 : Iss. 6, Article 1. 2007.
Polymer Science. Making Polyurethane. Polymer Science Learning Center, Department of Polymer Science the University of Southern Mississippi. 2005.
Pontin. First, Cure Malaria. Next Global Warming. The New York times/SundayBusiness/Bright Ideas. Jun. 3, 2007.
Popa, et al. A comparison concerning separation and characterization of polyphenols from spruce wood bank. 2010.
Prater, et al. Determination of Sulfur Dioxide in Dehydrated Foods. Industrial and engineering chemistry. Mar. 1944; 16(3):153-157.
Priefert, et al. Biotechnological production of vanillin. Appl Microbiol Biotechnol. 2001; 56:296-314. Abstract only.
Pulping and Bleaching, PSE 476 powerpoint. 2011.
Pye. The Alcell Process—A Proven Alternative to Kraft Pulping. 1990 Pulping Conference, TAPPI Proceedings. 991-996.
Qian, et al. Acidic Sugar Degradation Pathways An Ab Initio Molecular Dynamics Study. Applied Biochemistry and Biotechnology. 2005;121-124:989-997.
Quinde. Enzymes in the pulp and paper industry: a review. 1994.
Rabinovich. Wood hydrolysis industry in the Soviet Union and Russia: a mini-review. Cellulose Chem. Technol.2010; 44(4-6):173-186.
Radiotis, et al. Optimizing Production of Xylose and Xylooligomers from Wood Chips. 3rd NWBC, Stockholm, Sweden Mar. 23, 2011.
Ragauskas, et al. From wood to fuels Integrating biofuels and pulp production. Industrial biotechnology. 2006; 2(1):55-65.
Ragauskas, et al. The Path Forward for Biofuels and Biomaterials. Science. Jan. 26, 2006; 311:484-489.
Raz. Literature review on concentrated HCl hydrolysis of lignocellulosic material. Aug. 2008.
Raz. Weyland bioethanol report. 2010.
Reese. A microbiological process report; enzymatic hydrolysis of cellulose. Appl Microbiol. Jan. 1956;4(1):39-45.
Reinhold. SEC of lignins. Mainz, Germany. 2007.
Reinhold. SEC of lignins. Mainz, Germany. Powerpoint. 2007.
Ritcey et al. Development of Industrial Solvent Extraction Processes. (Report) Gordon M. Ritcey & Associates, Inc; Nepean, Ontario, Canada.2004.
Robertson. Factors Governing the Nitration of Cellulose. PhD Thesis; Cornell University. 1946.
Robertson. The fractional extraction and quantitative determination of pectic substances in grapes and musts. Am. J. Enol. Vitic. 1979; 30(3):182-186.
Rockwood, et al. Energy Product Options for Eucalyptus Species Grown as Short Rotation Woody Crops. Int. J. Mol. Sci. 2008; 9:1361-1378; DOI: 10.3390/ijms9081361.
Rondinini, et al. Reference value standards and primary standards for pH measurements in Organic Solvents and Water + Organic Solvent Mixtures of Moderate to High Permittivities. Pure & Appl. Chem. 1987; 59(11):1549-1560.
Rovio, et al. Determination of monosaccharide composition in plant fiber materials by capillary zone electrophoresis. Journal of Chromatography A. 2008; 1185:139-144.
Rovio, et al. Determination of neutral carbohydrates by CZE with direct UV detection. Electrophoresis. 2007; 28:3129-3135.
Rozmarin, et al. Fermentative evaluation of prehydrolyzates from chemical cellulose manufacturing. II. Study on some factors affecting the inversion process. Rom. Revista Padurilor-Industria Lemnului-Celuloza si Hirtie: Celuloza si Hirtie (1977), 26(4), 158-62. CODEN: RPLHDX ISSN: 0258-2287. Abstract only.
Rugg. Optimization of the NYU continuous cellulose hydrolysis process. B01447 Biofuels Information Center. Dec. 1982.
Rumbold. Selection of production hosts for real-life feedstock utilization. TNO Kwaliteit van Leven, Oct. 20, 2007.
Saari et al. Adsorption Equilibria of Arabinose, Fructose, Galactose, Rhamnose, Sucrose, and Xylose on Ion-Exchange Resins. J. Chem. Eng.; 2010; 55; 3462-3467.
Saariaho. Resonance raman spextroscopy in the analysis of residual lignin and other unsaturated structures in chemical pulps. Helsinki University of Technology (Espoo, Finland) on the Jan. 14, 2005.
Saeman. Kinetics of the hydrolysis of wood and of the decomposition of sugars in dilute acid at high tempratures. USDA. Sep. 1944.
Saha, et al. Dilute Acid Pretreatment, Enzymatic Saccharification, and Fermentation of Rice Hulls to Ethanol. Biotechnol. Prog. 2005; 21:816-822.
Saltberg, et al. Removal of metal ions from wood chips during acidic leaching 1:Comparison between Scandinavian softwood, birch and eucalyptus. Nordic Pulp and Paper Research J. 2006; 21(4):507-512.
Saltberg, et al. Removal of metal ions from wood chips during acidic leaching 2: Modeling leaching of calcium ions from softwood chips. Nordic Pulp and Paper Research J. 2006; 21(4):513-519.
Samuel, et al. Structural Characterization and Comparison of Switchgrass Ball-milled Lignin Before and after Dilute Acid Pretreatment. Appli. Micr. BioTech. 2010, 162:62-74.
Sanchez, et al. Structural analysis of acid catalysed furfuraldehyde resins by thermal degradation techniques. Eur. Polym. J. 1994; 30(1):43-50.
Sanchez, et al. Trends in biotechnological production of fuel ethanol from different feedstocks. Bioresource Technology. 2008; 99:5270-5295.
Sanders, et al. Shuttle hydrochloric acid process for the preparation of oligosaccharides containing products from wood. Comm Eur. Communities, [Rep.] Eur (1987), (EUR 11084, Degrad. Lignocellul. Ruminants Ind. Processes), 97-101 CODEN: CECED9 ISSN: 0303-755X. Abstract only.
Sannigrahi, et al. Cellulosic biorefineries—unleashing lignin opportunities. Current Opinion in Environmental Sustainability. 2010; 2:383-393.
Sannigrahi, et al. Effects of Two-Stage Dilute Acid Pretreatment on the Structure and Composition of Lignin and Cellulose in Loblolly Pine. Bioenerg. Res. 2008; 1:205-214.
Sannigrahi, et al. Pseudo-lignin and pretreatment chemistry. Energy Environ. Sci. 2011; 4:1306-1310.
Sasaki, et al. Cellulose hydrolysis in subcritical and supercritical water. J. of Supercritical Fluids. 1998; 13:261-268.
Sassner, et al. Techno-economic evaluation of bioethanol production from three different lignocellulosic materials. Biomass and bioenergy. 2008; 32:422-430.
Sato, et al. Determination of monosaccharides derivatized with 2-aminobenzoic Acid by capillary electrophoresis. Ana. BioChem. 1997; 251: 119-121.
Scaringelli, et al. Pre-hydrolysis of sweetgum wood—an integrated approach to the conversion of lignocellulose from wood into useful

(56) References Cited

OTHER PUBLICATIONS chemicals. Report (1979), (NSF/RA-790218; Order No. PB80-108640), 38 pp. From: Gov. Rep. Announce. Index (U. S.) 1980, 80(5), 810. Abstract only.

Schaefer. Bio-Based opportunities in chemicals & energy. Novozymes. London, UBS. Nov. 17, 2010.

Schlamadinger, et al. Effects of the Kyoto protocol on forestry and bioenergy products for mitigation of net carbon emissions. IEA Bioenergy, proceedings of the workshop. Apr. 1998. 202 pages.

Schuchardt et al. Hydrolysis of sugar cane bagasse with hydrochloric acid, promoted by metallic cations. Journal of Chemical Technology & Biotechnology. 1986; 36:329-334.

Schutz. The hydrolysis of wood with hydrochloric acid or chlorides as catalysts in acetic acid solution. Zellwolle, Kunstseide, Seide (1942), 47:8-9. Abstract only.

Scifinder. Steam pretreatment of wood in relation to enzymatic hydrolysis. Final report. Energy Res. Abstr. 1989, 14(17), Abstr. No. 35904.

Scurfield, et al. Amino-Acid Composition of Wood Proteins. J. Experimental Botany. 1970; 21(6):857-68.

Sendich, et al. Recent process improvements for the ammonia fiber expansion (AFEX) process and resulting reductions in minimum ethanol selling price. Bio. Tech. 2008; 99:8429-8435.

Sharkov, et al. Conversion of difficult-to-hydrolyze wood polysaccharides to an easy-to-hydrolyze condition with hydrogen chloride under pressure. USSR. Sb. Tr., Vses. Nauch.-Issled. Inst. Gidroliza Rast. Mater. (1971), No. 21 65-74, 205. Abstract only.

Sharkov. Production of Polyhydric Alcohols from Wood Polysaccharides. Angew. Chem. internat. Edit. 1963; 2(8):405-492.

Shatalov, et al. Kinetics of organosolv delignification of fibre crop *Arundo donax* L. Industrial Crops and Products. 2005; 21:203-210.

Sheehan, et al. Energy and Environmental Aspects of Using Corn Stover for Fuel Ethanol. Journal of Industrial Ecology. 2004; 7(3-4):117-146.

Shen, et al. Product overview and market projection of emerging bio-based plastics, Utrecht University. PRO-BIP 2009.

Sherrard, et al. Review of wood saccharification processes in the United States Prior to World War II. Industrial and Engineering Chemistry. 1945. 37(1):1-10.

Sidiras, et al. Simulation of acid-catalysed organosolv fractionation of wheat straw. Bioresource Technology. 2004; 94:91-98.

Sigma. Enzymatic Assay of α-Glucosidase. Sigma quality control test procedure. Sigma Product information, Revised: Aug. 9, 1996.

Sigma. Enzymes and Reagents for Alternative Energy. Sigma-Aldrich. Biofiles. 2010; 5(5).

Singh, et al. Visualization of Biomass Solubilization and Cellulose Regeneration During Ionic Liquid Pretreatment of Switchgrass. Biotechnology and Bioengineering. Sep. 1, 2009; 104(1):68-75.

Sluiter, et al. Determination of Ash in Biomass, Laboratory Analytical Procedure (LAP), Issue Date: Jul. 17, 2005. Technical Report, NREL/TP-510-42622, Jan. 1, 2008.

Sluiter, et al. Determination of Sugars, Byproducts, and Degradation Products in Liquid Fraction Process Samples, Laboratory Analytical Procedure (LAP), Issue Date: Dec. 8, 2006. Technical Report, NREL/TP-510-42623, Jan. 1, 2008.

Sluiter, et al. Determination of Sugars, Byproducts, and Degradation Products in Liquid Fraction Process Samples. Laboratory Analytical Procedure (LAP), Contract No. DE-AC36-99-GO10337. Issue Date: Dec. 8, 2006.

Sluiter, et al. Determination of Total Solids in Biomass and Total Dissolved Solids in Liquid Process Samples, Laboratory Analytical Procedure (LAP), Issue Date: Mar. 31, 2008. Technical Report, NREL/TP-510-42621, Revised Mar. 2008.

So, et al. Economic Analysis of Selected Lignocellulose-to-Ethanol Conversion Technologies. Applied Biochemistry and Biotechnology. 1999; 77-79:633-640.

Soloman, et al. Grain and cellulosic ethanol: History, economics, and energy policy. Biomass and Bioenergy. 2007; 31:416-425.

Spaccini, et al. Molecular characteristics of humic acids extracted from compost at increasing maturity stages. Soil Biology & Biochemistry. 2009 41:1164-1172.

Srinorakutara, et al. Approach of Cassava Waste Pretreatments for Fuel Ethanol Production in Thailand. 2010.

Srinorakutara, et al. Utilization of Waste from Cassava Starch Plant for Ethanol Production. The Joint International Conference on "Sustainable Energy and Environment (SEE)" Dec. 1-3, 2004, Hua Hin, Thailand. 344-349.

Srndovic. Ultrastructure of the primary cell wall of softwood fibres studied using dynamic FT_IR spectroscopy. Licentiate Thesis, Royal Institute of Technology. Stockholm 2008.

Steele et al. Recent breakthroughs in enzymes for biomass hydrolysis. Presentation; National Ethanol Conference; Texas. 2009.

Steinbuchel. Polymeric and low molecular weight hydrophobic chemicals produced by microorganisms from renewables. Renewable Resources & Biorefineries Conference, Sep. 6-8, 2006, York, UK.

Stepnowski et al. Analysis of Environmental Fate and Quantitative Methods for Determination of Ionic Liquids. Conference report; International Conference on Enviromental Science and Technology. 2007; Kos, Greece.

Stranges. Friedrich Bergius and the Rise of the German Synthetic Fuel Industry. Isis. Dec. 1984; 75(4):43-667.

Stranges. Synthetic fuel production in prewar and world war II Japan: A case study in technological failure. Annals of Science. 1993; 50:229-265.

Structure of Wood. US Department of Agriculture, Forest Service, Forest Products Laboratory, Research Note FPL-04. Mar. 1980.

Sudo, et al. A New Modification Method of Exploded Lignin for the Preparation of a Carbon Fiber Precursor. Journal of Applied Polymer Science. 1993; 48:1485-1491.

Suess. Interaction of organic compounds with calcium carbonate-I. Association phenomena and geochemical implications. Geochimia et Cosmochimic Acata. 1970; 34:157-168.

Sun, et al. Hydrolysis of lignocellulosic materials for ethanol production: a review. Bioresource Technology. 2002; 83:1-11.

Taherzadeh, et al. Acid-Based hydrolysis Processes for Ethanol from Lignocellulosic materials: A Review. Bioethaol review, BioResources. 2007; 2(3):472-499.

Taherzadeh, et al. Pretreatment of Lignocellulosic Wastes to Improve Ethanol and Biogas Production: A Review. Int. J. Mol. Sci. 2008; 9:1621-1651; DOI: 10.3390/ijms9091621.

Tanaka, et al. Effect of Pore Size in Substrate and Diffusion of Enzyme on Hydrolysis of Cellulosic Materials with Cellulases. Biotechnology and Bioengineering. 1998; 32:698-706.

Tanase, et al. Mass Balance of Extractives Around Impressafiner in Mill and Pilot Scale. 2009. 1-6.

Tang, et al. Effect of Inorganic Salts on Pyrolysis of Wood, Cellulose, and Lignin Determined by Differential Thermal Analysis. U.S. Forest Service Research FPL 82 Jan. 1968.

Tappi. Acid-insoluble lignin in wood and pulp. T 222 om-88, TAPPI 1988.

Thompson, et al. Comparison of Pretreatment Methods on the Basis of Available Surface Area. Bioresource Technology. 1992; 39:155-163.

Thomsen. How 'green' are algae farms for biofuel production? Biofuels. 2010; 1(4):515-517.

Timell, et al. The acid hydrolysis of glycosides II. Effect of substituents at C-5. Canadian Journal of Chemistry. 1965; 43:2296-2305.

Timell. The acid hydrolysis of glycosides I. General conditions and the effect of the nature of the aglycone. Canadian Journal of Chemistry. 1964; 42:1456-1471.

Timur, et al. Characterization and application of activated carbon produced from oak cups pulp. Journal of Analytical and Applied Pyrolysis. 2010; 89:129-136.

Trickett. Utilization of Baggase for the production of C5 and C6 sugars. MS Thesis; University of Natal, Durban, South Africa. 1982.

Troitskii. Colloid chemical mechanism of the separation of some elements by extraction. Russ. Chem. Rev. 163; 32:116-120.

(56) References Cited

OTHER PUBLICATIONS

Unal, et al. Dechlorination of Bleached Kraft Pulp by Laccase Enzyme Produced from Some White-Rot Fungi. Turk J Biol. 2001; 25:67-72.
Updegraff et al. Semimicro determination of cellulose in biological materials. Analytical biochemistry. 1969; 32(3):420-424.
Urban, et al. Characterization of polymer-based monolithic capillary columns by inverse size-exclusion chromatography and mercury-intrusion porosimetry. Journal of Chromatography A. 2008; 1182:161-16.
USDE. Advanced Technologies for the Control of Sulfur Dioxide Emissions from Coal-Fired Boilers, A report on three projects conducted under separate. Clean Coal Technology. Topical Report No. 12, Jun. 1999.
Van Bramer. An Introduction to Mass Spectrometry. Widener University, Department of Chemistry, One University Place, Chester, PA 19013. 1998.
Van Dam. Characterization of Sulfur-free lignins from alkaline pulping of annual fibere crops. The international Lignin Institute, 5th international Forum' Sep. 7, 2000, Bordeaux (France).
Van Dyke. Enzymatic Hydrolysis of Cellulose—A Kinetic Study. For the degree of Doctor of Science at the Massachusetts Institute of Technology, Sep. 1972.
Van Sprongsen, et al. Separation and recovery of the constituents from lignocellulosic biomass by using ionic liquids and acetic acid as co-solvents for mild hydrolysis. Chemical Engineering and Processing. 2011; 50:196-199.
Von Sivers, et al. A techno-economical comparison of three processes for the production of ethanol from pine. Bioresource Technology. 1995; 51:43-52.
Vulfson, et al. Glycosidases in organic solvents: I. Alkyl-fl-glucoside synthesis in a water-organic two-phase system. Enzyme Microb. Technol. Dec. 1990; 12:950-954.
Wang, et al. Influence of steaming explosion time on the physicchemical properties of cellulose from Lespedeza stalks (Lespedeza crytobotrya). Bioresource Technology. 2009; 100:5288-5294.
Wang, et al. Molecular Characteristics of Kraft-AQ Pulping Lignin Fractionated by Sequential Organic Solvent Extraction. Int. J. Mol. Sci. 2010; 11:2988-3001.
Wang, et al. Understanding the Conformation of Polysaccharides. Chapter 5. Copyright 2005 by Taylor & Francis Group, LLC.
Wang, et al. Understanding the Physical Properties of Food Polysaccharides. Chapter 4. Copyright 2005 by Taylor & Francis Group, LLC.
Wang. Thermal Modification of Wood. Faculty of Forestry University of Toronto. 2011.
Weingarten, et al. Kinetics of furfural production by dehydration of xylose in a biphasic reactor with microwave heating. Green Chem. 2010; 12:1423-1429.
Williams. Ethanol production potential and costs from lignocellulosic resources in California. 15th European Biomass Conference & Exhibition, May 7-11, 2007, Berlin, Germany.
Wilson, et al. Detection of tannins in modern and fossil barks and in plant residues by high-resolution solid-state $^{13}$C nuclear magnetic resonance. Org. Geochem. 1988; 12(6):539-546.
Winandy, et al. Wood-plastic composites using thermomechanical pulp made from oxalic acid-pretreated red pine chips. 7th Global WPC and Natural Fibre Composites Congress and Exhibition, Jun. 18-19, 2008 in Kassel / Germany.
Winston, et al. Characterization of the lignin residue from hydrolysis of sweetgum wood with superconcentrated hydrochloric acid. Holzforschung Bd.1986; 40:Suppl. 45-50.
Wood, et al. Determination of Methanol and Its Application to Measurement of Pectin Ester Content and Pectin Methyl Esterase Activity. Analytical biochemistry. 1971; 39:418-428.
Woodbridge et al. Nitrocellulose from wood pulp. J. Ind.Eng. Chem. 1920; 12(4):380-384.
Wood-Ethanol Report. Environment Canada. 1999.
Wyman, et al. Comparative sugar recovery data from laboratory scale application of leading pretreatment technologies to corn stover. Bioresource Technology. 2005; 96: 2026-2032.
Wyman, et al. Coordinated development of leading biomass pretreatment technologies. Bioresource Technology. 2005; 96:1959-1966.
Wyman. Biomass ethanol: Technical Progress, Opportunities, and Commercial Challenges. Annu. Rev. Energy Environ. 1999; 24:189-226.
Wyman. Potential Synergies and Challenges in Refining Cellulosic Biomass to Fuels, Chemicals, and Power. Biotechnol. Prog. 2003; 19:254-262.
Wyman. Twenty Years of Trials, Tribulations, and Research Progress in Bioethanol Technology. Applied Biochemistry and Biotechnology. 2001; 91-93:5-21.
Wyman. What is (and is not) vital to advancing cellulosic ethanol. Trends in Biotechnology. 2007; 25(4):153-157.
Xiang, et al. Heterogeneous Aspects of Acid Hydrolysis of α-Cellulose. Applied Biochemistry and Biotechnology. 2003; 105-108:505-514.
Xie, et al. Opportunities with Wood Dissolved in Ionic Liquids. In Cellulose Solvents: Foe Analysis, Shaping and Chemical Modification. Chapter 19. 2010;343-363.
Yang, et al. Pretreatment: the key to unlocking low-cost cellulosic ethanol. Biofuels, Bioprod. Bioref. 2008; 2:26-40.
Ye, et al. Spontaneous High-Yield Production of Hydrogen from Cellulosic Materials and Water Catalyzed by Enzyme Cocktails. ChemSusChem. 2009; 2:149-152.
Yeoh, et al. Comparisons between different techniques for water-based extraction of pectin from orange peels. Desalination 2008; 218:229-237.
Yoshida, et al. Gasification of biomass model compounds and real biomass in supercritical water. Biomass and Bioenergy.2004; 26:71-78.
Yusmawati, et al. Optical Properties and Sugar Content Determination of Commercial Carbonated Drinks using Surface Plasmon Resonance. American Journal of Applied Sciences. 2007; 4(1):01-04.
Zahedifar. Novel uses of lignin and hemicellulosic sugars from acidhyrolysed lignocellulosic materials. For the degree of Doctor of Philosophy, in the University of Aberdeen, Sep. 1996.
Zhang. Reviving the carbohydrate economy via multi-product lignocellulose biorefineries. J Ind Microbiol Biotechnol. 2008; 35:367-375.
Zhao, et al. Small-scale mashing procedure for predicting ethanol yield of sorghum grain. Journal of Cereal Science. 2009; 49:230-238.
Zhao, et al. Supercritical hydrolysis of cellulose for oligosaccharide production in combined technology. Chem. Eng. J. 2009; 150:411-417.
Zheng, et al. Overview of biomass pretreatment for cellulosic ethanol production. Int J Agric & Biol Eng. 2009; 2(3):51-68.
Zheng, et al. Phenolation of walnut shell using sulfuric acid as a catalyst and application to PF resin adhesives. Abstracts / Journal of Biotechnology 136S (2008) S402-S459, doi:10.1016/j.jbiotec.2008. 07.950.
Zheng, et al. Supercritical carbon dioxide explosion as a pretreatment for cellulose hydrolysis. Biotechnology Letters. Aug. 1995; 17(8):845-850.
Zhu, et al. Understanding methanol formation in pulp mills. 1999 International Environmental Conference, pp. 139-143.
Zimbardi, et al. Acid impregnation and steam explosion of corn stover in batch processes. Industrial Crops and Productions. 2007; 26:195-206.
Zinoviev, et al. Background Paper on biofuels Production Technologies. International Centere for Science and Hight Technology and UNIDO. Nov. 2007; 1-106.
Zorina, et al. Study of acid heterogeneous hydrolysis of pulp. USSR. Editor(s): Kiprianov, A. I. Khim. Pererab. Drev. (1982), 35-8. Publisher: Leningr. Lesotekh. Akad., Leningrad, USSR CODEN: 49HIA6. Abstract only.
ASTM Standards. Standard Test Method for Ash in Biomass. Designation: E1755-01 (Reapproved 2007).
Satin Sweet® 65% High Maltose Corn Syrup. Cargill foods. www. cargillfoods.com Updated Aug. 12, 2014.

\* cited by examiner

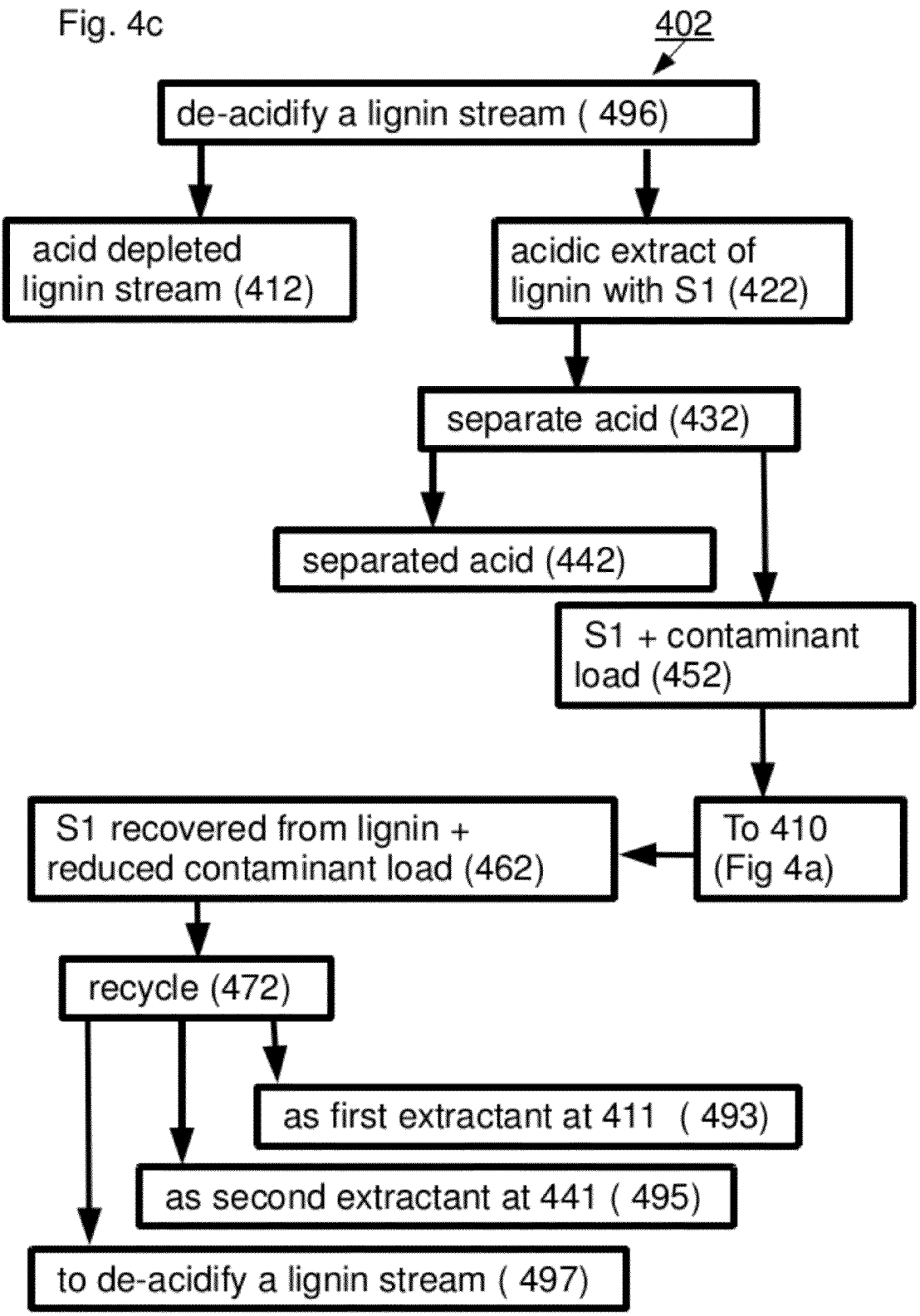

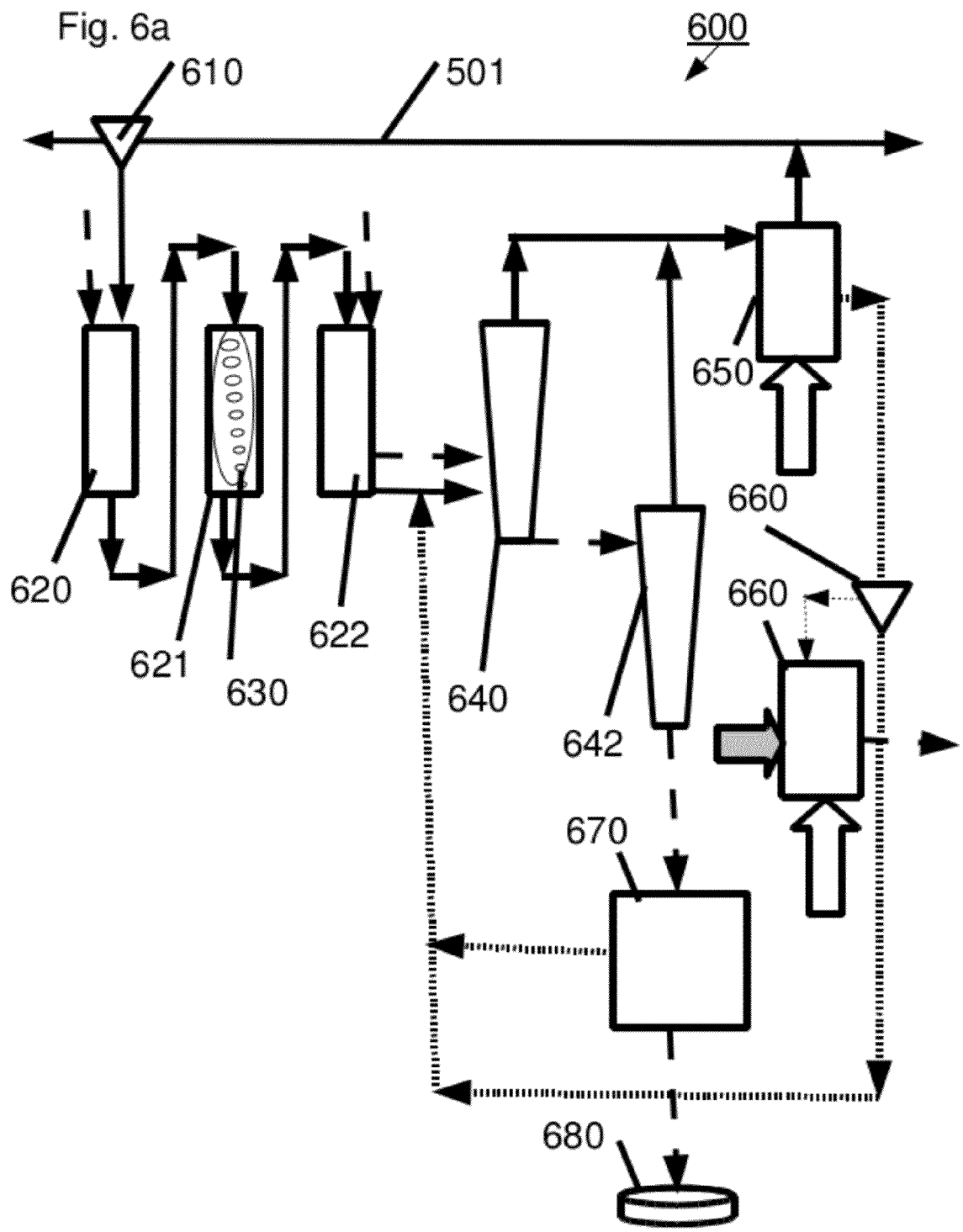

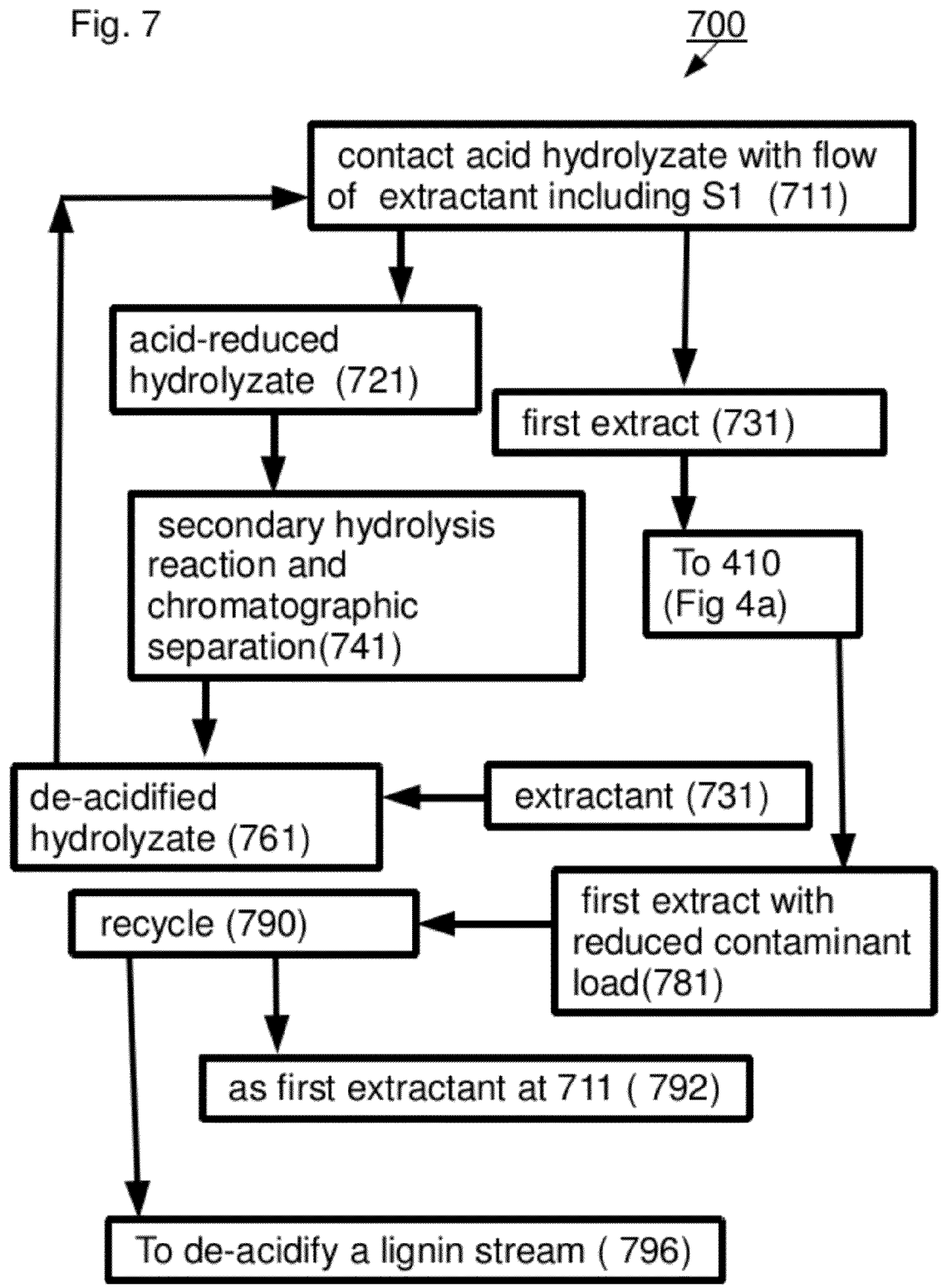

US 9,115,467 B2

METHODS AND SYSTEMS FOR SOLVENT PURIFICATION

RELATED APPLICATIONS

In accord with the provisions of 35 U.S.C. §119(e) and §363, this application claims the benefit of:

U.S. 61/513,613 filed on 31 Jul. 2011 by Robert JANSEN et al. and entitled "Methods and Systems for Solvent Purification"; and In accord with the provisions of 35 U.S.C. §119(a) and/or §365(b), this application claims priority from:

prior Israeli application IL 207329 filed on 1 Aug. 2010 by Robert JANSEN et al. and entitled "A Method for Refining a Recycle Extractant and for Processing a Lignocellulosic Material and for the Production of a Carbohydrate Composition".

Each of these priority documents is fully incorporated by reference.

This application is also related to the following co-pending applications, each of which is fully incorporated herein by reference:

prior Israeli application IL 209912 filed on 9 Dec. 2010 by Robert JANSEN et al. and entitled "A Method for Treating a Lignocellulosic Feed Containing Ash and Fatty Acid"; and prior Israeli application IL 211093 filed on 6 Feb. 2011 by Aharon EYAL et al. and entitled "A Method for Processing a Lignocellulosic Material and for the Production of a Carbohydrate Composition"; and U.S. 61/473,134 filed 7 Apr. 2011 by Aharon EYAL and entitled "Lignocellulose Conversion Processes and Products"; and U.S. 61/483,663 filed 7 May 2011 by Aharon EYAL and entitled "Lignocellulose Conversion Processes and Products"

U.S. 61/483,777 filed 9 May 2011 Robert JANSEN et al. and entitled "Hydrolysis Systems and Methods"; and U.S. 61/487,319 filed 18 May 2011 by Robert JANSEN et al. and entitled "Hydrolysis Systems and Methods"; and U.S. 61/491,243 filed 30 May 2011 by Robert JANSEN et al. and entitled "Lignin Compositions, Systems and Methods for Processing Lignin and/or HCl"; and U.S. 61/500,169 filed 23 Jun. 2011 by Aharon EYAL et al. and entitled "Sugar Mixtures and Methods for Production and Use thereof"

U.S. 61/358,894 filed 26 Jun. 2010 by Aharon EYAL et al. and entitled "Fermentation Feedstock Precursor and Methods for the Production Thereof".

FIELD OF THE INVENTION

This invention relates to methods and systems for solvent purification.

BACKGROUND OF THE INVENTION

Organic solvents are used in many industrial processes.

Some solvents can be environmentally hazardous. Factories using hazardous solvents may be subject to regulations concerning solvent disposal.

Alternatively or additionally, some solvents can be expensive. Factories using expensive solvents may attempt to reduce the amount of solvent consumed in production as a cost saving measure.

SUMMARY OF THE INVENTION

A broad aspect of the invention relates to recovery of extractant including an S1 solvent from an extract including extractant carrying a contaminant load and acid (e.g. HCl) and/or water. In some exemplary embodiments of the invention, the contaminant load originates from contact with an acid hydrolyzate of a lignocellulosic substrate and/or from contact with acidified lignin and associated sugars separated from such a hydrolyzate.

As used in this specification and the accompanying claims the term "S1" or "S1 solvent" indicates an organic solvent (in some embodiments a "first" organic solvent) which is less than 15% soluble in water and has a polarity related component of Hoy's cohesion parameter (delta-P) between 5 and 10 MPa$^{1/2}$ and/or a hydrogen-bond related component of Hoy's cohesion parameter (delta-H) between 5 and 20 MPa$^{1/2}$. Optionally, S1 includes an alcohol, ketone or aldehyde with 5, optionally 6, or 8 or more carbon atoms. Optionally, S1 includes a hexanol, a heptanol or an ocatnol such as 2-ethyl-hexanol and combinations thereof.

As used in this specification and the accompanying claims the term "S2" or "S2 solvent" or "second organic solvent" indicates an organic solvent characterized by water solubility of at least 30% and a delta-P greater than 8 MPa$^{1/2}$ and/or a delta-H greater than 12 MPa$^{1/2}$.

For example, S2 may include methanol and/or ethanol.

Delta-P is the polarity related component of Hoy's cohesion parameter and delta-H is the hydrogen bonding related component of Hoy's cohesion parameter.

The cohesion parameter, as referred to above or, solubility parameter, was defined by Hildebrand as the square root of the cohesive energy density:

$$\delta = \sqrt{\frac{\Delta E_{vap}}{V}}$$

where $\Delta E_{vap}$ and V are the energy or heat of vaporization and molar volume of the liquid, respectively. Hansen extended the original Hildebrand parameter to a three-dimensional cohesion parameter. According to this concept, the total solubility parameter, delta, is composed of three different components, or, partial solubility parameters relating to the specific intermolecular interactions:

$$\delta^2 = \delta_d^2 + \delta_p^2 + \delta_h^2$$

in which delta-D, delta-P and delta-H are the dispersion, polarity, and Hydrogen bonding components, respectively. Hoy proposed a system to estimate total and partial solubility parameters. The unit used for those parameters is MPa$^{1/2}$. A detailed explanation of that parameter and its components can be found in "CRC Handbook of Solubility Parameters and Other Cohesion Parameters", second edition, pages 122-138. That and other references provide tables with the parameters for many compounds. In addition, methods for calculating those parameters are provided.

In some exemplary embodiments of the invention, S1 has a boiling point at 1 atm between 100° C. and 200° C. and forms a heterogeneous azeotrope with water having a boiling point at 1 atm of less than 100° C.

Optionally, the S1 solvent includes alcohols and/or ketones and/or aldehydes having at least 5 carbon atoms. Optionally, the S1 solvent includes only alcohols. In some exemplary embodiments of the invention, the alcohols include hexanol and/or 2-ethyl-hexanol.

As used in this specification and the accompanying claims the term "extractant" refers to a composition including an S1 solvent capable of selectively extracting an acid from an aqueous solution. In some exemplary embodiments of the invention, the "extractant" carries a contaminant load. In some exemplary embodiments of the invention, the aqueous solution is provided as an acidic aqueous substrate containing sugars. In some exemplary embodiments of the invention, contact between the extractant and the acidic aqueous substrate increases a concentration of sugars and decreases a concentration of acid in the substrate. According to various exemplary embodiments of the invention the substrate includes one or more impurities. Each of these impurities transfers, or fails to transfer, to the extractant with characteristic kinetics.

According to various exemplary embodiments of the invention the kinetics of transfer of each specific impurity can be influenced by the nature of the specific impurity, and/or reaction conditions (e.g. concentration and/or temperature and/or contact time and/or pH) and/or by the specific extractant employed.

The relative affinity of any specific impurity can be summarized as an S1/water distribution coefficient. The S1/water distribution coefficient is determined by generating a 1% solution of the impurity in S1, contacting that solution with an equivalent amount of water, equilibrating the two phases (mixing them until there is no further change in composition) to form an impurity-comprising organic phase (S1 rich) and an impurity-comprising aqueous phase, separating the two phases, analyzing each one of them for the impurity and dividing the concentration of the impurity in the organic phase by the concentration of the impurity in the aqueous phase.

According to various exemplary embodiments of the invention specific impurities may be characterized by an S1/water distribution coefficient greater than 1, optionally greater than 2, optionally greater than 3 and optionally greater than 5.

According to various exemplary embodiments of the invention a contribution of any specific impurity to the contaminant load in the extract will increase in proportion to its concentration in the substrate and/or in proportion to its S1/water distribution coefficient.

As used in this specification and the accompanying claims the term "extract" or "initial extract" refers to extractant which has been brought into contact with a substrate as described above and then separated. The extract includes extractant, acid and a portion of the impurities which have transferred to the S1 solvent and become part of the contaminant load.

In some exemplary embodiments of the invention, extractant from the extract is reused as extractant for additional extractions (e.g., to extract an additional portion of the substrate). In order to facilitate this reuse, an acid is separated from the extract to produce de-acidified extractant. Each time that de-acidified extractant is brought into contact with an additional portion of substrate, additional impurities migrate to the S1 extractant so that the contaminant load increases with each successive round of contact if no action is taken to reduce the load. If the contaminant load is allowed to increase indefinitely, it eventually contributes to loss of extraction capacity and/or hindrance to phase contact/separation. Some exemplary embodiments of the invention relate to systems and/or methods to maintain the contaminant load in an acceptable range—we probably need to put more numbers here as fall back since you won't be able to use "acceptable range" alone in a claim. Optionally, the acceptable range is determined by considering extraction capacity and/or hindrance to phase contact/separation. According to various exemplary embodiments of the invention specific impurities are considered separately when determining the acceptable range. Alternatively or additionally, groups of impurities are considered separately when determining the acceptable range.

As used in this specification and the accompanying claims the term "contaminant load" refers to the sum total of impurities present in an S1 extract and/or S1 extractant at any given point. These impurities may include undesired materials present in the lignocellulosic substrate and/or breakdown products of sugars (e.g. furfurals) and/or solvent derivatives (e.g. esters or salts). According to various exemplary embodiments of the invention the contaminant load includes one or more impurities including, but not limited to mineral acids, organic acids, anionic chloride complexes of heavy metals, alkyl chlorides, alkyl acetates and hydrophobic organic compounds. In some exemplary embodiments of the invention, the hydrophobic organic compounds include one or more of phenols, aldehydes, furfural, hydroxymethylfurfural, tall oils, wood extractives and products of their reaction. In some exemplary embodiments of the invention, the viscosity of a solution containing 95% S1 and 5% contaminant load is greater by at least 1% compared with 100% S1. Optionally, various impurities contributing to the contaminant load have absorption in the visible spectrum.

One aspect of some embodiments of the invention relates to separating acid from the initial extract to produce de-acidified extract. Optionally, the initial extract is washed with acid. In some exemplary embodiments of the invention, this acid wash removes sugars, which can be recycled (e.g. to an upstream hydrolytic reaction). In some exemplary embodiments of the invention, this acid wash contributes to a reduction in sugar degradation. This reduction in degradation can contribute to a reduction in unwanted degradation products such as, for example, furfural from degradation of pentoses (e.g. xylose and arabinose) and hydroxymethylfurfural from degradation of hexoses (e.g. glucose, galactose and mannose). Alternatively or additionally, this acid wash contributes to a reduction in hydrophilic impurities in the initial extract. In some exemplary embodiments of the invention, acid is separated from the initial extract by distillation under vacuum and a slightly elevated temperature to produce de-acidified extract which includes S1 solvent and a contaminant load.

One aspect of some embodiments of the invention relates to reducing a contaminant load in the de-acidified extract by refining. In some exemplary embodiments of the invention, refining is conducted so that a desired degree of extraction capacity and/or phase contact/separation of the S1 extractant is maintained.

In some exemplary embodiments of the invention, refining is conducted without distillation. Optionally, mineral acids and/or heavy metal complexes and/or acetic acid and/or acetates formed therefrom and/or hydrophobic impurities are at least partially removed from the de-acidified extract by the refining.

In some exemplary embodiments of the invention, the refining involves treatment of the de-acidified extract with lime to produce limed extract. Optionally, lime is contacted with the de-acidified extract as a slurry (e.g. 2, 5, 10, 20 or 30% wt or intermediate or greater percentages) of solid lime suspended in water or an aqueous solution of lime. In some exemplary embodiments of the invention, addition of carbon dioxide to the limed extract causes precipitation of calcium carbonate. In some exemplary embodiments of the invention, the calcium carbonate is removed by filtration. In some exemplary embodiments of the invention, the filtered limed extract is washed with water to remove remaining calcium salts.

As used in this specification and the accompanying claims the term "carbonatation" indicates contacting a solution with CO2 gas, either as a pure stream, or as part of a gaseous mixture containing CO2.

As used in this specification and the accompanying claims the term "lime" indicates calcium oxide (also known as quicklime) and/or calcium hydroxide and/or calcium carbonate. According to various exemplary embodiments of the invention, lime is provided as a solid or in solution.

It will be appreciated that the various aspects described above relate to solution of technical problems related to reducing a requirement for solvent disposal in an industrial setting.

Alternatively or additionally, it will be appreciated that the various aspects described above relate to solution of technical problems related to reducing a concentration of one or more impurities which contribute to a contaminant load in a solvent recycling loop.

In some exemplary embodiments of the invention, there is provided a method including:
(a) contacting lime with an extract including an S1 solvent carrying a contaminant load to form a lime treated extract; and (b) reducing the contaminant load by removing solids.

Optionally, at least 35% of the lime is recycled lime.

Optionally, the method includes carbonatating the removed solids with $CO_2$ gas to form a slurry including calcium carbonate.

Optionally, the method includes carbonatating the lime treated extract with $CO_2$ gas to form a slurry including calcium carbonate.

Optionally, the method includes contacting the slurry with additional lime.

Optionally, the method includes washing the lime treated extract with water.

Optionally, the S1 solvent includes one or more solvents selected from the group consisting of alcohols, ketones and aldehydes having at least 5 carbon atoms.

Optionally, the S1 solvent is n-hexanol.

Optionally, the S1 solvent is 2-ethyl-1-hexanol.

Optionally, the contaminant load is reduced by more than 20%.

Optionally, the method includes contacting an extractant including the S1 solvent with an acid hydrolyzate of a lignocellulosic substrate to produce an acid-carrying extract; and de-acidifying the acid carrying extract to produce the extract.

Optionally, the method includes contacting an extractant including the S1 solvent with an acid including lignin composition to produce the extract.

Optionally, the apparent pH of the lime treated extract is at least 6.5.

Optionally, the apparent pH of the lime treated extract is not more than 8.5.

In some exemplary embodiments of the invention, there is provided a method including:
(a) contacting an acid hydrolyzate of a lignocellulosic substrate with a first extractant including an S1 solvent to produce an acid-reduced hydrolyzate containing sugars and a first extract containing S1 solvent carrying a contaminant load; (b) contacting the acid-reduced hydrolyzate with a second extractant including an S1 solvent and an S2 solvent to produce a de-acidified hydrolyzate containing sugars and a second extract including S1 solvent, S2 solvent, acid and water; (c) treating the first extract by a method according to any one of claims 1 to 5 to produce a first extract with a reduced contaminant load; and (d) recycling at least a portion of the first extract with a reduced contaminant load.

Optionally, the recycling includes use of the first extract with a reduced contaminant load as part of the first extractant.

Optionally, the recycling includes use of the first extract with a reduced contaminant load as part of the second extractant.

Optionally, the recycling includes use of the first extract with a reduced contaminant load to de-acidify a lignin stream.

In some exemplary embodiments of the invention, there is provided a method including:
(a) cyclically contacting a first portion of an extractant including S1 solvent in a system with an acid hydrolyzate of a lignocellulosic substrate to produce an acid reduced hydrolyzate and an extract including acid and S1 solvent carrying a contaminant load; (b) de-acidifying the extract to form de-acidified extract with S1 solvent carrying the contaminant load; and (c) cyclically routing a second portion of the extractant including S1 solvent carrying a contaminant load to a decontamination module which applies a contaminant reduction process to the second portion to produce extractant with a reduced contaminant load.

Optionally, the method includes cyclically contacting a third portion of an extractant including S1 solvent in a system with an acid including lignin stream from hydrolysis of a lignocellulosic substrate to produce an acid reduced lignin stream and an extract including S1 solvent and a contaminant load.

Optionally, a size of the first portion is larger than a size of the second portion.

Optionally, a size of the third portion is larger than a size of the second portion.

Optionally, the method includes coordinating the cyclically contacting and the cyclically routing so that a contaminant load in the first portion is maintained in a desired range.

Optionally, the S1 solvent includes one or more solvents selected from the group consisting of alcohols, ketones and aldehydes having at least 5 carbon atoms.

Optionally, the S1 solvent is n-hexanol.

Optionally, the S1 solvent is 2-ethyl-1-hexanol.

Optionally, the contaminant reduction process includes treatment of the second portion of S1 solvent with lime.

Optionally, the contaminant reduction process includes carbonatation with a gas stream including $CO_2$.

Optionally, carbonatation is conducted without removal of S1 solvent.

Optionally, carbonatation is conducted following removal of S1 solvent.

Optionally, the contaminant reduction process includes removal of solids.

In some exemplary embodiments of the invention, there is provided an apparatus including: (a) a decontamination module adapted to contact lime with an extract including an S1 solvent carrying a contaminant load to produce limed extract; and (b) a solids removal mechanism adapted to remove solids from the limed extract.

Optionally, the apparatus includes a de-acidification module adapted to separate acid from an extract including acid and S1 solvent carrying a contaminant load and output a de-acidified extract.

Optionally, the apparatus includes a carbonatation mechanism adapted to bubble a stream of gas including $CO_2$ through the limed extract.

Optionally, the apparatus includes a carbonatation mechanism adapted to bubble a stream of gas including $CO_2$ through the removed solids.

Optionally, the apparatus includes a controller designed and configured to coordinate activity of the modules and mechanism so that a contaminant load in the limed extract after solids removal is less than 80% of a contaminant load in the extract introduced into the de-acidification module.

Optionally, the apparatus includes a controller designed and configured to coordinate activity of the modules and mechanism so that a contaminant load in the extract is maintained in a desired range.

In some exemplary embodiments of the invention, there is provided a calcium composition including (on a dry weight basis) at least 1% calcium carbonate; and at least 1% furfurals.

Optionally, the composition includes at least 5% furfurals.

Optionally, the composition includes at least 5% phenolic compounds.

Optionally, the composition includes at least 0.1% calcium acetate.

Optionally, the composition includes at least 0.5% of calcium formate.

Optionally, the composition includes hexanol.

Optionally, the composition includes 2-ethyl hexanol.

In some exemplary embodiments of the invention, there is provided a suspension including (on a weight basis): (a) two hundred parts S1 solvent carrying a contaminant load; and (b) at least one part lime solids.

Optionally, the lime solids are present as an aqueous slurry.

Optionally, the contaminant load includes at least 0.2% furfurals relative to the solvent.

Optionally, the contaminant load includes at least 0.2% phenolic compound relative to the solvent.

Optionally, the suspension includes calcium acetate.

Optionally, the suspension includes calcium formate.

In some exemplary embodiments of the invention, there is provided a method including: (a) contacting an acid hydrolyzate of a lignocellulosic substrate with a flow of extractant including an S1 solvent to produce an acid-reduced hydrolyzate containing sugars and a first extract containing S1 solvent and a contaminant load; (b) subjecting the acid-reduced hydrolyzate to a secondary hydrolysis reaction and chromatographic separation to produce a de-acidified hydrolyzate containing sugars; (c) contacting the de-acidified hydrolyzate with the extractant at an upstream point in the flow; (d) treating the first extract by a method according to any one of claims 1 to 5 to produce a first extract with a reduced contaminant load; and (e) recycling at least a portion of the first extract with a reduced contaminant load.

In some exemplary embodiments of the invention, there is provided a method including: (a) diverting a portion of an extractant flow including S1 solvent carrying a contaminant load from an industrial process; (b) contacting the portion with lime to form a lime treated portion; (c) separating the lime from the lime treated portion to form extractant including S1 solvent carrying a reduced contaminant load; and (d) re-using the S1 solvent with reduced contaminant load in the industrial process.

Optionally, the industrial process is acid-catalyzed hydrolysis of lignocellulosic substrate.

Optionally, the method includes carbonatating any liquid or solid resulting from the separation with $CO_2$ gas to form a slurry including calcium carbonate.

Optionally, at least 30% of the extractant from the industrial process is used in (a) through (d).

In some exemplary embodiments of the invention, there is provided a method of producing a sugar composition from lignocellulosic substrate including: (a) contacting a lignocellulosic substrate with hydrochloric acid to produce a hydrolyzate and an HCl-including lignin composition; (b) treating at least one of the hydrolyzate and the lignin composition with an extractant including S1 solvent to form an extract including S1 solvent carrying a contaminant load; (c) de-acidifying the extract to form de-acidified extract; (d) contacting lime with the de-acidified extract to form a lime treated extract; (e) reducing the contaminant load by removing solids to form an extract with reduced contaminant load; (f) using at least a portion of the extract with reduced contaminant load in the treating; (g) processing the hydrolyzate to produce a sugar composition.

Optionally, the sugar composition contains at least 1 ppm of an impurity from the contaminant load.

In some exemplary embodiments of the invention, there are provided sugar compositions produced according to the method.

In some exemplary embodiments of the invention, there is provided a method of producing a commercial product from lignocellulose including: (a) contacting a lignocellulosic substrate with hydrochloric acid to produce a hydrolyzate; (b) extracting the hydrolyzate with an extractant including S1 solvent to separate hydrochloric acid therefrom and to form an extract including S1 solvent carrying a contaminant load; (c) de-acidifying the extract to form de-acidified extract and recover hydrochloric acid; (d) contacting lime with the de-acidified extract to recover S1 solvent carrying a reduced contaminant load; and (e) processing the hydrolyzate to produce a commercial product.

Optionally, the commercial product is an acrylic-based or poly-acrylic based product.

In some exemplary embodiments of the invention, there are provided commercial products produced according to the method.

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting.

For purposes of this specification and the accompanying claims any feature, process or component depicted or described in the singular shall also represent two or more of the feature, process or component so depicted or described.

As used herein, the terms "comprising" and "including" or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

Percentages (%) of chemicals typically supplied as powders or crystals (e.g. lime) are W/W (weight per weight) unless otherwise indicated. Percentages (%) of chemicals typically supplied as liquids (e.g. HCl) are also W/W (weight per weight) unless otherwise indicated.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are:

FIG. 4c is a simplified flow diagram of a method according to some exemplary embodiments of the invention;

FIG. 6a is a schematic representation of materials flow according to some exemplary embodiments of the invention;

FIG. 7 is a simplified flow diagram of a method according to some exemplary embodiments of the invention;

DETAILED DESCRIPTION OF EMBODIMENTS

Embodiments of the invention relate to methods and apparatus for solvent purification.

Specifically, some embodiments of the invention can be used to purify a solvent to a sufficient degree so that it can be recycled in an industrial process. In some exemplary embodiments of the invention, the solvent is an S1 solvent. Optionally, the industrial process relates to acid hydrolysis of lignocelluloses to produce sugars and/or lignin.

The principles and operation of a method and/or apparatus according to exemplary embodiments of the invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Overview of Exemplary System

Figure 1:
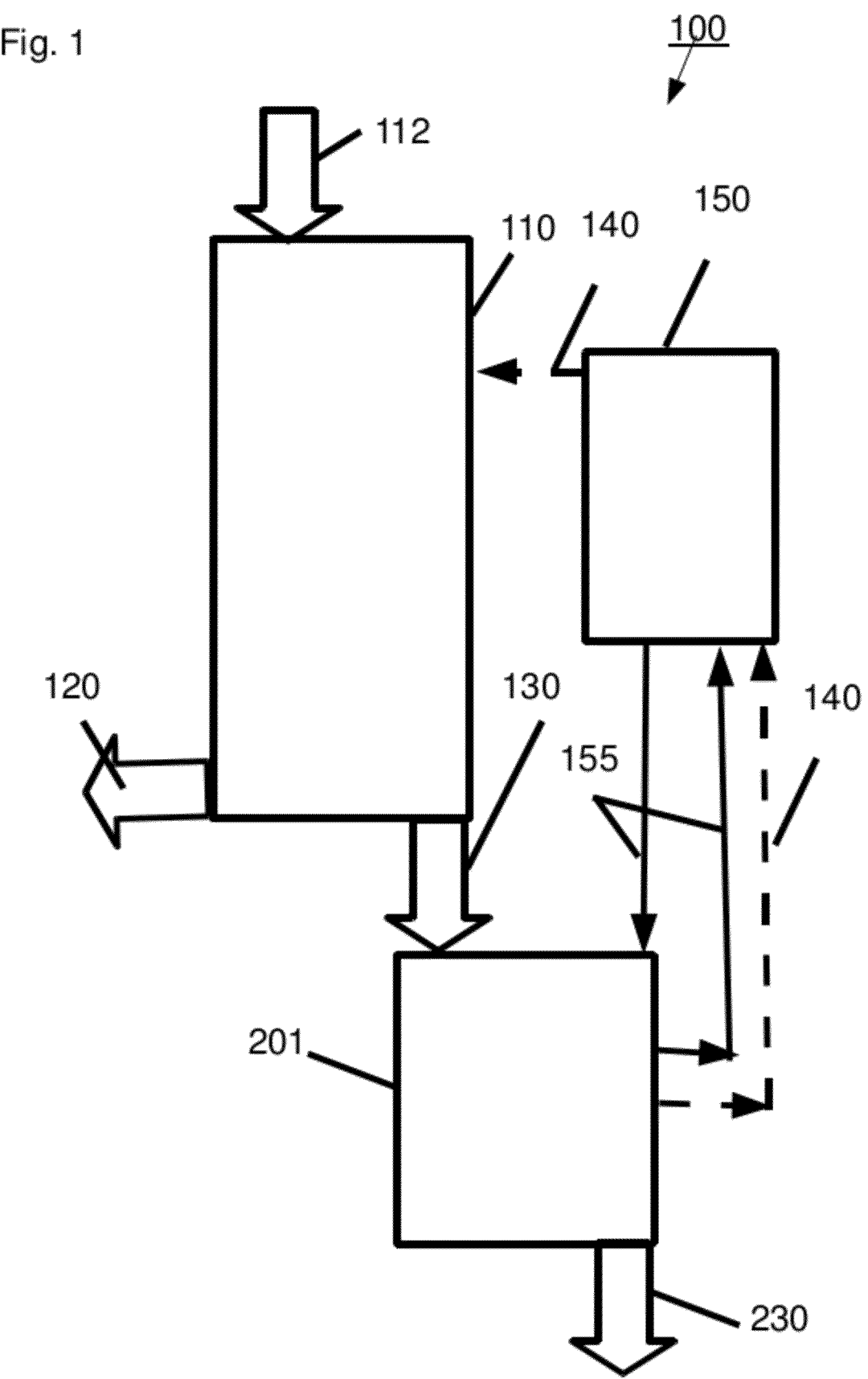
FIG. 1 is schematic overview of an exemplary system for hydrolysis of lignocellulosic substrate which serves as a context for some exemplary embodiments of the invention.

FIG. 1 is a simplified schematic diagram of a system for acid hydrolysis of a lignocellulosic substrate indicated generally as 100. Depicted system 100 includes a main hydrolysis reactor 110 adapted to receive a lignocellulosic substrate input 112. Optionally, substrate 112 is provided as wood chips, although any "woody material" as described hereinbelow can be used as lignocellulosic substrate input 112.

As used in this specification and the accompanying claims the term "woody material" or "lignocellulosic material" includes, but is not limited to, wood and by-products of wood processing (e.g. chips, sawdust, and shavings) as well as residual plant material from agricultural products and paper and paper industry byproducts (e.g. cellulose containing residues and/or paper pulp)

Residual plant material from agricultural products includes processing by-products and field remains.

Processing by-products include, but are not limited to, corn cobs, sugar cane bagasse, sugar beet pulp, empty fruit bunches from palm oil production, straw (e.g. wheat or rice), soy bean hulls, residual meals from the vegetable oil industry (e.g. soybean, peanut, corn or rapeseed), wheat bran and fermentation residue from the beer and wine industries.

Field remains include, but are not limited to, corn stover, post harvest cotton plants, post harvest soybean bushes and post harvest rapeseed plants.

Lignocellulosic materials also include "energy crops" such as switch grass and broom grass which grow rapidly and generate low-cost biomass specifically as a source of carbohydrates.

These lignocellulosic carbohydrate sources contain cellulose, hemicellulose and lignin as their main components and also contain mineral salts (ashes) and lipohilic organic compounds, such as tall oils.

Cellulose and hemicellulose are polysaccharides which can release sugars suitable for fermentation and/or chemical conversion to products of interest if they are hydrolyzed. Lignin is typically resistant to acid hydrolysis.

Although conversion of lignocellulosic material to sugars via enzyme-catalyzed and/or acid-catalyzed hydrolysis of polysaccharides and pyrolysis of lignocellulosic material have been previously described, industrial scale application of the proposed technologies has presented technical problems which remain to be overcome.

Substrate 112 is brought into contact with a concentrated solution of HCl (or another strong acid such as sulfuric acid) in reactor 110 and hemicellulose and/or cellulose in the substrate are hydrolyzed to produce a mixture of soluble sugars (product) and residual lignin (co-product). These materials are collected separately as sugar mixture 130 and lignin stream 120 (which also contains sugars), each of which contains a large amount of acid. In addition, sugar mixture 130 and lignin stream 120 each contains a variety of impurities which may originate in substrate 112 and/or result from degradation of sugars produced by hydrolysis.

Since the acid acts as a catalyst, it is not consumed in the process. Therefore, downstream use of sugar mixture 130 and/or lignin stream 120 may require that their acid content be reduced. According to various exemplary embodiments of the invention, separation of acid from sugar mixture 130 and/or lignin stream 120 is conducted under conditions minimizing thermal degradation of sugars.

Details of exemplary hydrolysis methods and systems are described in detail in co-pending U.S. provisional applications 61/483,777 and 61/487,319, each of which is fully incorporated herein by reference.

U.S. 61/358,894, which is fully incorporated herein by reference, describes processing of sugar mixture 130 including removal of acid and/or adjustment of the mixture in a sugar refining module, designated here generically as 201.

Optionally, additional sugar mixture is recovered from lignin stream 120 as described in co-pending U.S. provisional application US 61/491,243 which is fully incorporated herein by reference. In some exemplary embodiments of the invention, this additional sugar mixture is routed to refining module 201.

Refining module 201 employs a flow of organic solvent 155 (solid arrows) to extract acid 140 (dashed arrows) from sugar mixture 130.

Although de-acidified sugars 230 are the primary product of refining module 201, the module also produces a stream of acid 140 mixed with solvent 155 (depicted as parallel dashed and solid arrows respectively for clarity) which is routed to a solvent/acid recovery module 150. Recovery module 150 separates acid 140 from solvent 155. In some exemplary embodiments of the invention, separation is by distillation. Acid 140 is recycled to hydrolysis reactor 110 and de-acidified solvent 155 is recycled to refining module 201.

In some exemplary embodiments of the invention, acid and/or solvent are also recovered from lignin stream 120 and routed to recovery module 150. Briefly this involves separation of acid and sugars from lignin stream and recovery of these materials. This process is analogous to that described here for sugar stream 130 and optionally uses recovery module 150 or a parallel module with similar function.

According to various exemplary embodiments of the invention, recovery module 150 includes, or is in communication with, a contaminant reduction module 200. In other exemplary embodiments of the invention contaminant reduction module 200 is included in, or in communication with, refining module 201.

Contaminant reduction module 200 processes at least a portion of solvent 155 to reduce a contaminant burden therein. In some exemplary embodiments of the invention, the portion of solvent 155 processed by contaminant reduction module 200 is mixed with unprocessed solvent 155.

Although recovery module 150 is depicted and described here as operating on sugar mixture 130 via refining module 201, similar procedures can be applied to lignin stream 120 to produce additional exemplary embodiments of the invention.

Exemplary Contaminant Reduction Equipment

Figure 2:
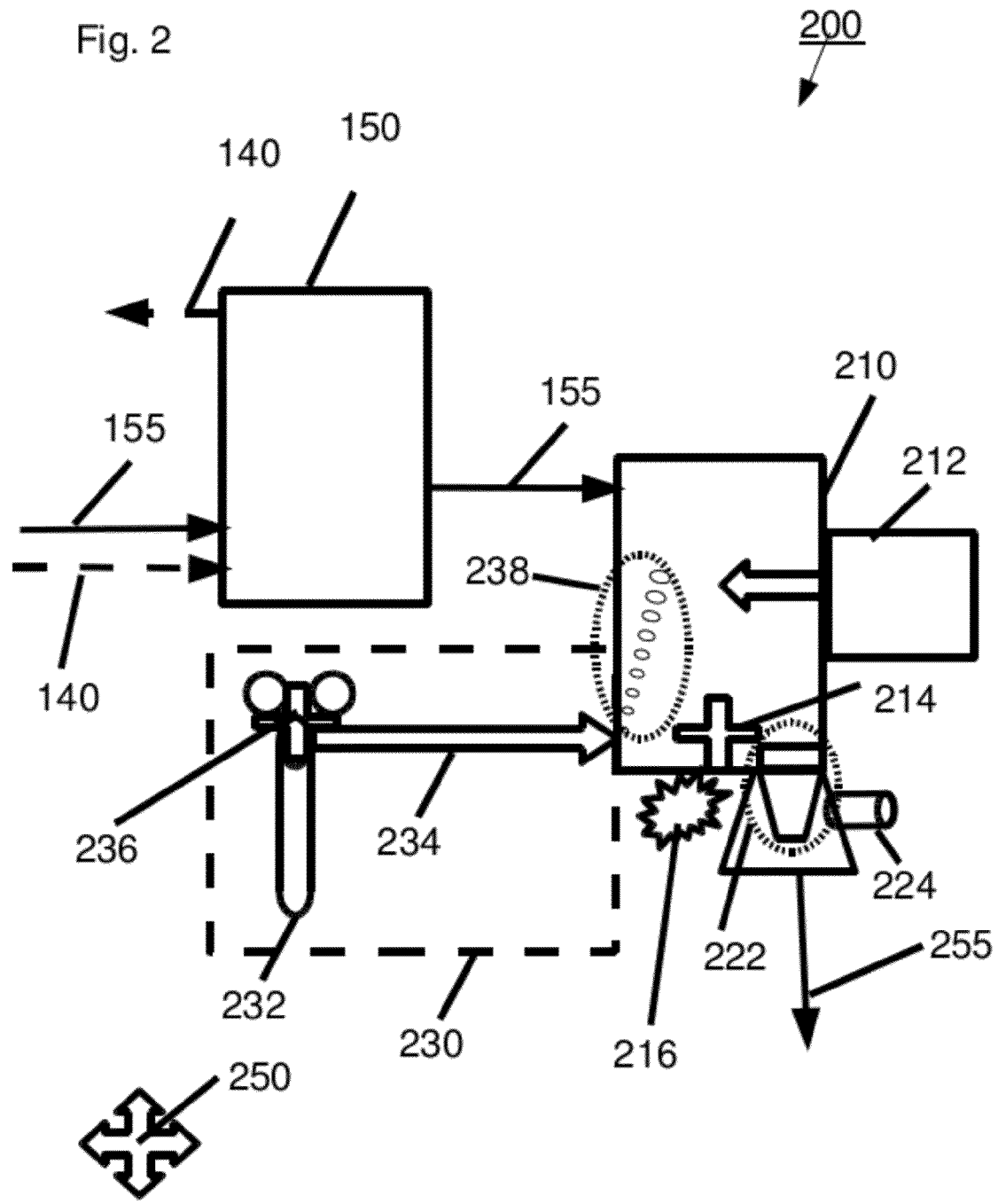
FIG. 2 is schematic representation of an exemplary contaminant reduction apparatus according to some exemplary embodiments of the invention.

FIG. 2 is a schematic representation of an exemplary contaminant reduction apparatus indicated generally as 200. Depicted exemplary apparatus 200 includes a decontamination module 210 adapted to contact lime with an extract, optionally a de-acidified extract comprising an S1 solvent carrying a contaminant load to produce limed extract.

In the depicted exemplary embodiment of the invention, there is an adaptation to contact lime with a de-acidified extract which includes a connection to recovery module 150 so that de-acidified extract (represented for simplicity as S1 solvent 155) is delivered to module 210 as indicated by rightward pointing solid arrow. Recovery module 150 can be described as a de-acidification module adapted to separate acid from an extract comprising acid and S1 solvent carrying a contaminant load and output the de-acidified extract.

In some exemplary embodiments of the invention, adaptation to contact lime with a de-acidified extract includes a connection to a lime source 212 which can deliver an appropriate amount of lime to module 210 as indicated by a leftward pointing hollow arrow.

Optionally, source 212 is adapted to deliver I unit of 10% lime slurry for every 20 units of S1 solvent introduced into module 210. Alternatively or additionally, source 212 is adapted to deliver 1 unit of lime solids for every 200 units of S1 solvent introduced into module 210.

Alternatively or additionally, in some exemplary embodiments of the invention, adaptation to contact lime with a de-acidified extract includes provision of a mixing mechanism in module 210. In the depicted embodiment, the mixing mechanism includes a mechanical stirrer 214 in module 210. In some exemplary embodiments of the invention, the mixing mechanism can include, for example, a shaker or rocker which moves all of module 210 so that liquid contained therein is agitated. In some exemplary embodiments of the invention, the mixing mechanism can include a re-circulation pump that creates a flow of liquid in module 210 so that the liquid contained therein is agitated.

Depicted exemplary apparatus 200 also includes a solids removal mechanism adapted to remove solids from limed extract resulting from contact between lime supplied by lime source 212 with de-acidified extract arriving from recovery module 150. According to various exemplary embodiments of the invention solids removal may include settling and/or decantation and/or centrifugation and/or filtration. In the depicted embodiment the solids removal mechanism includes a filter 222. In some exemplary embodiments of the invention, filter 222 is a gravimetric filter. In the depicted exemplary embodiment, filter 222 is connected to a vacuum source 224. Optionally, use of vacuum increase filtration rates. In some exemplary embodiments of the invention, decreasing a pore size in filter 222 contributes to an increase in efficiency of solids removal.

Depicted exemplary apparatus 200 includes an optional carbonatation mechanism 230 adapted to bubble a stream of gas 238 comprising $CO_2$ through limed extract present in module 210. In the depicted embodiment, carbonatation mechanism 230 includes a $CO_2$ source 232 depicted as a pressurized cylinder equipped with a regulator 236. $CO_2$ source 232 is connected to module 210 by a hose 234 (depicted as a rightward pointing arrow) which delivers a stream of gas 238 bubbles through limed extract present in module 210. According to various exemplary embodiments of the invention $CO_2$ source 232 can be provided as dry ice or as exhaust gas from a fermentor. In other exemplary embodiments of the invention, the apparatus is configured so that the carbonatation mechanism bubbles a stream of gas comprising $CO_2$ through removed solids, optionally provided as a slurry.

In the depicted embodiment, module 210 is equipped with a heat source 216 so that contacting between lime and the de-acidified extract can be conducted at a desired temperature.

In the depicted exemplary embodiment, apparatus 200 includes a controller 250 designed and configured to coordinate activity of module 210 with lime source 212 and/or de-acidification module 150. Alternatively or additionally, controller 250 can be designed and configured to operate components of module 210 such as heater 216 and/or the mixing mechanism (e.g. stirrer 214). Alternatively or additionally, controller 250 can be designed and configured to operate the solids removal mechanism (e.g. filter 222) in coordination with a schedule. Alternatively or additionally, controller 250 can be designed and configured to operate carbonatation mechanism 230, optionally in coordination with a schedule.

According to various exemplary embodiments of the invention design and configuration of controller 250 is performed so that a contaminant load in the limed extract after solids removal (255) is less than 80%; 70%; 60%; 50%; 40%; 30%; 20%; 10% of a contaminant load in extract 155 introduced into de-acidification module 150.

In some exemplary embodiments of the invention, design and configuration of controller 250 is performed so that that a contaminant load in said first portion is maintained in a desired range.

Exemplary Process Overview

Figure 3:
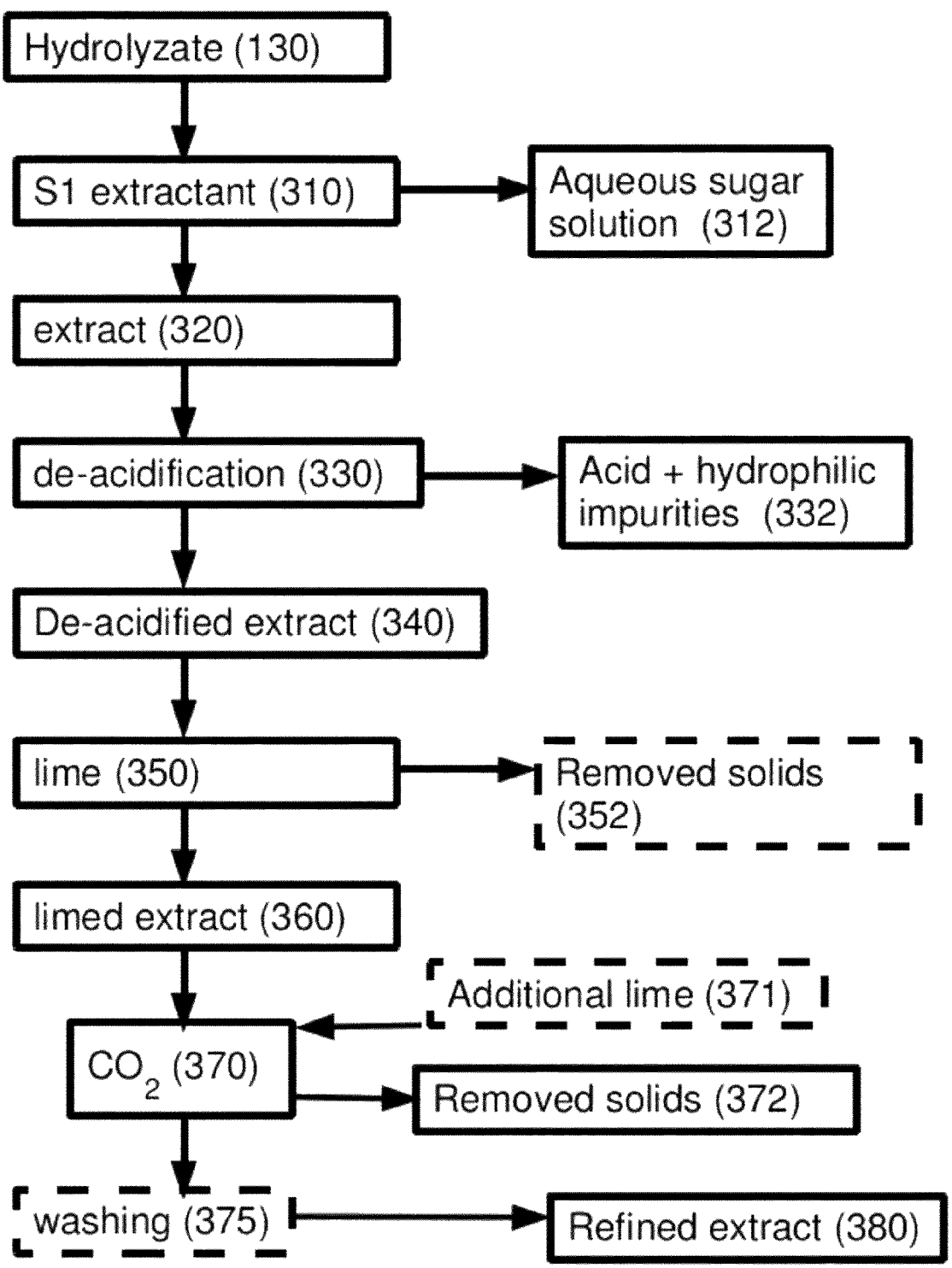
FIG. 3 is schematic overview of a contaminant reduction process according to some exemplary embodiments of the invention.

FIG. 3 is schematic overview of a contaminant reduction process according to some exemplary embodiments of the invention indicated generally as 300. According to exemplary process 300, a hydrolyzate 130 as described above in the context of FIG. 1 is contacted with an S1 extractant 310. Since S1 is only slightly soluble in water, this contacting produces an unstable mixture which is easily separated into an aqueous sugar solution 312 and an extract 320. Extract 320 contains significant amounts of acid (typically HCl) as well as S1 solvent and a contaminant load. Because the acid and S1 extractant 310 have separate roles in the scheme described above in the context of FIG. 1, it is desirable to attempt to separate them so that each can be re-cycled independently.

In the depicted embodiment, this separation is achieved (at least in part) by de-acidification 330 to produce a de-acidified extract 340 (still containing S1 solvent and the contaminant load). De-acidification 330 also produces acid 332 (typically HCl) containing hydrophilic impurities. In some exemplary embodiments of the invention, de-acidification 330 relies, at least in part, on distillation.

The remainder of depicted exemplary process 300 deals with reduction of the contaminant load present in extract 320 and carried through to de-acidified extract 340. In the depicted exemplary embodiment, de-acidified extract 340 is contacted with lime 350 to produce a limed extract 360. Optionally, solids 352 are removed at this stage. Removal can be, for example, by filtration and/or centrifugation and/or settling and/or decanting.

In the depicted exemplary embodiment limed extract 360 is carbonatated by bubbling a stream of $CO_2$ containing gas 370 through it. Carbonatation causes formation of calcium carbonate which is insoluble in the extract so that a slurry of calcium carbonate forms. Solids 372 are removed at this stage. Optionally, additional lime 371 is added prior to, or concurrent with removal of solids 372. Again, removal can be, for example, by filtration and/or centrifugation and/or settling and/or decanting.

Optionally, the extract is washed 375 with water to remove dissolved salts at this stage. The final product is a refined extract 380.

First Exemplary Method

Figure 4A:
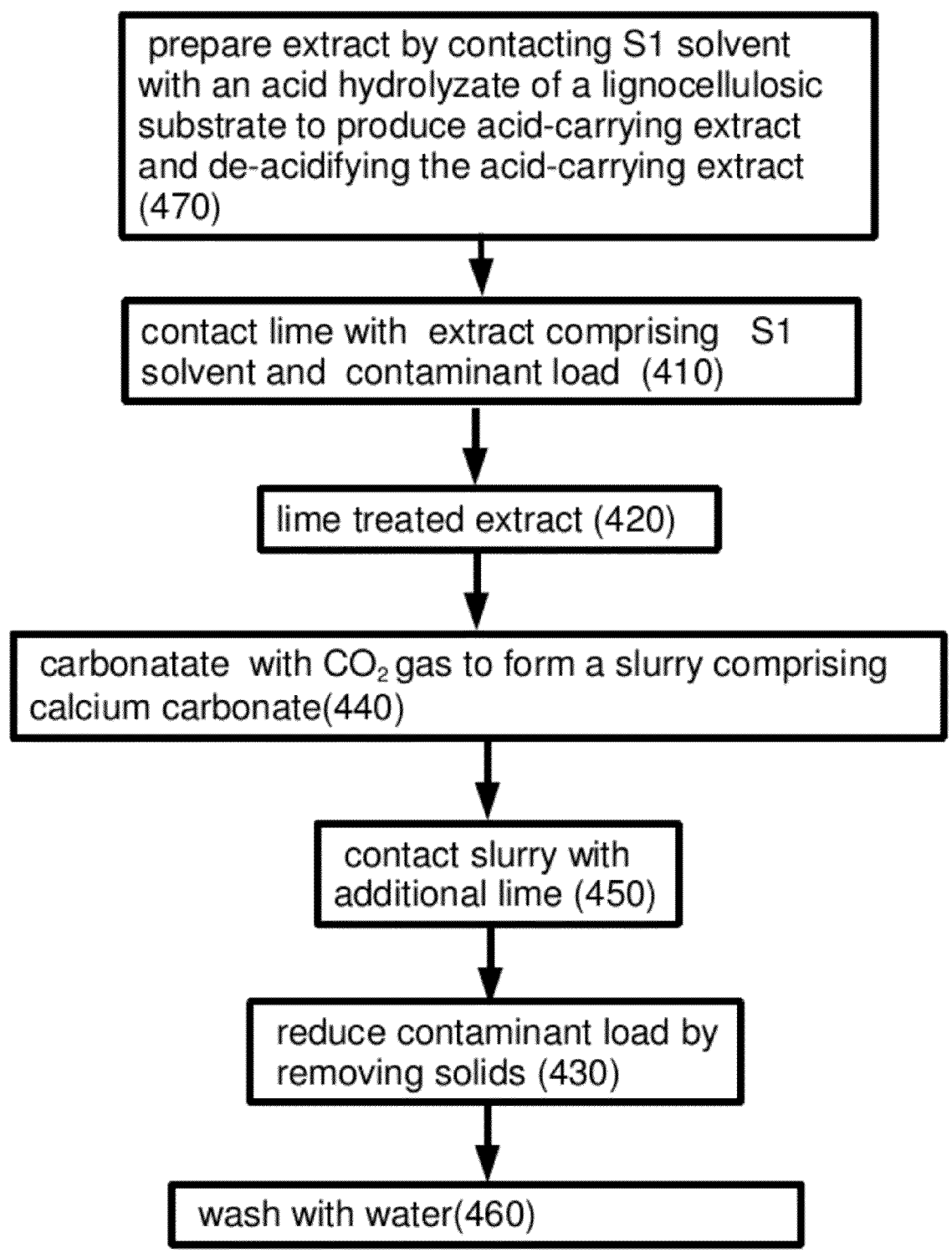
FIG. 4a is a simplified flow diagram of a method according to some exemplary embodiments of the invention.

FIG. 4a is a simplified flow diagram depicting a method to reduce a contaminant load in a solvent indicated generally as 400. Depicted exemplary method 400 includes contacting 410 lime with an extract comprising an S1 solvent and a contaminant load to form a lime treated extract 420 and reducing 430 the contaminant load by removing solids. In some exemplary embodiments of the invention, the lime employed at contacting 410 includes 25; 30; 35; 40; 45; 50; 55; 60; 65; 70 or 75% or intermediate or greater percentages of lime recycled from a previous round of contacting. Optionally, this recycling is repeated. In some exemplary embodiments of the invention, the repetition is with a constant percentage and/or a varying percentage of lime. Optionally, contacting 410 reduces the contaminant load in ways not directly related to solids removal, as described below in the section entitled "exemplary hydrolysis considerations".

In some exemplary embodiments of the invention, method 400 includes carbonatating 440 lime treated extract 420 with $CO_2$ gas to form a slurry comprising calcium carbonate. Optionally, this occurs before reducing 430 the contaminant load by removing solids. Removal of solids at this stage is indicated as 372 in FIG. 3.

In other exemplary embodiments of the invention, carbonatating 440 is performed on removed solids 352 (FIG. 3) from extract 420 to form a slurry comprising calcium carbonate.

Optionally, method 400 includes contacting the slurry with additional lime 450 before and/or during reducing 430 the contaminant load by removing solids. Optionally, the removed solids are recovered as described below in the context of item 680 (FIGS. 6a and/or 6b). In some exemplary embodiments of the invention, a portion of the removed solids are salts of esters derived from the solvent. Optionally, removal of these esteric salts contributes to reduction of the contaminant load and/or regenerates solvent. In some exemplary embodiments of the invention, method 400 includes washing 460 with water. Optionally, wash 460 removes residual salts, such as calcium salts.

In some exemplary embodiments of the invention, contacting 410 has a duration of at least 1 minute and/or occurs at a temperature of at least 50° C. Optionally, the contacting temperature is 60, 70, 60, 90, 100 or 110 degrees centigrade or intermediate or higher temperatures. Alternatively or additionally, the contact time is optionally at least 5, 10, 20, 40, 80 or 160 minutes or intermediate or longer times. Alternatively or additionally, the contact time is less than 10, 9, 8, 7, 6, 5, 4, 3, 2 or 1 hours. In some exemplary embodiments of the invention, the contact time is in the range of 5 minutes to 120 hours, optionally 10 minutes to 8 hours, optionally 1 hour to 5 hours.

In some exemplary embodiments of the invention, S1 includes, consists of, or consists essentially of, an alcohol, and the contaminant load includes an alkyl chloride corresponding to said alcohol. Alternatively or additionally, in some exemplary embodiments of the invention S1 includes, consists of, or consists essentially of, an alcohol, and the contaminant load includes an alcohol-carboxylic acid ester. Exemplary alcohol-carboxylic acid esters include, but are not limited to formates, acetates, and levulinates.

Alternatively or additionally, the contaminant load may optionally include one or more of phenols, aldehydes, furfurals (e.g. furfural and hydroxymethylfurfural), chloride complexes of transition metals, tall oils, wood extractives and products of their reaction with acid and/or the S1 extractant.

According to various exemplary embodiments of the invention, the contaminant load is reduced by at least 20, optionally at least 30, optionally at least 40, optionally at least 50, optionally at least 60, optionally at least 70, optionally at least 80, optionally at least 90% or intermediate or greater percentages.

In some exemplary embodiments of the invention, method 400 includes preparing 470 the extract by contacting the S1 solvent with an acid hydrolyzate of a lignocellulosic substrate to produce an acidic extract and de-acidifying the acidic extract to produce the extract employed at 410 as shown in FIG. 4a.

Alternatively or additionally, method 400 includes preparing 470 the extract by contacting the extractant comprising said S1 solvent with an acid comprising lignin composition to produce the extract employed at 410 as shown in FIG. 4a.

In some exemplary embodiments of the invention, the apparent pH of lime treated extract 420 is at least 6.5. In some exemplary embodiments of the invention, the apparent pH of lime treated extract 420 is not more than 8.5. Optionally, the apparent pH of lime treated extract 420 is between 6.5 and 8.5, optionally between 7 and 8, optionally between 7.3 and 7.6.

As used in this specification and the accompanying claims the term "apparent pH" of an organic solution indicates the pH in an aqueous solution in equilibrium with the organic solution.

Alternatively or additionally, in some exemplary embodiments of the invention, the pH of the slurry produced at 440 is at least 6.5. In some exemplary embodiments of the invention, the pH of the slurry produced at 440 is not more than 8.5. Optionally, the pH of the slurry produced at 440 is between 6.5 and 8.5, optionally between 7 and 8, optionally between 7.3 and 7.6.

Second Exemplary Method

Figure 4B:
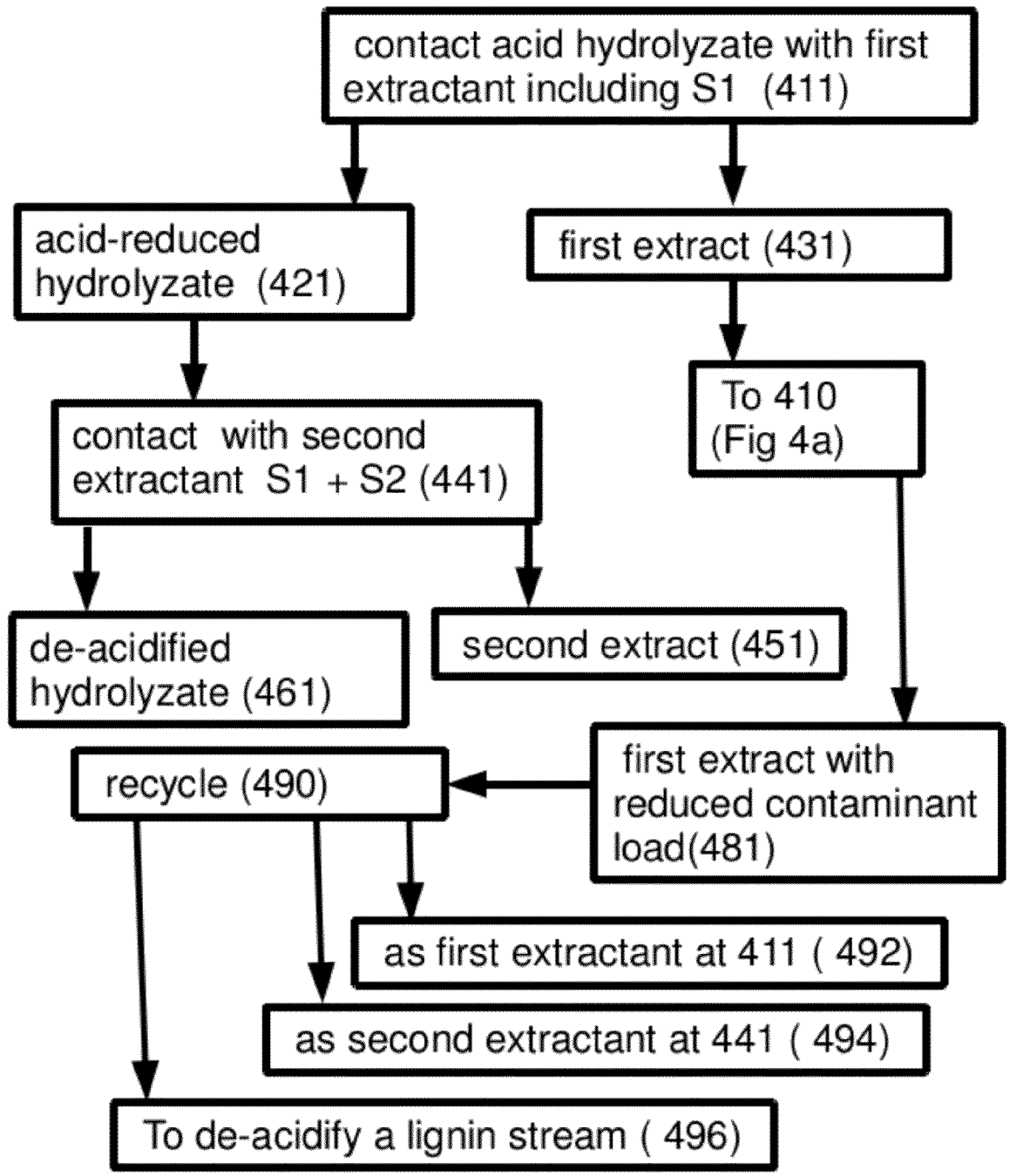
FIG. 4b is a simplified flow diagram of a method according to some exemplary embodiments of the invention.

FIG. 4b is a simplified flow diagram of a solvent recycling method according to some exemplary embodiments of the invention depicted generally as method 401. Depicted exemplary method 401 includes contacting 411 an acid hydrolyzate (e.g. 130 in FIG. 1) of a lignocellulosic substrate with a first extractant comprising an S1 solvent to produce an acid-reduced hydrolyzate 421 containing sugars and a first extract 431 containing S1 solvent carrying a contaminant load. The contaminant load includes contaminants extracted from the hydrolyzate by contacting 411 and optionally contaminants which were present prior to contacting 411.

In depicted exemplary embodiment 401, acid-reduced hydrolyzate 421 is contacted 441 with a second extractant comprising an S1 solvent and an S2 solvent to produce a de-acidified hydrolyzate 461 containing sugars and a second extract 451 comprising S1 solvent, S2 solvent, acid and water.

In other exemplary embodiments of the invention, transformation of acid-reduced hydrolyzate 421 to de-acidified hydrolyzate 461 is carried out by other methods. Optionally, two, three, four or five or more rounds of contacting 411 are conducted. Optionally, a second hydrolysis reaction is performed between a pair of these rounds of contacting 411. Alternatively or additionally, chromatographic separation, such as ion exchange chromatography, may be employed (see description of FIG. 7 below).

In some exemplary embodiments of the invention, first extract 431 is treated by method 400 (FIG. 4a; beginning from contacting 410) to produce a first extract with a reduced contaminant load 481. According to method 401, at least a portion of extract 481 with a reduced contaminant load is recycled 490.

Optionally, recycling 490 includes use 492 of at least a portion of extract 481 with a reduced contaminant load as part of the first extractant at 411. Alternatively or additionally, recycling 490 optionally includes use 494 of at least a portion of extract 481 with a reduced contaminant load as part of the second extractant at 441. Alternatively or additionally, recycling 490 optionally includes use 496 of at least a portion of extract 481 with a reduced contaminant load to de-acidify a lignin stream.

Third Exemplary Method

FIG. 4c is a simplified flow diagram of a solvent recycling method according to some exemplary embodiments of the invention depicted generally as method 402. Depicted exemplary method 402 relates to de-acidification 496 (FIG. 4b) of a lignin stream (e.g. 120 in FIG. 1). Depicted exemplary method 402 includes de-acidifying 496 the lignin stream to produce an acid-depleted lignin stream 412 and an acidic extract 422 of lignin comprising S1. The remainder of method 402 relates to treatment of extract 422.

Depicted method 402 includes separating acid 432 from acidic extract 422 to form separated acid 442 and S1 452 recovered from lignin carrying a contaminant load.

In some exemplary embodiments of the invention, S1 452 recovered from lignin carrying a contaminant load is treated by method 400 (FIG. 4a; beginning from contacting 410) to produce S1 462 recovered from lignin carrying a reduced contaminant load.

Depicted exemplary method 402 includes recycling 472 at least a portion of S1 462 recovered from lignin carrying a reduced contaminant load.

Optionally, recycling 472 includes using 493 at least a portion of S1 462 recovered from lignin carrying a reduced contaminant load as part of the first extractant at 411 (FIG. 4b).

Alternatively or additionally, recycling 472 includes using 495 at least a portion of S1 462 recovered from lignin carrying a reduced contaminant load as part of the second extractant at 441 (FIG. 4b).

Alternatively or additionally, recycling 472 includes using 497 at least a portion of S1 462 recovered from lignin carrying a reduced contaminant load to de-acidify 496 a lignin stream.

Fourth Exemplary Method

Figure 5:
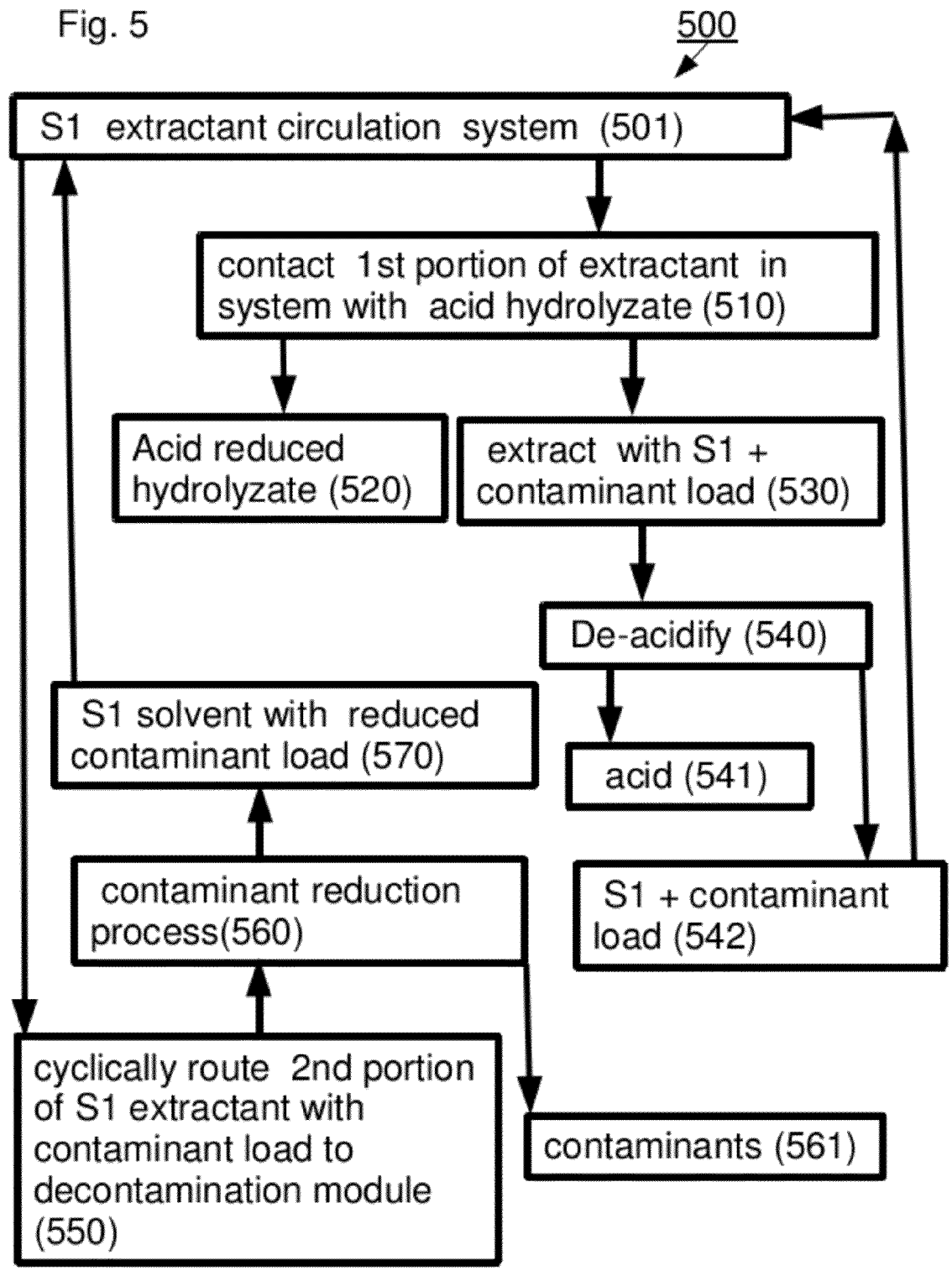
FIG. 5 is a simplified flow diagram of a method according to some exemplary embodiments of the invention.

FIG. 5 is a simplified flow diagram of a solvent recycling method according to some exemplary embodiments of the invention depicted generally as method 500. Depicted exemplary method 500 manages flow of an S1-extractant circulation system 501.

In some exemplary embodiments of the invention, S1 extractant circulation system 501 is installed in the context of system 100 as depicted in FIG. 1. In some exemplary embodiments of the invention, S1 extractant circulation system 501 is designed and configured to bring an extractant containing S1 into contact with acid hydrolyzate 130 and/or lignin stream 120. Various exemplary uses of S1 solvent circulating in the system are described hereinabove in the context of FIGS. 4b (e.g. 490; 492; 494; 496) and 4c (e.g. 472; 493; 495 and 497).

As will become clear from the following explanation, S1 extractant circulation system 501 contains a mixture of de-acidified extract 340 and refined extract 380 (FIG. 3).

Depicted exemplary method 500 includes cyclically contacting 510 a first portion of S1 extractant in system 501 with an acid hydrolyzate of a lignocellulosic substrate to produce an acid reduced hydrolyzate 520 and an extract 530 comprising acid and S1 solvent carrying a contaminant load. Since contacting 510 is cyclic, the contaminant load would tend to increase in proportion to the number of cycles if no action to reduce the contaminant load is implemented.

Depicted exemplary method 500 also includes de-acidifying 540 extract 530 and removing acid 541 from system 501. Optionally, acid 541 is recycled to the hydrolysis reaction in 110 (FIG. 1). De-acidifying 540 produces a de-acidified extract comprising S1 542 carrying a contaminant load which is returned to system 501. S1 542 carrying the contaminant load is analogous to de-acidified extract 340 of FIG. 3.

System 501 also carries water. Due to the properties of S1 solvents described above, this water tends to migrate to the acid phase, however some water will be present in S1 542 carrying a contaminant load and this water will return to system 501.

Depicted exemplary method 501 also includes cyclically routing 550 a second portion of S1 extractant carrying a contaminant load to a decontamination module which applies a contaminant reduction process 560 to the S1 solvent to produce S1 solvent 570 with a reduced contaminant load which is returned to system 501. S1 solvent 570 with a reduced contaminant load is analogous to refined extract 380 of FIG. 3.

In the depicted embodiment, the process which is depicted as a linear progression in FIG. 3 is implemented as two separate processing loops which intersect at system 501. Division of the linear progression into separate processing loops allows separate regulation of the relative amount of S1 in system 501 which is subject to the two halves of the total process (i.e. the relative sizes of the first portion at 510 and the second portion at 550).

Optionally, method 500 includes cyclically contacting a third portion of an extractant comprising S1 solvent in system 501 with an acid comprising lignin stream from hydrolysis of a lignocellulosic substrate to produce an acid reduced lignin stream and an extract comprising S1 solvent and a contaminant load. This extract is depicted as "distillation purge" 611 in FIG. 6b hereinbelow. The third portion can optionally be diverted from the first portion, the second portion, or from system 501. In some exemplary embodiments of the invention, a size of the third portion is larger than a size of the second portion.

Fifth Exemplary Method

FIG. 7 is a simplified flow diagram of a solvent recycling method according to some exemplary embodiments of the invention depicted generally as method 700. Depicted exemplary method 700 includes contacting 711 an acid hydrolyzate of a lignocellulosic substrate with a flow of extractant comprising an S1 solvent to produce an acid-reduced hydrolyzate 721 containing sugars and a first extract 731 containing S1 solvent and a contaminant load.

Depicted exemplary method 700 includes subjecting acid-reduced hydrolyzate 721 to secondary hydrolysis reaction and chromatographic separation 741 to produce a de-acidified hydrolyzate 761 containing sugars. In the depicted embodiment, de-acidified hydrolyzate 761 is contacted 731 with the extractant at an upstream point in the flow. Since the extractant flows in a countercurrent direction to the hydrolyzate, contacting 731 is a "first contact" from the standpoint of the extractant and a "second" contact from the standpoint of the hydrolyzate. Conversely, contacting 711 is a "first contact" from the standpoint of the hydrolyzate and a "second" contact from the standpoint of the extractant.

In the depicted embodiment, first extract 731 is treated by a method according to as described above (FIG. 4a; 410) to produce a first extract 781 with a reduced contaminant load. Method 700 includes recycling 790 at least a portion of extract 781 with a reduced contaminant load. According to various exemplary embodiments of the invention recycling 790 includes use 792 as first extractant at 711 and/or use 796 to deacidify a lignin stream.

Sixth Exemplary Method

Figure 8A:
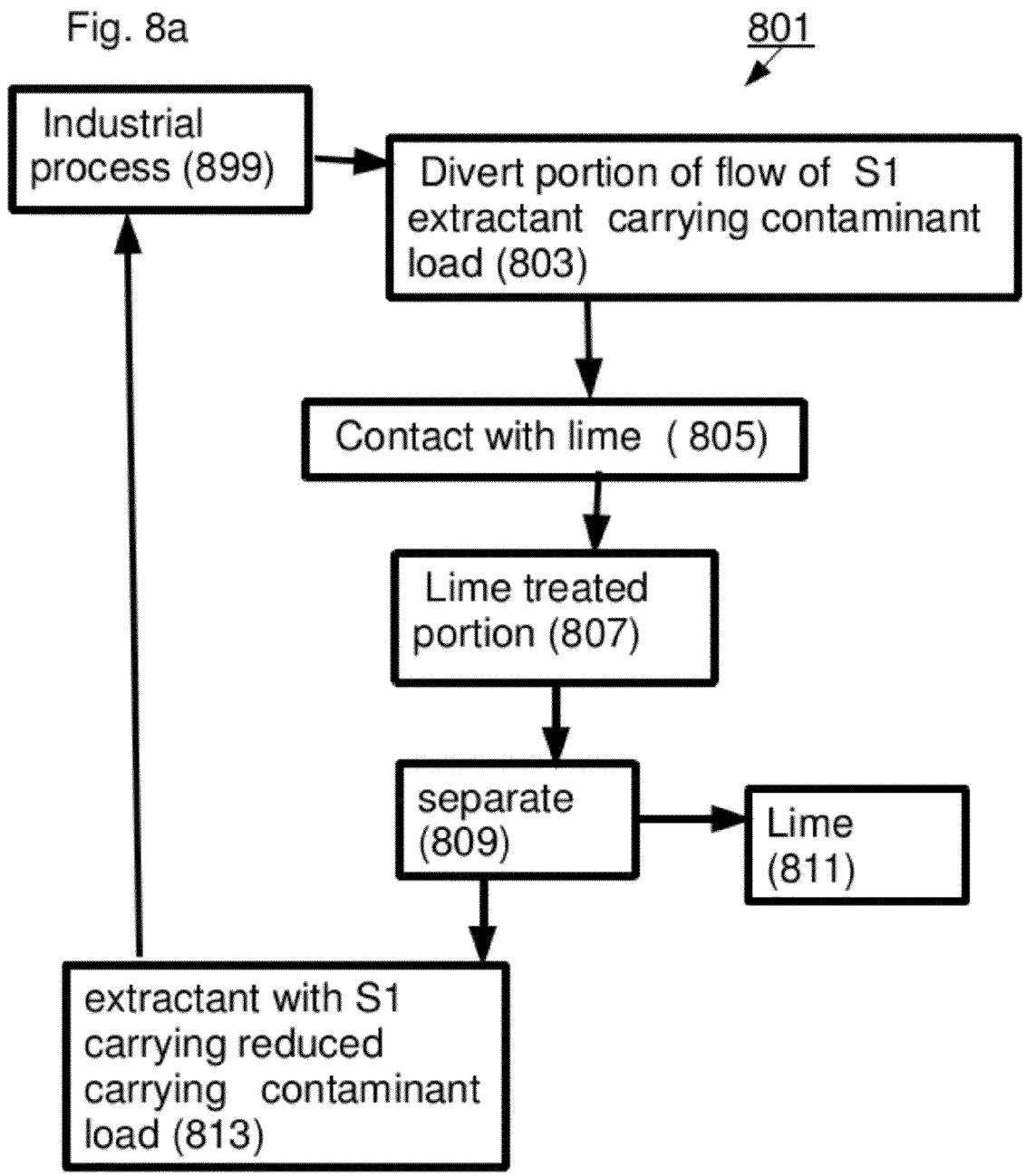
FIG. 8a is a simplified flow diagram of a method according to some exemplary embodiments of the invention.

FIG. 8a is a simplified flow diagram of a method for recycling extractant in an industrial process according to some exemplary embodiments of the invention depicted generally as method 801.

Depicted exemplary method 801 includes diverting 803 a portion of an extractant flow comprising S1 solvent carrying a contaminant load from an industrial process 899 and contacting 805 the portion with lime to form a lime treated portion 807.

Depicted exemplary method 801 also includes separating 809 the lime 811 from lime treated portion 807 to form extractant 813 comprising S1 solvent carrying a reduced contaminant load re-using extractant 813 in the industrial process 899.

Optionally, industrial process 899 is acid-catalyzed hydrolysis of a lignocellulosic substrate.

In some exemplary embodiments of the invention, method 801 includes carbonatating a liquid and/or solid resulting from lime treated portion 807 before and/or after separation 809 with $CO_2$ gas to form a slurry comprising calcium carbonate.

Optionally, the diverted portion of the extractant is at least 30% of the extractant in process 899.

Seventh Exemplary Method

Figure 8B:
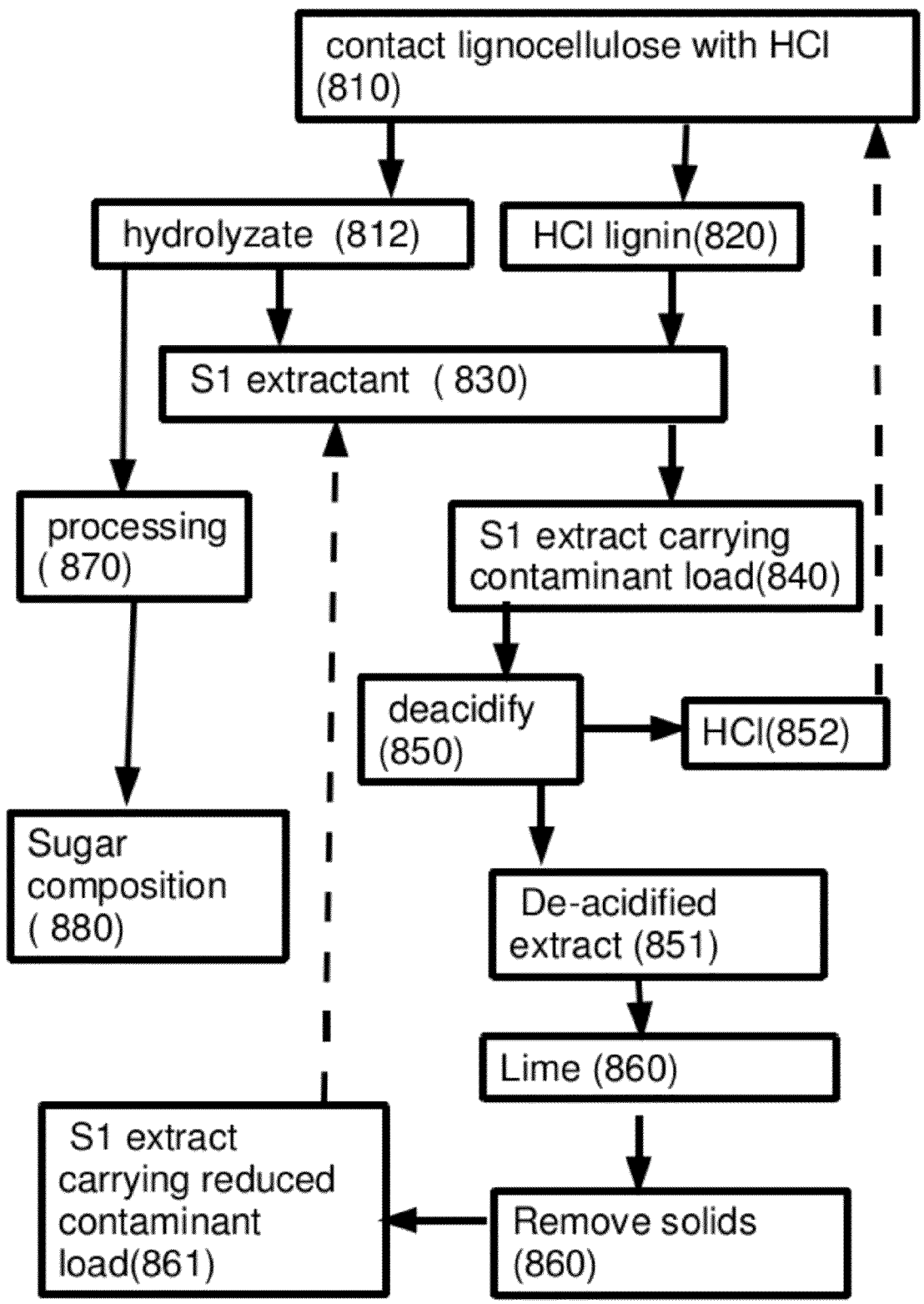
FIG. 8b is a simplified flow diagram of a method according to some exemplary embodiments of the invention.

FIG. 8b is a simplified flow diagram of sugar production method according to some exemplary embodiments of the invention depicted generally as method 802.

Depicted exemplary method 802 includes contacting 810 a lignocellulosic substrate with hydrochloric acid to produce a hydrolyzate 812 and an HCl-comprising lignin composition 820.

Exemplary method 802 includes treating at least one of hydrolyzate 812 and lignin composition 820 with an extractant 830 comprising S1 solvent to form an extract 840 comprising S1 solvent carrying a contaminant load. Exemplary method 802 includes de-acidifying 850 extract 840 to form de-acidified extract 851 and contacting lime 860 with de-acidified extract 851 to form a lime treated extract.

Method 802 includes reducing the contaminant load by removing solids 860 to form an extract 861 with reduced contaminant load. In some exemplary embodiments of the invention, at least a portion of extract 861 is used in treating at 830. Alternatively or additionally, at least a portion of HCL 852 can be used in the hydrolysis at 810.

Depicted exemplary method 802 also includes processing 8790 hydrolyzate 812 to produce a sugar composition 880.

Optionally, sugar composition 880 contains at least 1 ppm of an impurity from the contaminant load. Sugar composition 880 is an additional exemplary embodiment of the invention.

Eighth Exemplary Method

Figure 8C:
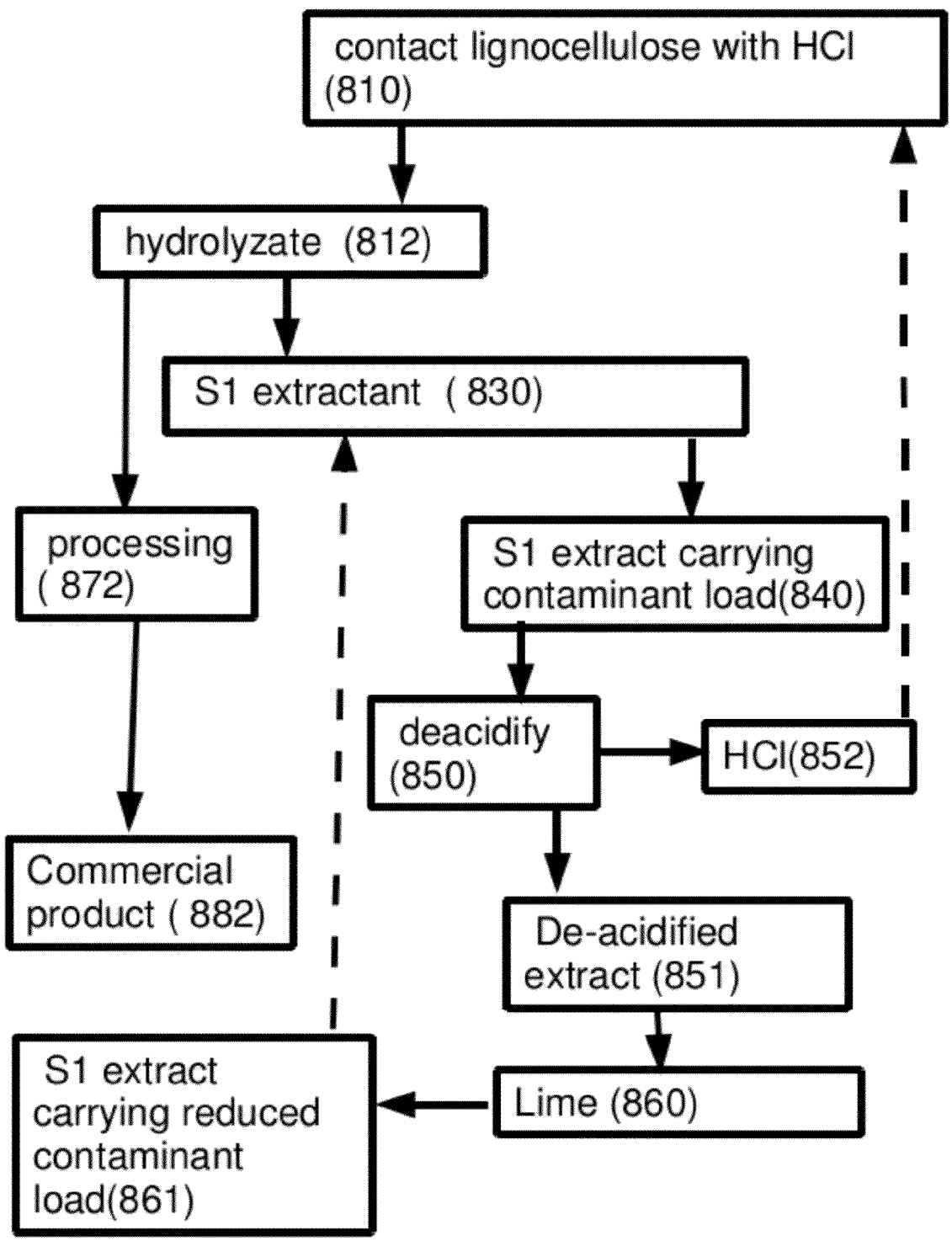
FIG. 8c is a simplified flow diagram of a method according to some exemplary embodiments of the invention.

FIG. 8c is a simplified flow diagram of a production method for commercial products according to some exemplary embodiments of the invention depicted generally as method 804.

Depicted exemplary method 804 includes contacting 810 a lignocellulosic substrate with hydrochloric acid to produce a hydrolyzate 812 and extracting hydrolyzate 812 with an extractant 830 comprising S1 solvent to form an extract comprising S1 solvent 840 carrying a contaminant load. In the depicted embodiment, extract 840 is de-acidified 850 to form de-acidified extract 851 and recover hydrochloric acid 852.

In the depicted exemplary embodiment. de-acidified extract 851 is contacted with lime 860 to recover S1 solvent 861 carrying a reduced contaminant load. In the depicted exemplary embodiment, processing 872 of hydrolyzate 812 produces a commercial product 882.

In some exemplary embodiments of the invention, commercial product 882 is an acrylic-based or poly-acrylic based product. Such products include, but are not limited to plastics, floor polishes, carpets, paints, coatings, adhesives, dispersions, flocculants, elastomers, acrylic glass, absorbent articles, incontinence pads, sanitary napkins, feminine hygiene products, and diapers.

Products 882 produced according to method 804 are additional exemplary embodiments of the invention.

Exemplary Contaminant Load Regulation Considerations

Since S1 solvent in system 501 re-circulates, addition to the contaminant load at 510 creates a need for a compensatory removal from the contaminant load at 560. If this need is not met, the contaminant load in system 501 will increase and will eventually reach a point where it interferes with the extraction at 510. According to various exemplary embodiments of the invention different ways to achieve this compensation are implemented.

Some of the ways to achieve this compensation rely on volume regulation.

In some exemplary embodiments of the invention, a size of the first portion at 510 is larger than a size of the second portion at 550. Optionally, this strategy may be advantageous if contaminant reduction process 560 is efficient. In this context "efficient" means that a total amount of contaminants removed from the second portion by contaminant reduction process 560 is at least equal to a total amount of contaminants added to the first portion, despite the fact that the first portion is larger.

In other exemplary embodiments of the invention, a size of the first portion at 510 is smaller than a size of the second portion at 550. Optionally, this strategy may be advantageous if contaminant reduction process 560 is inefficient. In this context "inefficient" means that a total amount of contaminants removed from the second portion by contaminant reduction process 560 will only be at least equal to a total amount of contaminants added to the first portion if the second portion is larger.

Alternatively or additionally, some of the ways to achieve this compensation consider and/or rely on frequency regulation.

In some exemplary embodiments of the invention, a frequency of cyclically contacting 510 is higher than a frequency of cyclically routing 550. In some exemplary embodiments of the invention, the extraction which occurs at 510 to produce extract 530 is a counter current extraction. Optionally, counter current extraction takes a relatively short time (e.g. seconds to minutes). In some exemplary embodiments of the invention, hydrolyzate 130 is withdrawn from reactor 110 on an ongoing basis and the extraction at 510 is likewise ongoing. In this situation, the rate of addition to the contaminant load is high, at least partly because the frequency of addition to the contaminant load approaches infinity. In contrast, contaminant reduction process 560 may take a longer time to implement (e.g. tens of minutes to hours). In some exemplary embodiments of the invention, the second portion at 550 can be made sufficiently larger than the first portion at 510 to insure that the total contaminant load in system 501 does not increase due to the frequency difference. These considerations are in addition to the "efficiency" considerations discussed above.

In other exemplary embodiments of the invention, a frequency of cyclically contacting 510 is lower than a frequency of said cyclically routing 550. This may occur if removal of hydrolyzate 130 from reactor 110 is batch-wise (i.e. a fixed volume at defined intervals). If the intervals are long (e.g. once in 8 hours), two or more rounds of contaminant reduction process 560 may be conducted in this time). Again, these considerations are in addition to the "efficiency" considerations discussed above.

In some exemplary embodiments of the invention, cyclically contacting 510 and cyclically routing 550 are coordinated so that a contaminant load in the first portion at 510 is maintained in a desired range.

In some exemplary embodiments of the invention, contaminant reduction process 560 includes treatment with lime and/or carbonatation and/or solids removal as described above.

First Exemplary Contaminant Reduction Process

FIG. 6*a* is a schematic representation of materials flow consistent with some exemplary embodiments of method 500 indicated generally as 600. Depicted exemplary materials flow 600 corresponds to the left side of method 500 from cyclically routing 550 to the return of S1 solvent 570 with reduced contaminant load 570 to system 501. Materials flow 600 is presented to illustrate in greater detail one exemplary way to carry out contaminant reduction process 560.

In depicted exemplary materials flow 600, carbonatation is conducted without removal of S1 solvent.

Referring now to FIG. 6*a* as well as FIG. 5:

In FIG. 6*a*, system 501 is represented schematically as a horizontal solid arrow at the top of the page. Solid arrows are used throughout the figure to indicate a flow of S1 solvent. Dashed arrows are used throughout the figure to indicate a flow of lime suspension. Dotted arrows are used throughout the figure to indicate a flow of aqueous waste.

In depicted materials flow 600, a flow splitter 610 cyclically routes 550 S1 solvent from system 501 to a lime contact chamber 620 where a lime suspension is added as indicated by the dashed arrow. Alternatively or additionally, a distillation purge 611 is added at this stage (hollow arrow). Optionally, only distillation purge 611 is added.

In some exemplary embodiments of the invention, distillation purge 611 includes a stream of solvent originating from flash distillation used to separate HCl from solvent in purification of lignin stream 120. Details of this flash distillation process are provided in co-pending application U.S. 61/491,243 which is fully incorporated herein by reference. Optionally, use of distillation purge 611 reduces a chance that portions of the contaminant load related to lignin purification will cross over to sugar purification procedures. In some cases, this may contribute to increased purity of the final sugar product.

Contact of lime and S1 containing extractant in chamber 620 marks the beginning of contaminant reduction process 560 (FIG. 5) according to the depicted embodiment. According to various exemplary embodiments of the invention splitter 610 diverts 10, 20, 30, 40, 50, 50, 70, 80, or 90% or intermediate or greater percentages of the flow in system 501 to lime contact chamber 620. Optionally, the percentage varies in accord with frequency and/or efficiency considerations as discussed above.

In depicted exemplary materials flow 600, the S1 solvent mixed with lime suspension then flows to a second lime contact chamber 621 where it is carbonatated with a stream of $CO_2$ bubbles 630 to produce a calcium carbonate slurry. The carbonatated mixture is then transferred to lime contact chamber 622. Optionally, additional lime is added at this stage as indicated by the dashed arrow.

Although the flow of materials from contact chamber 620 to 621 and then to 622 is indicated by a solid arrow, the flow at this stage is a mixture of S1 and lime suspension, optionally with calcium carbonate (after carbonatation).

Optionally, each of contact chambers 620, 621 and 622 includes a mixer and/or heater (not depicted). According to various exemplary embodiments of the invention the mixture of S1 and lime suspension is incubated in each of chambers 620, 621 and 622 for a desired time under desired conditions.

The mixture exiting chamber 622 is now depicted as two separate arrows for clarity (dashed indicating lime; solid indicating S1). Again, each of these streams carries water, which is not separately depicted at this stage.

In this exemplary embodiment, contaminant reduction process 560 (FIG. 5) continues with cyclonic separation of S1 from lime. In the depicted embodiment two cyclonic separators 640 and 642 are provided in series.

In the depicted embodiment S1 solvent exiting the top of each of cyclonic separators 640 and 642 is routed to a wash unit 650. In wash unit 650 the S1 solvent stream is mixed thoroughly with water (hollow arrow). This washing can remove salts, such as calcium salts as well as other water soluble contaminants which may be present at this stage. The upward pointing arrow indicated return of S1 to system 501 and the conclusion of contaminant reduction process 560 from the standpoint of the solvent.

Residual wash water from wash unit 650 is optionally routed back to cyclonic separator 640 as indicated by the dotted line. In some exemplary embodiments of the invention, a portion of this water is diverted by a flow splitter 660 to lime suspension generator 660, where it is mixed with solid lime (grey arrow) and optionally additional water (white arrow) to generate lime suspension (rightward dashed arrow). The lime suspension may be used, for example, in lime contact chamber 620 and/or 622.

Returning now to cyclonic separators 640 and 642, lime suspension exiting separator 642 can be filtered in a filter unit 670. The resultant aqueous solution (dotted lines) can optionally be recycled to cyclonic separator 640 as indicated.

Solids accumulating in filter 670 can periodically be removed as a solids cake 680.

Although not explicitly depicted in FIG. 6a, a controller of the same type as controller 250 (FIG. 2) can be installed to control a flow of one or more streams in materials flow 600 in some exemplary embodiments of the invention.

Second Exemplary Contaminant Reduction Process

Figure 6B:
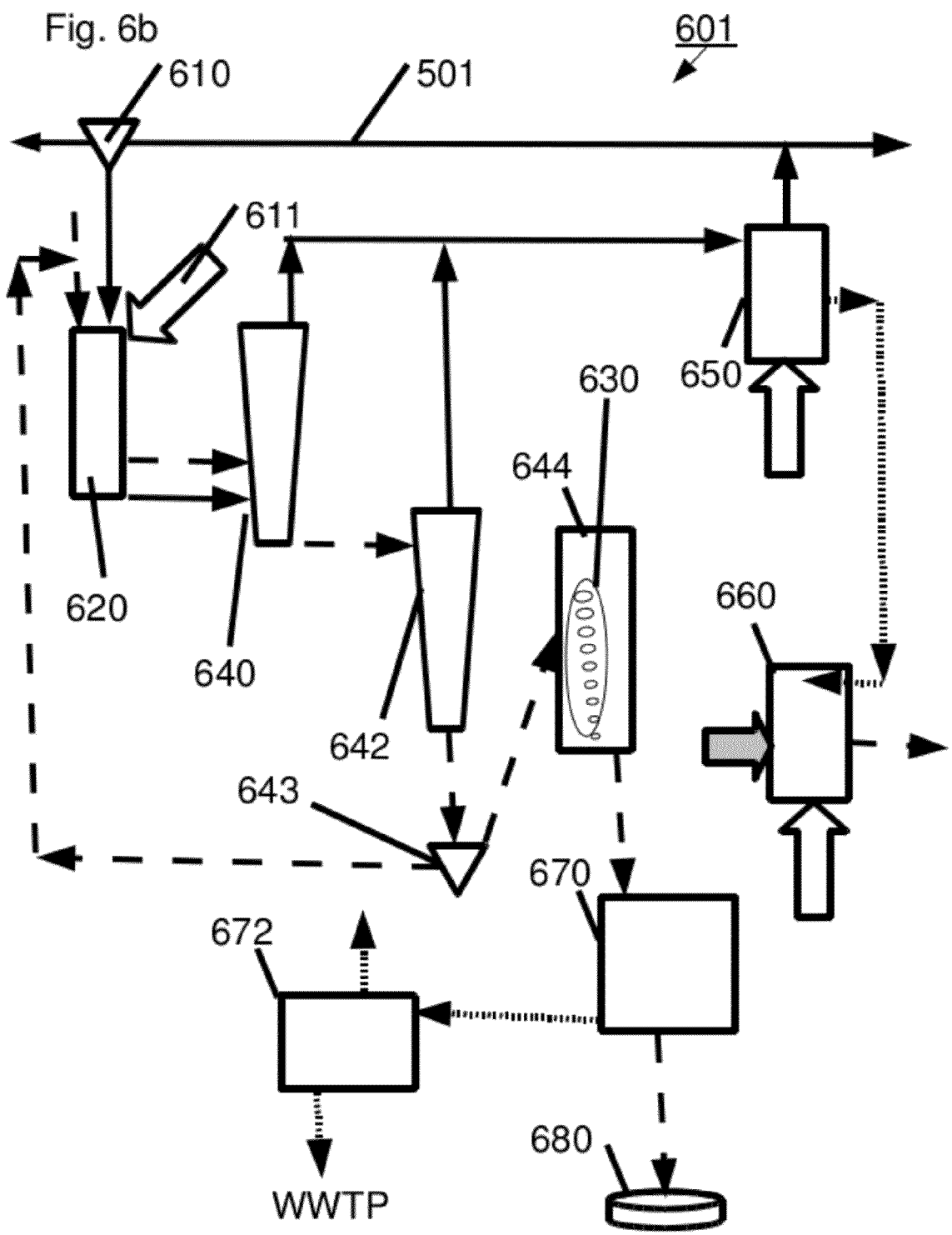
FIG. 6b is a schematic representation of materials flow according to additional exemplary embodiments of the invention.

Referring now to FIG. 6b as well as FIG. 5:

FIG. 6b is a schematic representation of materials flow consistent with some exemplary embodiments of method 500 indicated generally as 601. Depicted exemplary materials flow 601 corresponds to the left side of method 500 (FIG. 5) from cyclically routing 550 to the return of S1 solvent 570 with reduced contaminant load to system 501. Materials flow 601 is presented to illustrate in greater detail another exemplary way to carry out contaminant reduction process 560.

In depicted exemplary materials flow 601, carbonatation is conducted following removal of S1 solvent.

In FIG. 6b, system 501 is represented schematically as a horizontal solid arrow at the top of the page. Solid arrows, dashed arrows and dotted arrows are used throughout the figure to indicate flows as in FIG. 6a.

Conceptually, it may be convenient to think of system 501 as pointing to a lignin purification/HCL recovery loop on the left and a sugar purification/HCL recovery loop on the right. According to various exemplary embodiments of the invention different amounts of total S1 extractant in system 501 may be routed to the two loops. Optionally, the split is about half and half. In some exemplary embodiments of the invention, about ⅝ of the S1 extractant is routed to the lignin purification loop.

In depicted materials flow 601, flow splitter 610 cyclically routes 550 S1 solvent from system 501 to a lime contact chamber 620 where a lime suspension is added as indicated by the dashed arrow. Optionally, a distillation purge is also added at this stage (not depicted). This marks the beginning of contaminant reduction process 560 (FIG. 5) according to the depicted embodiment. According to various exemplary embodiments of the invention splitter 610 diverts different percentages of the flow in system 501 to lime contact chamber 620 as described above in the context of FIG. 6a.

Optionally, contact chamber 620 includes a mixer and/or heater (not depicted). According to various exemplary embodiments of the invention the mixture of 51 and lime suspension is incubated in chamber 620 for a desired time under desired conditions.

In depicted exemplary materials flow 601, the S1 solvent mixed with lime suspension then flows to cyclonic separation of S1 from lime. In the depicted embodiment two cyclonic separators 640 and 642 are provided in series. Solvent exiting the top of separators 640 and 642 is returned to system 501, optionally after washing in washing unit 650 as described above in the context of FIG. 6a.

In the depicted embodiment, water exiting washing unit 650 goes to lime suspension generator 660 which functions as described above in the context of FIG. 6a.

Treatment of lime suspension exiting separator 642 is different than in materials flow 600.

In depicted exemplary materials flow 601, lime suspension exiting separator 642 is split into two streams by flow splitter 643.

A first stream goes to carbonatation chamber 644 where it is exposed to a stream of $CO_2$ bubbles 630. This carbonatation produces a slurry of calcium carbonate. This carbonatation reaction is conducted on a lime suspension with substantially no S1 solvent present. Lime suspension carrying calcium carbonate slurry exits chamber 644 and can be filtered in filter unit 670. The resultant aqueous solution (dotted lines) can optionally be concentrated by evaporator 672 and/or sent to a waste water treatment plant (WWTP) as indicated. Solids accumulating in filter 670 can periodically be removed as a solids cake 680, optionally provided as a slurry or filtrate including a relatively large amount of water or other liquids.

A second stream from flow splitter 643 goes to lime contact chamber 620 where it is joined with lime suspension being introduced into the chamber.

According to various exemplary embodiments of the invention the relative sizes of the first and second streams from flow splitter 643 can vary widely. Optionally, either of the two streams can include as little as 10% or as much as 90% of the total flow or any intermediate percentage. It was surprisingly discovered that lime recycled to contact chamber 620 retains significant activity in terms of its ability to adsorb impurities and/or hydrolyze esters. According to various exemplary embodiments of the invention routing of a significant portion (e.g. 50, 55, 60, 65, 70, 75 or 80% or intermediate or greater percentages) of the lime to this recycling pathway contributes to a reduction in the cost of reagents and/or reduces waste flow.

In some exemplary embodiments of the invention, the first stream flowing to carbonatation chamber 644 is 20, 25, 30, 35, 40, 45 or 50% or intermediate or smaller percentages of the total flow.

Although not explicitly depicted in FIG. 6b, a controller of the same type as controller 250 (FIG. 2) can be installed to control a flow of one or more streams in materials flow 601 in some exemplary embodiments of the invention.

Exemplary S1 Solvents

According to various exemplary embodiments of the invention described above S1 may include one or more solvents selected from the group consisting of alcohols, ketones and aldehydes having at least 5 carbon atoms. Optionally, S1 includes, or consists primarily of, or consists substantially solely of, or is n-hexanol. Optionally, S1 includes, or consists primarily of, or consists substantially solely of, or is 2-ethyl-1-hexanol.

Exemplary Ratios

Referring again to FIG. 3, in some exemplary embodiments of the invention, lime 350 is added to de-acidified extract 340 as a 10% slurry of CaO and/or $Ca(OH)_2$ in water. Optionally, a ratio of S1 solvent to 10% lime slurry 30:1; 25:1; 20:1; 15:1 or 10:1 or intermediate or lesser ratios.

Alternatively or additionally, a ratio of S1 solvent to lime on a weight basis is 300:1; 250:1; 200:1; 150:1 or 100:1 or intermediate or lesser ratios.

According to various exemplary embodiments of the invention, the greater the amount of lime applied to each unit of solvent, the greater the percentage of lime that can be recycled for additional rounds of contaminant load reduction.

Exemplary Impurities Concentrations

Referring again to FIG. 6b, exemplary concentrations of specific impurities in the contaminant load of the S1 solvent are described as the solvent exits washing unit 650 and returns to system 501.

In some exemplary embodiments of the invention, the contaminant load includes furfurals. Optionally, the furfurals are present in an amount not exceeding 0.25% on a weight basis. Alternatively or additionally, a concentration of the furfurals is at least 0.02% by weight.

In some exemplary embodiments of the invention, the contaminant load includes phenolic compounds at a concentration of at least 0.1% by weight.

Alternatively or additionally, in some exemplary embodiments of the invention, the contaminant load includes an acetate ester of the solvent. Alternatively or additionally, the contaminant load includes less than 0.01% of a formate ester of said solvent.

In some exemplary embodiments of the invention, the S1 solvent is hexanol. In some exemplary embodiments of the invention, the S1 solvent is 2-ethyl-hexanol.

Exemplary Calcium Cake Compositions

Referring again to FIG. 6b, exemplary compositions of calcium cake 680 are discussed. All percentages of cake ingredients are expressed on a dry weight basis.

In some exemplary embodiments of the invention, cake 680 includes at least 1; optionally 5; optionally 10; optionally 15; optionally 20; optionally 30; optionally 35% calcium carbonate (or intermediate or greater percentages) and at least 1% furfurals. Optionally, the percentage of calcium carbonate is 21, 25, 27 or 30% or intermediate or greater percentages. Optionally, the percentage of furfurals is at least 5%; 10%; 15% or 20% or intermediate or greater percentages.

In some exemplary embodiments of the invention, cake 680 includes phenolic compounds. Optionally, the percentage of phenolic compounds is at least 1; 2; 5; 10; 20; 25 or 30% or intermediate or greater percentages.

In some exemplary embodiments of the invention, cake 680 includes calcium acetate. Optionally, the amount of calcium acetate is at least 0.1; 0.2; 0.3; 0.5 or 0.5% or intermediate or greater percentages.

In some exemplary embodiments of the invention, cake 680 includes calcium formate. Optionally, the amount of calcium formate is at least 0.5; 0.6; 0.7; 0.7; 0.8; 0.9 or 1.0%.

Optionally, the cake includes hexanol. Optionally, the cake includes 2-ethyl hexanol.

Exemplary Solvent/Lime Suspensions

Some exemplary embodiments of the invention, relate to a suspension of at least one part lime solids to two hundred parts S1 solvent carrying a contaminant load (on a weight basis). Optionally, the lime is provided as an aqueous slurry so that the suspension includes water. For example, 1 part 10% lime slurry and 20 parts S1. Optionally, two, three, four, five or intermediate or greater numbers of parts of lime slurry are employed.

In some exemplary embodiments of the invention, the contaminant load in the solvent includes at least 0.2% furfurals relative to said solvent.

Alternatively or additionally, in some exemplary embodiments of the invention, contaminant load includes at least 0.2% phenolic compound relative to said solvent.

Alternatively or additionally, according to various exemplary embodiments of the invention the suspension includes calcium acetate and/or the contaminant load includes hexyl acetate.

Alternatively or additionally, according to various exemplary embodiments of the invention the suspension includes calcium formate and/or the contaminant load includes hexyl formate.

Optionally, the S1 solvent is hexanol. Optionally, S1 solvent is 2-ethyl hexanol.

Exemplary Hydrolysis Considerations

Referring again to FIG. 3, in some exemplary embodiments of the invention, de-acidified extract 340 contains one or more esters. Optionally, the esters are derived from S1 solvent. These esters may include, but are not limited to acetates, formates, lactates, levulinates, and galactouronates.

In some exemplary embodiments of the invention, lime 350 added to extract 340 causes hydrolysis of these esters to regenerate the S1 solvent and produce calcium salts. Optionally, lime 350 and extract 340 are contacted under temperature conditions which favor hydrolysis. Optionally, temperatures of 160, 140, 120, 100, 80 or 60 degrees centigrade or intermediate or lower temperatures can favor hydrolysis. In some exemplary embodiments of the invention, S1 solvent at about 160 degrees centigrade is contacted with lime slurry and cooled to about 80 degrees centigrade.

In some exemplary embodiments of the invention, calcium salts produced by hydrolysis of esters with $Ca(OH)_2$ and/or $CaO$ are insoluble. Optionally, removal of these insoluble calcium salts contributes to reducing the contaminant load as it is the result of reducing the load of esters which are impurities in the S1 solvent.

Exemplary Equipment

In some exemplary embodiments of the invention, contact between an S1 extractant and a hydrolyzate (e.g. from lignin stream 120 and/or from acid hydrolyzate 130) is implement via countercurrent extraction. Optionally, this countercurrent extraction can be implemented using at least one pulsed column. Optionally, the pulsed column is a Bateman pulsed column (Bateman Litwin, Netherlands).

In some exemplary embodiments of the invention, solvent and lime wetted with water are separated by a cyclonic separator or "hydroclone" as depicted in FIGS. 6a and 6b (640 and/or 642). Cyclonic separators are commercially available and may be purchased, for example, from Odis Filtering Ltd (Petach Tikva; Israel) or from GN Solids Cintrol-Tangshan Guanneng Machinery Equipment Co. Ltd. (Tangshan; China).

Exemplary Flow Control Considerations

According to various exemplary embodiments of the invention, flows of liquids may be aided by pumps installed at various points in the described/depicted systems and/or modules. Alternatively or additionally, solid or semisolid materials can optionally be moved by solid transport mechanisms. According to various exemplary embodiments of the invention solid transport mechanisms include, but are not limed to, conveyor belts and augers.

Alternatively or additionally, the pumps and/or solid transport mechanisms may be connected to, and under the control of, controller 250. According to various exemplary embodiments of the invention control of pumps and/or solid transport mechanisms by controller 250 can be implemented using an appropriate control interface. Such control interfaces can include mechanical and/or electric and/or electronic components and/or combinations thereof.

Additional Exemplary Considerations

During operation of hydrolysis reactor 110 (FIG. 1), "black specks" of undefined composition may appear in hydrolyzate 130 in some cases. It is believed that these specs result from degradation of sugars following prolonged exposure to concentrated acid. In some exemplary embodiments of the invention, ultra-filtration (e.g. 300 kDa filter) of the hydrolyzate is implemented to remove these specs. The filtrate proceeds to, or is returned to, refining module 201.

The retentate containing a high concentration of black specs is washed with water to recover sugars and/or HCL and re-filtered. Optionally, this washing and re-filtering is repeated until a desired degree of HCl and/or sugar recovery is achieved and a washed retentate including black specs and water remains. In some exemplary embodiments of the invention, this washed retentate is added to prior to or after carbonatation (e.g. to filter 670 or a flow of material entering this unit) so that the black specs are incorporated into cake 680. Optionally, incorporation into cake 680 neutralizes acid remaining on the specs and/or other wise inactivates them.

It is expected that during the life of this patent many new types of pumps, countercurrent extraction apparatus and cyclonic separators will be developed and the scope of the invention is intended to include all such new technologies a priori.

As used herein the term "about" refers to ±10%.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Specifically, a variety of numerical indicators have been utilized. It should be understood that these numerical indicators could vary even further based upon a variety of engineering principles, materials, intended use and designs incorporated into embodiments of the invention. Additionally, components and/or actions ascribed to exemplary embodiments of the invention and depicted as a single unit may be divided into subunits. Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus and features used to describe an apparatus can be used to characterize a method.

It should be further understood that the individual features described hereinabove can be combined in all possible combinations and sub-combinations to produce additional embodiments of the invention. The examples given above and/or below are exemplary in nature and are not intended to limit the scope of the invention which is defined solely by the following claims. Specifically, the invention has been described in the context of recycling and/or purification of solvents used to extract an acid hydrolyzate of a lignocellulosic substrate but might also be used in any industrial process involving purification and/or recycling of a solvent.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art with regard to the instant specification.

The terms "include", and "have" and their conjugates as used herein mean "including but not necessarily limited to".

Additional objects, advantages, and novel features of various embodiments of the invention will become apparent to one ordinarily skilled in the art upon examination of the following examples, which are illustrative, rather than limiting. Additionally, various embodiments, features and aspects of the invention as delineated hereinabove and as claimed in the claims section below find experimental support in the following examples.

EXAMPLES

Reference is now made to the following examples, which together with the above descriptions, illustrate the invention in a non limiting fashion.

Example 1

Relative Contaminant Loads of De-acidified Extract, Limed Extract and Refined Extract An acid hydrolyzate was prepared by hydrolyzing sugarcane bagasse in a 42% HCl solution. The concentrations of the HCl and of the carbohydrates in the formed hydrolyzate were 31.7% wt and 12.8% wt, respectively. The acid hydrolyzate was equilibrated with hexanol. HCl was selectively extracted to the solvent and an organic extract containing 14.9% wt HCl was formed.

HCl was distilled out of the extract at a pressure of 50 mm mercury to produce a de-acidified extract. HCl concentration in the de-acidified extract was 0.1% wt. In order to quantify the contaminant load in abstract terms, a sample of the de-acidified extract was taken and checked for absorption at several wavelengths between 310 nm and 600 nm. The results are presented in Table 1 (first line "de-acidified extract"). The high absorption levels at the various wavelengths are indicative of a large contaminant load containing a variety of different impurities.

In order to demonstrate the capacity of liming for reducing the contaminant load, a limed extract was prepared as follows:

7.86 gr of the de-acidified extract were mixed in a vial with 2.2 gr of a 2% wt $Ca(OH)_2$ slurry for three hours at 85° C. The resultant mixture contained limed extract (organic phase) and an aqueous slurry of lime.

A sample of the mixture was separated. Filtering away the lime from the organic phase was difficult. Absorption at wavelengths between 310 nm and 600 nm was measured as for the de-acidified extract above. The results are presented in Table 1 (second line, limed extract). A marked reduction in absorption was observed, especially at wavelengths of 450 nm or below. This decrease in absorption indicates a reduction in contaminant load.

In order to demonstrate the capacity of carbonatation for further reducing the contaminant load, a limed extract was carbonatated as follows:

While mixing, $CO_2$ was bubbled through de-acidified extract as described above. Bubbling was continued until the pH of the aqueous solution reached 7.0. Then, 0.46 gr of 2% wt $Ca(OH)_2$ slurry was added and mixing was continued at 85° C. for another hour. The organic phase was separated. Filtering away the lime from the organic phase was much easier than for non-carbonatated limed extract as described above.

The filtered organic phase was washed three times with 1 gr water to remove any calcium hydroxide and then analyzed. Its calcium content was 76 ppm.

Absorption of the washed organic phase, refined extract, was measured at wavelengths between 310 nm and 600 nm as for the de-acidified extract and limed extract above. The results are presented in Table 1 (third line, refined extract). A marked reduction in absorption was observed at wavelengths of 400 nm to 600 nm. This decrease in absorption indicates a reduction in contaminant load. This is consistent with visual evaluation which indicated a reduction in intensity of the yellow color. At 310 and 350 nm, absorbance was higher than for the limed extract. This suggests an increase in contaminant load for some types of impurities as a result of carbonatation.

TABLE 1

Absorption of different extract types at various wavelengths in the UV-Vis range*.

| | Wavelength (nm) | | | | | |
|---|---|---|---|---|---|---|
| | A310 | A350 | A400 | A450 | A500 | A600 |
| De-acidified extract | 28.2 | 19.5 | 9.0 | 5.0 | 3.1 | 1.4 |
| Limed extract | 10.3 | 7.3 | 4.5 | 3.47 | 2.93 | 2.37 |
| Refined extract** | 14.1 | 9.0 | 3.7 | 1.90 | 1.14 | 0.54 |

*For absorption measurements, the solutions were diluted. The figures in the table were calculated by multiplying the measured absorption by the degree of dilution.
**Refining of the de-acidified extract with $CO_2$ gas and 2% $Ca(OH)_2$ Example 2

Relative Contaminant Loads Limed Extract and Refined Extract Additional Experiment with 3% $Ca(OH)_2$ In order to assess the impact of the $Ca(OH)_2$ concentration employed in refining, an additional experiment was conducted:

2.32 gr $Ca(OH)_2$ 3% solution was applied to 7.87 gr of de-acidified extract as in example 1 and mixed for 3 hours at 85° C. to produce limed extract. Absorption data as in Example 1 are summarized in Table 2 (first line; limed extract).

In order to produce refined extract, $CO_2$ was bubbled through the limed extract to reach pH=6.7, followed by addition of 0.43 gr $Ca(OH)_2$ 3% solution. The mixture was mixed for another hour at 85° C. and the phases were treated as described above. Results are summarized in Table 2 (second line; refined extract).

TABLE 2

Absorption at various wavelengths in the UV-Vis range*.

| | Wavelength | | | | | |
|---|---|---|---|---|---|---|
| | A310 | A350 | A400 | A450 | A500 | A600 |
| Limed extract | 15.4 | 8.0 | 2.1 | 0.76 | 0.31 | 0.02 |
| Refined extract** | 16.0 | 8.3 | 2.2 | 0.75 | 0.28 | 0.01 |

*For absorption measurements, the solutions were diluted. The figures in the table were calculated by multiplying the measured absorption by the degree of dilution.
**Refining of the limed extract was with $CO_2$ and 3% $Ca(OH)_2$ Results presented in Table 2 indicate that $Ca(OH)_2$ 3% solution reduced the contaminant load in both limed extract and refined extract for impurities with absorption in the range of 400 to 600 nm. These results confirm those of Example 1 and suggest that increasing the concentration of $Ca(OH)_2$ can contribute to a reduction in contaminant load, especially for certain types of impurities.

Example 3

Relative Contaminant Loads Limed Extract and Refined Extract Additional Experiment with 10% $Ca(OH)_2$ In order to assess the impact of the $Ca(OH)_2$ concentration employed in refining further, an additional experiment was conducted:

5 gr $Ca(OH)_2$ 10% solution were applied to 18 gr of de-acidified extract as in example 1 and mixed for 3 hours at 85° C. Absorption data as in Example 1 are summarized in Table 3 (line 1; limed extract).

In order to produce refined extract, $CO_2$ was bubbled through the limed extract to reach pH=6.9, followed by addition of 1 gr $Ca(OH)_2$ 10% solution and mixing for another hour at 85° C. and the phases were treated as described above. Results are summarized in Table 3 (line 2; refined extract).

TABLE 3

Absorption at various wavelengths in the UV-Vis range*.

| | Wavelength | | | | | |
|---|---|---|---|---|---|---|
| | A310 | A350 | A400 | A450 | A500 | A600 |
| Limed extract | 10.1 | 6.5 | 2.1 | 0.79 | 0.35 | 0.08 |
| Refined extract** | 10.1 | 6.3 | 2.0 | 0.75 | 0.34 | 0.11 |

*For absorption measurements, the solutions were diluted. The figures in the table were calculated by multiplying the measured absorption by the degree of dilution.
**Refining of the recycle extractant with 10% $Ca(OH)_2$ Results presented in Table 3 indicate that $Ca(OH)_2$ 10% solution reduced the contaminant load in both limed extract and refined extract for impurities with absorption in the range of 310 to 350 nm relative to results of Example 1. Table 3 also shows that both limed extract and refined extract had absorption in the range of 400 to 600 nm comparable to the results of Example 2. These results confirm the validity of liming followed by carbonatation as a means for reduction in contaminant load across a wide range of impurities.

Example 4

Carbonatation in the Presence and Absence of Lime

In order to examine the influence of residual lime on efficacy of subsequent carbonatation with respect to contaminant load reduction in a de-acidified extract, two experiments were performed. In the first experiment the solvent was separated by decantation and filtration from the lime sludge and $CO_2$ was added to the clear filtrate solution (procedure a). In the second experiment CO2 was added without separation of the lime sludge (procedure b).

In order to prepare a de-acidified extract 273 gr lignin (15% dissolved sugars (DS)) was mixed with 100 gr water and 200 gr hexanol. The mixture was evaporated at azeotropic condition. Water was added back 100 gr and Hexanol was added back 100 gr Hexanol and the resultant azeotrope was evaporated off. The resultant solution was filtered through a 1 micron filter paper to produce a de-acidified extract including dry hexanol with an acid content of 0.03%.

(Procedure a) Carbonatation in the Absence of Lime 18 gr of the de-acidified extract, pH 1.6% HCl 0.03, was mixed with 5 gr of 10% lime solution ($Ca(OH)_2$). The solution, pH 11.4, was mixed at 80° C. for 3 hours and left to stand overnight for approximately 12 hours. The lime sludge settled out as a wet cake with a weight of about 8 gr. The dark liquid supernatant was decanted and filtered though a 0.45 micron filter to produce 8 gr of a clear filtrate with a slight yellow color. The filtrate was carbonatated with $CO_2$ from pH 9.9 to pH 7.4. After carbonatation 0.5 gr of water was added to the clear solution to wash out salts. The washed organic phase (refined extract) was checked for absorption at several wavelengths between 400 nm and 650 nm. Absorption results at various wavelengths are summarized in Table 4.

(Procedure b) Carbonatation in the Presence of Lime 18 gr of the de-acidified extract produce above, pH 1.6% HCl 0.03, was mixed with 4 gr of 10% lime solution. The solution, pH 11.4, was mixed at 80° C. for 3 hours. The solution was carbonatated with 10% $CO_2$ solution, to pH 7.5 then 1 gr of additional lime (as powdered solid) was added, mixed and the solution was stirred for 15 hrs and filtered with 0.45 micron filter to give a clear filtrate with a slight yellow color in both the aqueous phase and the hexanol phase. The hexanol phase was washed with 1 gr aliquots of water 3 times to remove any calcium hydroxide. Concentration of calcium in the hexanol was 76 ppm and the pH was 8.3. Absorption results at various wavelengths are summarized in Table 4.

TABLE 4

Absorption at various wavelengths in the UV-Vis range

| | A400 | A420 | A450 | A500 | A600 | A650 |
|---|---|---|---|---|---|---|
| Pure Hexanol | 0.065 | 0.064 | 0.06 | 0.058 | 0.057 | 0.054 |
| Procedure a: filtered then carbonatated | 0.138 | 0.121 | 0.101 | 0.084 | 0.07 | 0.065 |
| Procedure b: carbonatated without filtration | 0.19 | 0.16 | 0.15 | 0.15 | 0.153 | 0.151 |

Results presented in Table 4 indicate that decantation and filtration prior to carbonatation (procedure a) reduce the contaminant load in an extract prepared from lignin more efficiently.

Example 5

Acid Catalyzed Hydrolysis of Hexyl Acetate in the Presence of Hexanol

Hexyl acetate, can be formed during hydrolyzate extraction with S1 solvent (e.g. Hexanol) as a result of esterification driven by acid or base. The influence of pH conditions on hydrolysis of hexyl acetate was assayed in a series of experiments. The hydrolysis of hexyl acetate is catalyzed by acid or base, and both types of catalysts were assayed in different conditions. This example relates specifically to acid catalyzed hydrolysis. In general hydrolysis of hexyl acetate produces hexanol (regenerated S1 solvent) and an acetate moiety. In some exemplary embodiments of the invention, hydrolysis of hexyl acetate serves to regenerate S1 solvent. Optionally, the acetate moiety produced by the hydrolysis is, or can be converted to calcium acetate. In some exemplary embodiments of the invention, calcium carbonate is generated by contacting acetic acid in a lime solution with $CO_2$ gas.

In order to evaluate hydrolysis:

A mixture of 92.2 gr hexanol, 1.03 gr hexyl acetate, 7.03 gr $H_2O$ and 1.05 gr HCl was stirred in a 250 ml round-bottom flask under reflux at 80° C. Samples were taken from the organic phase every hour for six hours and another example after 18 hours. The ratio between the area % of hexanol and hexyl acetate was monitored by gas chromatography (GC) analysis, to get an indication of degree of hydrolysis.

Briefly, GC conditions were as follows:

An HP 5890 (Hewlett Packard, Palo Alto Calif.; USA) using an HP-5 30 m×0.32 mm×0.25 um coupled to a flame ionization detector (FID) was employed. The program was 50° C.-5° C./min-90° C.-30° C./min-250° C. (5 min); Det, Inj 250° C. with a 1 ul injection volume using nitrogen as a carrier gas.

Results are summarized in Table 5.

TABLE 5

Acid hydrolysis of hexyl acetate in 13.0% HCl/(HCl + water) w/w.

| Time (hours) | Hexyl acetate/hexanol area ratio (GC) |
|---|---|
| 0 | 1.07% |
| 1 | 0.90% |
| 2 | 0.85% |
| 3 | 0.85% |
| 4 | 0.85% |
| 5 | 0.87% |
| 6 | 0.87% |
| 18 | 0.87% |

Results presented in Table 5 suggest that partial hydrolysis occurred under these experimental conditions during the first 2 hours, but no additional hydrolysis occurred subsequently.

In order to assess the impact of the acidic catalysis even further, three additional experiments using systems A, B and C as described below were performed:

System A: A mixture of 684 gr hexanol, 36 gr hexyl acetate, 25 gr $H_2O$ and 4 gr HCl was reflux at 82° C. HCl/(HCl+$H_2O$)=13.79%

System B: A mixture of 6842 gr hexanol, 36 gr hexyl acetate, 5 gr $H_2O$ and 0.035 gr HCl was reflux at 131° C. HCl/(HCl+$H_2O$)=0.70%

System C: A mixture of 223.25 gr hexanol, 11.75 gr hexyl acetate, 0.3 gr $H_2O$ and 0.0003 gr HCl was reflux at 150° C. HCl/(HCl+$H_2O$)=0.10%

In each experiment, 100 gr of each system was prepared according to the above ratios. In each case, a single clear and colorless phase was obtained. Part of the mixture was transferred to a 50 ml round-bottom flask, dipped in hot oil bath and equipped with a mini scale distillation kit. The mixture was constantly stirred with a magnetic stirrer for 30-90 minutes.

There was no apparent distillation in any of the systems even after more than 30 minutes. In system C, strong boiling was observed after about 10 minutes.

Samples were analyzed by GC analysis at times 0, 30, 360 and 90 minutes. Results are summarized in Table 6.

TABLE 6

Acidic hydrolysis of hexyl acetate in various HCl/(HCl + water) ratio.

| Time (min.) | Hexyl acetate/hexanol area ration (GC) | | |
|---|---|---|---|
| | System A | System B | System C |
| 0 | 4.45% | 4.41% | 4.40% |
| 30 | 4.21% | 4.32% | 4.32% |
| 60 | 4.24% | | 4.32% |
| 90 | | | 4.50% |

As in the previous experiment, results presented in Table 6 suggest that no hydrolysis occurred under the conditions of systems A, B and C.

Example 6

NaOH Catalyzed Hydrolysis of Hexyl Acetate in the Presence of Hexanol

Basic hydrolysis using NaOH as a catalyst was assayed by applying a chosen basic catalyst mixture (A or B; see table 7) to a "hydrolysis substrate" including 92 gr hexanol, 1.0 gr hexyl acetate, 7.0 gr $H_2O$ and 0.03 gr HCl. HCl/(HCl+$H_2O$) of this substrate is 0.4% on a weight basis.

The substrate was refluxed at 80° C. in the presence of catalyst for 6 hours. Samples were taken from the organic phase over time and the ratio between the area % of hexanol and hexyl acetate was monitored by GC analysis to indicate hydrolysis progress as in the previous experiments.

Basic catalyst mixtures A and B with NaOH were prepared. The Basic catalyst mixture and the w/w ratio of NaOH to basic mixture and the w/w ratio of NaOAc to basic mixture are presented in table 7.

TABLE 7 basic catalyst mixtures with NaOH.

| | NaOH (gr) | NaOAc (gr) | $H_2O$ (gr) | % NaOH out of basic mixture | % NaOAc out of basic mixture |
|---|---|---|---|---|---|
| A | 2.50 | 0.83 | 24.4 | 9 | 3 |
| B | 2.50 | 2.78 | 22.5 | 9 | 10 |

The weight ratio of the hydrolysis substrate to the catalyst mixture was 3.6. About 1-2 ml were sampled from upper phase, then centrifuged and filtered through 0.45 μm syringe filter for GC analysis at each time point. Results are summarized in Table 8.

TABLE 8

Basic hydrolysis of hexyl acetate with NaOH

| | Hexyl acetate/hexanol area ration (GC) | |
|---|---|---|
| Time (hours) | Catalyst mixture A | Catalyst mixture B |
| 0 | 0.85% | 0.91% |
| 1 | 0.00% | 0.91% |
| 2 | 0.00% | 0.91% |
| 3 | 0.00% | 0.91% |
| 4 | 0.00% | 0.91% |
| 5 | 0.00% | 0.91% |
| 6 | 0.00% | 0.91% |

Results presented in Table 8 indicate that at 3% NaOAc full hydrolysis occurred after one hour. However at 10% NaOAc no hydrolysis occurred. These results indicate that adding sodium acetate can shift the hydrolysis equilibrium so that no hydrolysis occurs.

An additional experiment was performed on the same hydrolysis substrate as that used above using a basic catalyst mixture containing 2.78 gr NaOH, and 25 gr $H_2O$. The basic catalyst mixture was added to the substrate and mixed for 6 hours at room temperature (~24° C.). About 1-2 ml were sampled from the upper phase, then centrifuged and filtered through a 0.45 μm syringe filter for GC analysis. The w/w ratio of NaOH to total basic catalyst mixture is 10%. The weight ratio of the hydrolysis substrate to the catalyst mixture is 3.6. Results are summarized in Table 9.

TABLE 9

Basic hydrolysis of hexyl acetate (The w/w ratio of NaOH to total basic mixture is 10%).

| Time (hours) | Hexyl acetate/hexanol area ration (GC) |
|---|---|
| 0 | 0.92% |
| 1 | 0.85% |
| 2 | 0.79% |
| 3 | 0.72% |
| 4 | 0.71% |
| 6 | 0.63% |

Results presented in Table 9 indicate that at room temperature partial hydrolysis occurs and that the degree of hydrolysis increases as a function of time.

Example 7

$Ca(OH)_2$ Catalyzed Hydrolysis of Hexyl Acetate in the Presence of Hexanol

In order to ascertain the influence of different bases on hydrolysis, an additional experiment using $Ca(OH)_2$ instead if NaOH was performed using the same hydrolysis substrate as in Example 6.

Three experiments were performed with the w/w ratio of $Ca(OH)_2$ to total mixture 10% and the w/w ration of $Ca(OAc)_2$ to total mixture 1.5%. The basic catalyst mixture and the weight ratio between the hydrolyzed mixture to the catalyst mixture are presented in table 10a.

TABLE 10a basic catalyst mixtures.

| system | $Ca(OH)_2$ (gr) | $Ca(OAc)_2$ (gr) | $H_2O$ (gr) | Hydrolysis substrate/ catalyst mixture |
|---|---|---|---|---|
| A | 2.78 | 0.42 | 24.6 | 3.6 |
| B | 5.56 | 0.83 | 49.2 | 1.8 |
| C | 1.39 | 0.21 | 12.3 | 7.2 |

The basic catalyst mixture was added to the hydrolysis substrate and mixed at 80° C., examples were taken for GC analysis at different time points. Results are summarized in Table 10b.

TABLE 10b

Basic hydrolysis of hexyl acetate with Ca(OH)$_2$ and Ca(OAc)$_2$

| Time (hrs) | Hexyl acetate/hexanol area ration (GC) | | |
|---|---|---|---|
| | System A | System B | System C |
| 0 | 0.92% | 0.92% | 0.92% |
| 1 | 0.83% | 0.85% | 0.87% |
| 2 | 0.77% | | 0.85% |
| 3 | 0.67% | | 0.82% |
| 4 | 0.64% | 0.74% | 0.92% |
| 5 | | | 0.79% |
| 6 | 0.60% | 0.64% | |
| 21 | 0.33% | | |

Results presented in Table 10b indicate that partial hydrolysis occurs in all three systems and that the degree of hydrolysis increases with time. The best results after 6 hours were achieved with a hydrolyzed mixture/catalyst mixture ratio of 3.6 (system A).

Example 8

Influence of Temperature on Ca(OH)$_2$ Catalyzed Hydrolysis of Hexyl Acetate in the Presence of Hexanol In order to evaluate the effect of reaction temperature on hydrolysis an additional experiment with Ca(OH)$_2$ was conducted.

A hydrolysis substrate was prepared by mixing 96 gr hexanol, 4 gr hexyl acetate and 6.72 gr water. A basic catalyst was prepared by mixing 2.96 gr Ca(OH)$_2$ and 26.7 gr water. The basic catalyst was added to the hydrolysis substrate so that the w/w ratio of Ca(OH)$_2$ to total mixture was 10% and the substrate/catalyst ratio was 3.6 w/w. The reaction was carried out at 82° C. and at 110° C. Samples were taken hourly and analyzed by GC as in previous examples until the hexyl acetate area percentage was reduced to 50% of its initial value. Results are summarized in Table 11.

TABLE 11

Effect of temperature on basic hydrolysis of hexyl acetate with Ca(OH)$_2$ at 82° C. and 110° C.

| | temperature | |
|---|---|---|
| | 82° C. | 110° C. |
| Time (hrs) | Hexyl acetate % area (GC) | |
| 0 | 3.08% | 2.93% |
| 1 | 2.96% | 2.87% |
| 2 | 2.89% | 2.72% |
| 3 | 2.80% | 2.53% |
| 4 | 2.73% | 2.30% |
| 5 | 2.62% | 2.16% |
| 6 | 2.52% | 2.03% |
| 7 | 2.44% | 1.85% |
| 8 | 2.25% | 1.63% |
| 9 | 2.19% | 1.44% |
| 10 | 2.08% | |
| 11 | 1.95% | |
| 12 | 1.91% | |
| 13 | 1.75% | |
| 14 | 1.64% | |
| 15 | 1.53% | |

Results presented in table 11 indicate that sufficient hydrolysis to reduce the area of hexyl acetate to 50% of its original value occurred earlier at 110° C. than at 82° C. (9 hours and 15 hours respectively). These results suggest that although a higher temperature contributes to faster hydrolysis it is possible to use a lower temperature applied for a longer tome. Optionally, this strategy can contribute to reduced energy consumption.

Results from examples 5 to 8 indicate that basic catalysts are more efficient for the hydrolysis of hexyl acetate. Hydrolysis with sodium hydroxide and 3% sodium acetate seems to be more efficient than hydrolysis with calcium hydroxide. After one hour with sodium hydroxide, complete hydrolysis was achieved, whereas hydrolysis in all three calcium hydroxide systems, though observed, occurred at a more gradual rate and was not observed to reach completion.

However, calcium hydroxide is far less soluble than sodium hydroxide, and this may be advantageous under certain circumstances.

Example 9

Ca(OH)$_2$ Catalyzed Hydrolysis of Esters in the Presence of Hexanol Followed by Carbonatation An additional series of four experiments was conducted in order to examine the feasibility of using liming solution (10% Ca(OH)$_2$) in the purification of loaded extractant (hexanol). As demonstrated by the previous examples, calcium hydroxide (lime) can hydrolyze esters such as hexyl acetate and hexyl formate formed during extraction of HCl. In addition, it was hypothesized that lime may adsorb other impurities such as furfural and its derivatives. The lack of specificity of adsorption seemed potentially useful in treating a solvent extract with a wide variety of impurities.

Experiments a through d were conducted as follows:

a. A liming substrate was prepared by addition of 0.030 g hexyl acetate to 15.001 g distilled hexanol to produce 0.277% weight/weight out of hexanol. A limed substrate was prepared by addition of 5.55 g of 9.99% lime solution to the substrate in a 50 ml pressure vessel. At this stage, pH was 11.4. The limed substrate was mixed at 85° C. (oil bath) for 6 hrs, until the concentration of hexyl acetate was decreased to 0.134% (as measured by GC) and left to cool to room temperature. The limed substrate was carbonatated by bubbling CO$_2$ into the cooled substrate while stirring slowly until pH reached 7. After carbonatation, 1.237 g lime 10% solution was added in order to reach pH 10.63 and the mixture was gravity filtered. The amount of hexyl acetate was 0.116% in the resulting filtered hexanol.

b. A liming substrate was prepared by addition of 0.0332 g hexyl acetate to 15.006 g distilled hexanol to produce 0.267% w/w out of hexanol. A limed substrate was prepared by addition of 6.79 g of 9.78% % lime solution to the substrate in a 50 ml pressure vessel. The pH was 12.17 at this stage. The limed substrate was mixed at 85° C. (oil bath) for 6 hrs, until hexyl acetate concentration decreased to 0.15% (as measured by GC) and cooled to room temperature. The limed substrate was carbonatated by bubbling CO$_2$ into the cooled substrate while stirring slowly until pH reached 7.23. After carbonatation, 0.332 g lime 10% solution was added in order to reach pH 10.91 and the mixture was filtered under vacuum. The amount of hexyl acetate was 0.126% in the resulting filtered hexanol.

c. A liming substrate was prepared by addition of 0.029 g hexyl acetate to 15.005 g distilled hexanol to produce 0.273% w/w out of hexanol. A limed substrate was prepared by addition of 8.344 g of 9.95% lime solution to the substrate in a 50 ml pressure vessel. The pH was 12.2 at this stage. The limed substrate was mixed at 85° C. (oil bath) for 4 hrs, until hexyl acetate concentration decreased to 0.158% (as measured by GC) and left to cool to room temperature. The limed substrate was carbonatated by bubbling $CO_2$ into the cooled substrate while stirring slowly until pH reached 7.69. After carbonatation, 1.564 g lime 10% solution was added in order to reach pH 10.25 and the mixture was filtered under vacuum. The amount of hexyl acetate was 0.116% in the resulting filtered hexanol.

d. A liming substrate was prepared by addition of 0.030 g hexyl acetate to 15.006 g distilled hexanol to produce 0.247% w/w out of hexanol. A limed substrate was prepared by addition of 11.067 g of 10% lime solution to the substrate in a 50 ml pressure vessel. At this stage, pH was 12.58. The limed substrate was mixed at 85° C. (oil bath) for 4 hrs, until hexyl acetate concentration decreased to 0.13% (as measured by GC) and left to cool to room temperature. The limed substrate was carbonatated by bubbling $CO_2$ into the cooled substrate while stirring slowly until pH reached 7.4. After carbonatation, 0.728 g lime 10% solution was added in order to reach pH 11.6 and the mixture was filtered under vacuum. The amount of hexyl acetate was 0.090% in the resulting filtered hexanol.

Results of experiments a-d indicate that addition of an additional portion of 10% $Ca(OH)_2$ consistently causes hydrolysis of more than 50% of hexyl acetate present in hexanol. Alternatively or additionally, these results confirm that carbonatation to produce calcium carbonate simplifies removal of calcium salts. The results also show that hexyl formate is rapidly hydrolyzed to calcium formate and hexanol. Adsorption of furfural and other compounds was not assayed here.

Example 10

Partial Recycling of $Ca(OH)_2$

In order to examine liming solution (10% $Ca(OH)_2$) efficiency in the purification process of the loaded solvent (hexanol), 35% w/w out of the 10% $Ca(OH)_2$ solution was removed and solvent was treated with 65% recycled 10% w/w $Ca(OH)_2$ solution supplemented with 35% "fresh" 10% w/w $Ca(OH)_2$ solution. This experiment corresponds to FIG. 6b when 65% of the lime at flow splitter 643 is routed back to lime contact chamber 620 and 35% is routed to carbonatation chamber 634.

The amount of impurities' built-up within the 10% $Ca(OH)_2$ solution after recycling six times 65% wt of the lime solution was measured.

Loaded solvent with the following ingredients—8.67% HCl, 2.71% hexyl acetate, 0.9% hexyl formate, weight/weight ratio out of hexanol, and hexyl chloride to hexanol ration of 0.31%:99.6%, was used to represent recycled extractant.

The experimental procedure was as described at example 9d above conducted in a 100 ml round bottom flask with a magnetic stirrer at 82-83° C. for 4 hours. At the end of the reaction, while still warm, the contents were transferred to 15 ml polypropylene tubes and put into a centrifuge at 5000 RPM (3354×g) for 10 min.

After centrifugation two phases were observed, i.e. organic and aqueous.

The organic phase was separated from the aqueous phase, and the aqueous phase was returned to the round bottom flask. At this stage, 35% wt of the aqueous phase was removed, and 35% wt of "fresh" 10% $Ca(OH)_2$ was added to the flask.

This lime mixture (65% recycled/35% fresh) was used in an additional round of liming with fresh batch of loaded solvent, under the same conditions described above.

This process of recycling 65% of the lime and discarding 35% was repeated 6 times so that a total of 7 liming cycles were conducted (the first cycle uses 100% "fresh" lime).

Results of analyses are summarized in Table 12. Results for Furfurals were calculated according to calibration at 280 nm (spectrophotometric measurements). Results for all other components below are based upon GC calibrated results.

TABLE 12

| | hexyl chloride:hexanol (Area ratio) | Hexyl formate | Hexyl acetate | % Hexyl acetate that was hydrolyzed | Hexyl ether | Furfurals | % Furfurals that were reduced |
|---|---|---|---|---|---|---|---|
| Loaded solvent | 0.37%:99.63% | 0.903% | 2.714% | — | 0.019% | 0.099% | — |
| Liming No. 1 | 0.41%:99.59% | n.d.* | 1.491% | 45% | 0.017% | n.d.* | |
| Liming No. 2 | 0.39%:99.61% | n.d.* | 1.450% | 46% | 0.018% | 0.012% | 88% |
| Liming No. 3 | 0.40%:99.60% | n.d.* | 1.512% | 44% | 0.016% | 0.009% | 91% |
| Liming No. 4 | 0.44%:99.56% | n.d.* | 1.777% | 34% | n.d.* | 0.012% | 88% |
| Liming No. 5 | 0.41%:99.59% | n.d.* | 1.492% | 45% | 0.018% | 0.013% | 87% |
| Liming No. 6 | 0.40%:99.60% | n.d.* | 0.887% | 67% | 0.010% | 0.010% | 90% |
| Liming No. 7 | 0.38%:99.62% | n.d.* | 0.806% | 70% | 0.009% | 0.012% | 88% |

*n.d. indicates none detected.

Results presented in table 12 indicate that lime recycled as described above retained significant capacity to reduce the contaminant load in the loaded solvent. Specifically:

hydrolysis of hexyl formate was complete in each cycle;

hydrolysis of hexyl acetate varied in the range of 30 to 65% with an average of about 50%;

furfurals were consistently reduced by 88% or more;

hexyl chloride and hexyl ether were apparently not affected by the liming in this experiment.

Results presented in this example indicate that liming is sufficient to reduce or eliminate some impurity types. For those impurity types which are not reduced by liming (e.g. hexyl chloride and hexyl ether), a portion needs to be subjected to additional treatments and/or periodically replaced.

In summary, liming optionally in combination with carbonatation provides a viable strategy for limiting accumulation of a contaminant load in an S1 solvent such as hexanol.

Example 11

Predicted Influence of Liming on Specific Impurities in the Contaminant Load

This Example projects how the amount of specific impurities in the contaminant load might be reduced using treatments according to exemplary embodiments of the invention as described and/or exemplified above.

Hypothetical results presented in table 13 show how a contaminant load including 4 impurities at measured concentrations from actual untreated solvent would be expected to behave if it were subjected to liming with a 10% $Ca(OH)_2$ slurry at a ratio of solvent/slurry of 20:1.

The presented results presume: hexyl formate is fully hydrolyzed; hexyl acetate is 50% hydrolyzed and furfurals are reduced by 88% as demonstrated in Example 10. The presented results also presume phenols are 80% adsorbed to lime.

Formate and acetate esters are converted to regenerated solvent and corresponding calcium salts by hydrolysis as indicated.

As indicated in FIGS. 6a and 6b, the calcium cake (680) is removed after carbonatation in many exemplary embodiments of the invention. Carbonatation transforms calcium hydroxide to calcium carbonate. Results presented in table 13 for calcium cake presume that this transformation proceeds to completion and that substantially all of the calcium originally introduced as calcium hydroxide is present as calcium carbonate. The molecular weight of calcium carbonate is 100 while the molecular weight of calcium hydroxide is 74.1. This means that as the degree that the carbonatation transformation is incomplete increases, the percentage of lime in the calcium cake (on a weight basis) would decrease and the percentages of each specific impurity in the cake would increase proportionately to the difference in molecular weights.

Alternatively or additionally, soluble calcium salts which do not find their way into the calcium cake have been ignored for purposes of calculation.

The hypothetical results presented in this example are purely illustrative and do not suggest that the contaminant load would include only, or even primarily, the four specific impurities listed. Alternatively or additionally, the term "specific impurity" does not necessarily refer to a single chemical entity. For example "furfurals" may include derivatives of furfural including, but not limited to hydroxymethylfurfural. Alternatively or additionally, "phenolic compounds" may include a large number of different chemical entities. According to various exemplary embodiments of the invention the profile of specific impurities which make up the contaminant load may vary depending on the specific substrate 112 (FIG. 1) hydrolyzed in reactor 110. For example, hydrolysis of pine wood chips may produce a different impurities profile than hydrolysis of sugar cane bagasse. Alternatively or additionally, the profile of specific impurities which make up the contaminant load may vary among different batches of a same substrate type. For example, the composition of pine wood may vary according to geographic region and/or altitude and/or post harvest storage conditions and/or age at harvest.

Example 12

Hydrolysis of Hexyl Chloride under Various Conditions

Results presented in Example 10 suggested that hexyl chloride was not removed under the liming conditions employed in that experiment. In order to improve the ability to remove hexyl chloride from solvent, an additional series of experiments using 10% $Ca(OH)2$; 10% NaOH and 10% KOH at a 6:1 molar excess (relative to hexyl chloride) were conducted at various temperatures. Hydrolysis of hexyl chloride produces HexOH dihexyl ether as well as hexane. Hexene was not measured in these experiments. Results are summarized in Tables 14 to 19 below.

TABLE 13 influence of liming on specific impurities in solvent

| | SOLVENT | | | | | | | |
|---|---|---|---|---|---|---|---|---|
| | Hexanol | | | | 2-ethlyl-hexanol | | | |
| impurity | untreated | Solvent after liming | Removed lime slurry* | Calcium cake | untreated | Solvent after liming | Removed lime slurry* | Calcium cake |
| Hexyl formate | 0.06% | 0% | Not applicable | Not applicable | 0.02%, | 0% | Not applicable | Not applicable |
| Ca formate | Not applicable | Not applicable | 1.2% | 3.8% | Not applicable | Not applicable | 0.4% | 1.1% |
| Hexyl acetate | 0.02% | 0.01% | Not applicable | Not applicable | 0.05% | 0.025% | Not applicable | Not applicable |
| Ca acetate | Not applicable | Not applicable | 0.2% | 0.6% | Not applicable | Not applicable | 0.5% | 1.4% |
| Furfurals | 0.4% | .048% | 7% | 22.3% | 0.5% | 0.06% | 8.8% | 24.4% |
| Phenolic compounds | 0.6% | 0.12% | 9.6% | 30.43% | 0.8% | 0.16% | 12.4% | 35.6% |
| lime | Not applicable | Not applicable | ~10% | 42.8%** | Not applicable | Not applicable | ~10% | 37.5%** |

*presumes that the solvent was provided with no water content. If the solvent carries water, values may be lower.
**assumes complete conversion of calcium hydroxide to calcium carbonate by carbonatation.

Tables 18 and 19 show that the most efficient hydrolysis conditions among those assayed were 10% KOH at a temperature of 129 degrees C. or more, KOH/HexCl molar ratio 6:1 and HexCl:HexOH 50:50% wt.

These conditions produced 14% HexCl, 84% HexOH and 1.3% dihexyl ether 5 hrs after 5 hours (Table 19) and 11.74% HexCl, 86.13% HexOH and 2.13% dihexyl ether after 24 hours (table 18). Presence of large amounts of hydrolysis product (50% HexOH) did not seem to interfere with reaction progress.

Abbreviations

HexCl=Hexyl chloride; HexOH=Hexanol; $Hex_2O$=Dihexyl ether

TABLE 14

Hydrolysis with 10% $Ca(OH)_2$ at 125 degrees C.

| Initial Composition | | Reaction Conditions | | | Final Composition | | | |
|---|---|---|---|---|---|---|---|---|
| HexCl | HexOH | $Ca(OH)_2$/HexCl molar ratio | Temp. in Bath | Time | HexCl | HexOH | $Hex_2O$ | Hexene |
| 50% | 0% | 6:1 | 125-135° C. | 3 hrs | 51.27% | 48.53% | 0.20% | n.a. |
| 50% | 0% | 6:1 | 125-135° C. | 24 hrs | 34.19% | 64.18% | 1.63% | n.a. |

*The hexyl chloride %, hexanol % and Dihexyl ether % is an area ratio between HexCl to HexOH and Dihexyl ether.
n.a. = not analyzed

TABLE 15

Hydrolysis with 10% $Ca(OH)_2$ at 98 degrees C.

| Initial Composition | | Reaction Conditions | | | Final Composition | | | |
|---|---|---|---|---|---|---|---|---|
| HexCl | HexOH | $Ca(OH)_2$/HexCl molar ratio | Temp. in Bath | Time | HexCl | HexOH | $Hex_2O$ | Hexene |
| 50% | 50% | 6:1 | 98-105° C. | 3 hrs | 46.15% | 53.79% | 0.06% | n.a |
| 50% | 50% | 6:1 | 98-105° C. | 24 hrs | 48.13% | 51.62% | 0.25% | n.a |

*The hexyl chloride %, hexanol % and Dihexyl ether % is an area ratio between HexCl to HexOH and Dihexyl ether.
n.a. = not analyzed

TABLE 16

Hydrolysis with 10% NaOH at 126 degrees C.

| Initial Composition | | Reaction Conditions | | | Final Composition | | | |
|---|---|---|---|---|---|---|---|---|
| HexCl | HexOH | NaOH/HexCl molar ratio | Temp. in Bath | Time | HexCl | HexOH | $Hex_2O$ | Hexene |
| 50% | 50% | 6:1 | 126-137° C. | 3 hrs | 38.60% | 60.77% | 0.63% | n.a |
| 50% | 50% | 6:1 | 126-137° C. | 24 hrs | 20.66% | 77.15% | 2.19% | n.a |

*The hexyl chloride %, hexanol % and Di hexyl ether % is an area ratio between HexCl to HexOH and Di hexyl ether.
n.a. = not analyzed

TABLE 17

Hydrolysis with 10% NaOH at 95 degrees C.

| Initial Composition | | Reaction Conditions | | | Final Composition | | | |
|---|---|---|---|---|---|---|---|---|
| HexCl | HexOH | NaOH/HexCl molar ratio | Temp. in Bath | Time | HexCl | HexOH | $Hex_2O$ | Hexene |
| 50% | 0% | 6:1 | 95-103° C. | 3 hrs | 45.76% | 54.15% | 0.09% | n.a |
| 50% | 0% | 6:1 | 95-103° C. | 24 hrs | 45.97% | 53.69% | 0.34% | n.a |

*The hexyl chloride %, hexanol % and Dihexyl ether % is an area ratio between HexCl to HexOH and Dihexyl ether.
n.a. = not analyzed

TABLE 18

Hydrolysis with 10% KOH at 129 degrees C.

| Initial Composition | | | Reaction Conditions | | Final Composition | | | |
|---|---|---|---|---|---|---|---|---|
| HexCl | HexOH | KOH/HexCl molar ratio | Temp. in Bath | Time | HexCl | HexOH | Hex$_2$O | Hexene |
| 50% | 50% | 6:1 | 129-133° C. | 2 hrs | 39.29% | 60.35% | 0.36% | n.a |
| 50% | 50% | 6:1 | 129-133° C. | 3 hrs | 38.01% | 61.58% | 0.41% | n.a |
| 50% | 50% | 6:1 | 129-133° C. | 24 hr | 11.74% | 86.13% | 2.13% | n.a |

*The hexyl chloride %, hexanol % and Dihexyl ether % is an area ratio between HexCl to HexOH and Dihexyl ether.
n.a. = not analyzed

TABLE 19

Hydrolysis with 10% KOH at 130 degrees C.

| Initial Composition | | | Reaction Conditions | | Final Composition | | | |
|---|---|---|---|---|---|---|---|---|
| HexCl | HexOH | KOH/HexCl | Temp. in Bath | Time | HexCl | HexOH | Hex$_2$O | Hexene |
| 50% | 50% | 6:1 | 130-135° C. | 1.5 hr | 35.04% | 64.71% | 0.25% | n.a |
| 50% | 50% | 6:1 | 130-135° C. | 4 hrs | 19.50% | 79.59% | 0.91% | n.a |
| 50% | 50% | 6:1 | 130-135° C. | 5 hrs | 14.45% | 84.30% | 1.25% | n.a |

*The hexyl chloride %, hexanol % and Dihexyl ether % is an area ratio between HexCl to HexOH and Dihexyl ether.
n.a. = not analyzed

Example 13

Influence of Ethanol on Hydrolysis of Hexyl Chloride under Various Conditions

In order to examine the possibility that presence of ethanol might improve hydrolysis kinetics at lower temperatures, two additional hydrolysis experiments were conducted using KOH in Example 12 in which a portion (10% or 50%) of the hexanol was substituted by ethanol and the temperature was lowered. Results presented in Tables 20 and 21 show that addition of ethanol had no significant impact on hydrolysis at temperatures lower than 100° C. (compare to tables 15 and 17).

TABLE 20

Hydrolysis with 10% KOH at 88 degrees C. with 10% Ethanol out of Hexanol

| Initial Composition | | | Reaction Conditions | | Final Composition | | | |
|---|---|---|---|---|---|---|---|---|
| HexCl | HexOH | KOH/HexCl molar ratio | Temp. in Bath | Time | HexCl | HexOH | Hex$_2$O | Hexene |
| 52.50% | 47.50% | 6:1 | 88-95° C. | 2 hrs | 51.00% | 48.95% | 0.05% | n.a |
| 52.49% | 47.51% | 6:1 | 88-95° C. | 4 hrs | 49.56% | 50.38% | 0.07% | n.a |
| 52.50% | 47.50% | 6:1 | 88-95° C. | 24 hrs | 46.46% | 53.39% | 0.16% | n.a |

*The hexyl chloride %, hexanol % and Dihexyl ether % is an area ratio between HexCl to HexOH and Dihexyl ether.
n.a. = not analyzed

TABLE 21

Hydrolysis with 10% KOH at 91 degrees C. with 50% Ethanol out of Hexanol

| Initial Composition | | | Reaction Conditions | | Final Composition | | | |
|---|---|---|---|---|---|---|---|---|
| HexCl | HexOH | KOH/HexCl molar ratio | Temp. in Bath | Time | HexCl | HexOH | Hex$_2$O | Hexene |
| 65.44% | 34.56% | 6:1 | 91-93° C. | 3 hrs | 64.47% | 35.48% | 0.05% | n.a |
| 66.34% | 33.66% | 6:1 | 91-93° C. | 6 hrs | 61.69% | 38.23% | 0.08% | n.a |
| 66.00% | 34.00% | 6:1 | 91-93° C. | 24 hrs | 57.96% | 41.92% | 0.12% | n.a |

*The hexyl chloride %, hexanol % and Dihexyl ether % is an area ratio between HexCl to HexOH and Dihexyl ether.
n.a. = not analyzed Results presented in Examples 12 and 13 show that it is possible to hydrolyze hexyl chloride under sufficiently strong conditions of temperature and alkalinity.

The invention claimed is:
1. A method comprising:
 (a) contacting lime with an extract carrying a contaminant load comprising an S1 solvent, to form a lime treated extract and solids;
 (b) reducing said contaminant load by removing at least a portion of said solids from said lime treated extract and solids;
 (c) carbonating said removed solids or said lime with $CO_2$ gas to form a slurry comprising calcium carbonate; and
 (d) contacting said slurry comprising calcium carbonate with additional lime.

2. The method of claim 1, wherein said contaminant load is reduced by more than 20% (wt/wt).

3. The method of claim 1, wherein the method further comprises prior to step (a) contacting an extractant comprising said S1 solvent with an acid hydrolyzate of a lignocellulosic substrate to produce an acid-carrying extract; and de-acidifying said acid-carrying extract to produce said extract carrying a contaminant load.

4. A method comprising:
 (a) cyclically contacting a first portion of an extractant comprising Si solvent with an acid hydrolyzate of a lignocellulosic substrate to produce an acid-reduced hydrolyzate and an extract comprising acid and S1 solvent carrying a contaminant load;
 (b) de-acidifying said extract to form a de-acidified extract with S1 solvent carrying the contaminant load; and
 (c) cyclically routing a second portion of said extractant comprising S1 solvent carrying a contaminant load to a decontamination module which applies a contaminant reduction process to said second portion to produce an extractant with a reduced contaminant load.

5. The method of claim 4, wherein said contaminant reduction process comprises treatment of said second portion of said extractant with lime.

* * * * *